United States Patent
He et al.

(10) Patent No.: US 10,936,847 B1
(45) Date of Patent: Mar. 2, 2021

(54) UNDER-DISPLAY OPTICAL SENSOR WITH COMPENSATED LIGHT PATHS

(71) Applicant: Shenzhen Goodix Technology Co., Ltd., Shenzhen (CN)

(72) Inventors: Yi He, San Diego, CA (US); Bo Pi, San Diego, CA (US)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/721,943

(22) Filed: Dec. 20, 2019

Related U.S. Application Data

(60) Provisional application No. 62/903,672, filed on Sep. 20, 2019, provisional application No. 62/907,418, filed on Sep. 27, 2019.

(51) Int. Cl.
*G06K 9/00* (2006.01)

(52) U.S. Cl.
CPC ................................ *G06K 9/00046* (2013.01)

(58) Field of Classification Search
CPC .......... G06K 9/00046; G06K 9/00013; G06K 9/00033; G02F 1/133606; G02F 1/133634; G02F 1/133632
See application file for complete search history.

(56) References Cited

U.S. PATENT DOCUMENTS

2018/0365466 A1 12/2018 Shim et al.
2019/0130152 A1 5/2019 Kim et al.

FOREIGN PATENT DOCUMENTS

| CN | 109564628 A | 4/2019 |
| CN | 109690372 A | 4/2019 |
| CN | 109716352 A | 5/2019 |
| CN | 109863508 A | 6/2019 |

*Primary Examiner* — Abhishek Sarma
(74) *Attorney, Agent, or Firm* — Kilpatrick Townsend & Stockton LLP

(57) ABSTRACT

Optical sensing is provided with a compensated light paths. For example, embodiments can operate in context of an under-display optical fingerprint sensor integrated into an electronic device, such as a smartphone. Responsive to reflected probe light passing through a display module, a compensation structure is configured to compensate for divergent refracting of the reflected probe light caused by backlighting enhancement structures. Some embodiments operate in context of an enhancement panel having microprism structures that tend to blur the reflected probe light. In such context, embodiments are configured to provide one or more compensation film layers to compensate for optical effects of the enhancement panel, thereby mitigating blurring and/or other undesirable optical conditions.

20 Claims, 29 Drawing Sheets

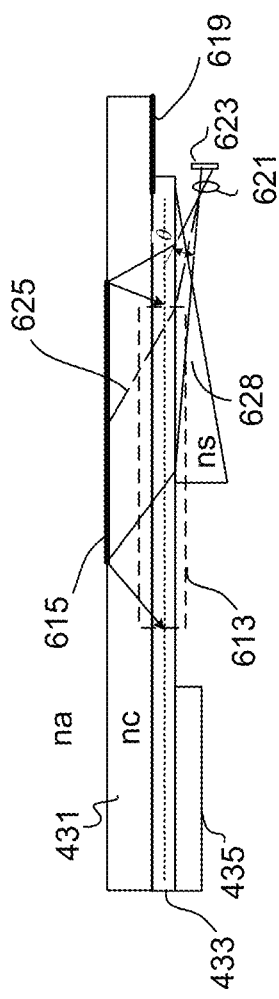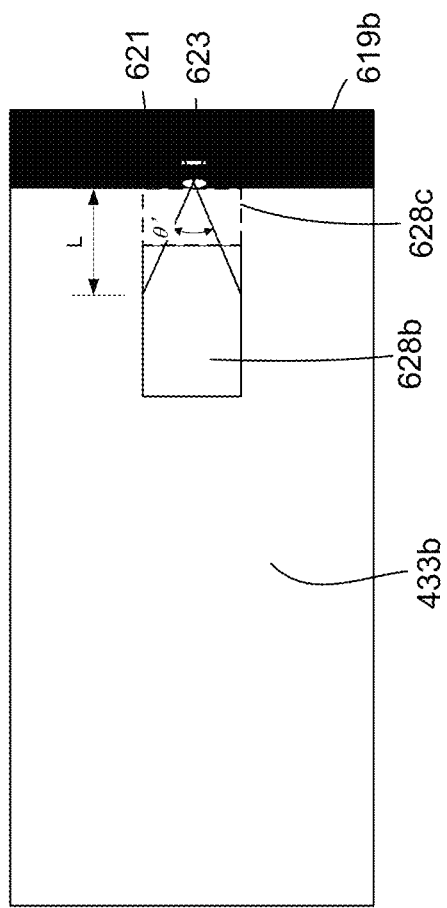
FIG. 10A
FIG. 10B

UNDER-DISPLAY OPTICAL SENSOR WITH COMPENSATED LIGHT PATHS

TECHNICAL FIELD

This disclosure relates to optical sensors, such as an under-screen optical fingerprint sensors integrated with a display panel arrangement of mobile computing device and configured to provide under-display optical sensing with compensated light paths.

BACKGROUND

Various sensors can be implemented in electronic devices or systems to provide certain desired functions. A sensor that enables user authentication is one example of sensors to protect personal data and prevent unauthorized access in various devices and systems including portable or mobile computing devices (e.g., laptops, tablets, smartphones), gaming systems, various databases, information systems or larger computer-controlled systems.

User authentication on an electronic device or system can be carried out through one or multiple forms of biometric identifiers, which can be used alone or in addition to conventional password authentication methods. A popular form of biometric identifiers is a person's fingerprint pattern. A fingerprint sensor can be built into the electronic device to read a user's fingerprint pattern so that the device can only be unlocked by an authorized user of the device through authentication of the authorized user's fingerprint pattern. Another example of sensors for electronic devices or systems is a biomedical sensor that detects a biological property of a user, e.g., a property of a user's blood, the heartbeat, in wearable devices like wrist band devices or watches. In general, different sensors can be provided in electronic devices to achieve different sensing operations and functions.

Fingerprints can be used to authenticate users for accessing electronic devices, computer-controlled systems, electronic databases or information systems, either used as a stand-alone authentication method or in combination with one or more other authentication methods such as a password authentication method. For example, electronic devices including portable or mobile computing devices, such as laptops, tablets, smartphones, and gaming systems can employ user authentication mechanisms to protect personal data and prevent unauthorized access. In another example, a computer or a computer-controlled device or system for an organization or enterprise should be secured to allow only authorized personnel to access in order to protect the information or the use of the device or system for the organization or enterprise. The information stored in portable devices and computer-controlled databases, devices or systems, may be personal in nature, such as personal contacts or phonebook, personal photos, personal health information or other personal information, or confidential information for proprietary use by an organization or enterprise, such as business financial information, employee data, trade secrets and other proprietary information. If the security of the access to the electronic device or system is compromised, these data may be accessed by others, causing loss of privacy of individuals or loss of valuable confidential information. Beyond security of information, securing access to computers and computer-controlled devices or systems also allow safeguard the use of devices or systems that are controlled by computers or computer processors such as computer-controlled automobiles and other systems such as ATMs.

Secured access to a device (e.g., a mobile device) or a system (e.g., an electronic database and a computer-controlled system) can be achieved in different ways such as the use of user passwords. A password, however, may be easily to be spread or obtained and this nature of passwords can reduce the level of the security of passwords. Moreover, since a user needs to remember a password in accessing password-protected electronic devices or systems, in the event that the user forgets the password, the user needs to undertake certain password recovery procedures to get authenticated or otherwise to regain the access to the device or system. Such processes may be burdensome to users and have various practical limitations and inconveniences. The personal fingerprint identification can be utilized to achieve the user authentication for enhancing the data security while mitigating certain undesired effects associated with passwords.

Electronic devices or systems, including portable or mobile computing devices, may employ user authentication through one or multiple forms of biometric identifiers to protect personal or other confidential data and prevent unauthorized access. A biometric identifier can be used alone or in combination with a password authentication method to provide user authentication. One form of biometric identifiers is a person's fingerprint pattern. A fingerprint sensor can be built into an electronic device or an information system to read a user's fingerprint pattern so that the device can only be unlocked by an authorized user of the device through authentication of the authorized user's fingerprint pattern.

SUMMARY

Embodiments provide optical sensing with brightness enhancement and compensated light paths. For example, embodiments can operate in context of an under-display optical fingerprint sensor integrated into an electronic device, such as a smartphone. Responsive to reflected probe light passing through a display module, a compensation structure is configured to compensate for divergent refracting of the reflected probe light caused by backlighting enhancement structures. Some embodiments operate in context of an enhancement panel having micro-prism structures that tend to blur the reflected probe light. In such context, embodiments are configured to provide one or more compensation film layers to compensate for optical effects of the enhancement panel, thereby mitigating blurring and/or other undesirable optical conditions.

BRIEF DESCRIPTION OF THE DRAWINGS

The accompanying drawings, referred to herein and constituting a part hereof, illustrate embodiments of the disclosure. The drawings together with the description serve to explain the principles of the invention.

FIGS. 6A-6C, 7, 8A-8B, 9, and 10A-10B illustrate example designs of under-screen optical fingerprint sensor modules according to some embodiments.

Figure 1:
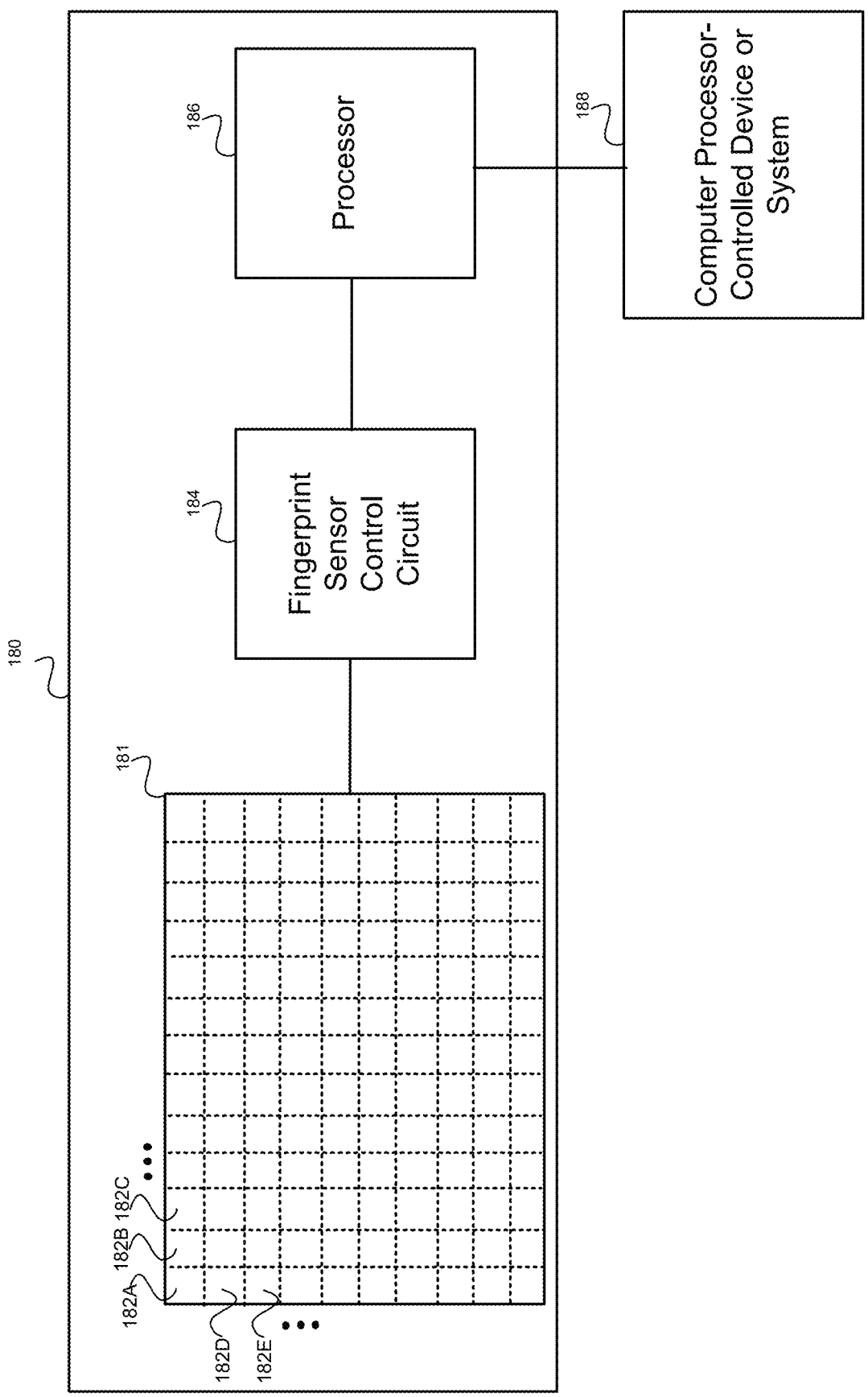
FIG. 1 is a block diagram of an example of a system with a fingerprint sensing module which can be implemented to include an optical fingerprint sensor according to some embodiments.

In the appended figures, similar components and/or features can have the same reference label. Further, various components of the same type can be distinguished by following the reference label by a second label that distinguishes among the similar components. If only the first reference label is used in the specification, the description is applicable to any one of the similar components having the same first reference label irrespective of the second reference label.

DETAILED DESCRIPTION

In the following description, numerous specific details are provided for a thorough understanding of the present invention. However, it should be appreciated by those of skill in the art that the present invention may be realized without one or more of these details. In other examples, features and techniques known in the art will not be described for purposes of brevity.

Electronic devices or systems may be equipped with fingerprint authentication mechanisms to improve the security for accessing the devices. Such electronic devices or system may include, portable or mobile computing devices, e.g., smartphones, tablet computers, wrist-worn devices and other wearable or portable devices, larger electronic devices or systems, e.g., personal computers in portable forms or desktop forms, ATMs, various terminals to various electronic systems, databases, or information systems for commercial or governmental uses, motorized transportation systems including automobiles, boats, trains, aircraft and others.

Fingerprint sensing is useful in mobile applications and other applications that use or require secure access. For example, fingerprint sensing can be used to provide secure access to a mobile device and secure financial transactions including online purchases. It is desirable to include robust and reliable fingerprint sensing suitable for mobile devices and other applications. In mobile, portable or wearable devices, it is desirable for fingerprint sensors to minimize or eliminate the footprint for fingerprint sensing given the limited space on those devices, especially considering the demands for a maximum display area on a given device. Many implementations of capacitive fingerprint sensors must be implemented on the top surface of a device due to the near-field interaction requirement of capacitive sensing.

Optical sensing modules can be designed to mitigate the above and other limitations in the capacitive fingerprint sensors and to achieve additional technical advantages. For example, in implementing an optical fingerprint sensing device, the light carrying fingerprint imagining information can be directed over distance to an optical detector array of optical detectors for detecting the fingerprint without being limited to the near-field sensing in a capacitive sensor. In particular, light carrying fingerprint imagining information can be directed to transmit through the top cover glass commonly used in many display screens such as touch sensing screens and other structures and may be directed through folded or complex optical paths to reach the optical detector array, thus allowing for flexibility in placing an optical fingerprint sensor in a device that is not available for a capacitive fingerprint sensor. Optical fingerprint sensor modules based on the technologies disclosure herein can be an under-screen optical fingerprint sensor module that is placed below a display screen to capture and detect light from a finger placed on or above the top sensing surface of the screen. As disclosed herein, optical sensing can also be used to, in addition to detecting and sensing a fingerprint pattern, optically detect other parameters associated with a user or a user action, such as whether a detected fingerprint is from a finger of a live person and to provide anti-spoofing mechanism, or certain biological parameters of the user.

I. Overview of Under-Display Optical Sensing Modules

The optical sensing technology and examples of implementations described in this disclosure provide an optical fingerprint sensor module that uses, at least in part, the light from a display screen as the illumination probe light to illuminate a fingerprint sensing area on the touch sensing surface of the display screen to perform one or more sensing operations based on optical sensing of such light. A suitable display screen for implementing the disclosed optical sensor technology can be based on various display technologies or configurations, including, a liquid crystal display (LCD) screen using a backlight to provide white light illumination to the LCD pixels and matched optical filters to effectuate colored LCD pixels, or a display screen having light emitting display pixels without using backlight where each individual pixel generates light for forming a display image on the screen such as an organic light emitting diode (OLED) display screens, or electroluminescent display screens. The specific examples provided below are directed to integration of under-screen optical sensing modules with LCD screens and thus contain certain technical details associated with LCD screens although various aspects of the disclosed technology are applicable to OLED screens and other display screens.

A portion of the light produced by a display screen for displaying images necessarily passes through the top surface of the display screen in order to be viewed by a user. A finger in touch with or near the top surface interacts with the light at the top surface to cause the reflected or scattered light at the surface area of the touch to carry spatial image information of the finger. Such reflected or scattered light carrying the spatial image information of the finger returns to the display panel underneath the top surface. In touch sensing display devices, for example, the top surface is the touch sensing interface with the user and this interaction between the light for displaying images and the user finger or hand constantly occurs but such information-carrying light returning back to the display panel is largely wasted and is not used in various touch sensing devices. In various mobile or portable devices with touch sensing displays and fingerprint sensing functions, a fingerprint sensor tends to be a separate device from the display screen, either placed on the same surface of the display screen at a location outside the display screen area such as in some models of Apple iPhones and Samsung smartphones, or placed on the backside of a smartphone, such as some models of smart phones by Huawei, Lenovo, Xiaomi or Google, to avoid taking up valuable space for placing a large display screen on the front side. Those fingerprint sensors are separate devices from the display screens and thus need to be compact to save space for the display screens and other functions while still providing reliable and fast fingerprint sensing with a spatial image resolution above a certain acceptable level. However, the need to be compact and small for designing a fingerprint sensor and the need to provide a high spatial image resolution in capturing a fingerprint pattern are in direct conflict with each other in many fingerprint sensors because a high spatial image resolution in capturing a fingerprint pattern in based on various suitable fingerprint sensing technologies (e.g., capacitive touch sensing or optical imaging) requires a large sensor area with a large number of sensing pixels.

The sensor technology and examples of implementations of the sensor technology described in this disclosure provide an optical fingerprint sensor module that uses, at least in part, the light from a display screen as the illumination probe light to illuminate a fingerprint sensing area on the touch sensing surface of the display screen to perform one or more sensing operations based on optical sensing of such light in some implementations, or designated illumination or probe light for optical sensing from one or more designated illumination light sources separate from the display light for optical sensing in other implementations, or background light for optical sensing in certain implementations.

In the disclosed examples for integrating an optical sensing module to a LCD screen based on the disclosed optical sensor technology, the under LCD optical sensor can be used to detect a portion of the light that is used for displaying images in a LCD screen where such a portion of the light for the display screen may be the scattered light, reflected light or some stray light. For example, in some implementations, the image light of the LCD screen based on backlighting may be reflected or scattered back into the LCD display screen as returned light when encountering an object such as a user finger or palm, or a user pointer device like a stylus. Such returned light can be captured for performing one or more optical sensing operations using the disclosed optical sensor technology. Due to the use of the light from LCD screen for optical sensing, an optical fingerprint sensor module based on the disclosed optical sensor technology is specially designed to be integrated to the LCD display screen in a way that maintains the display operations and functions of the LCD display screen without interference while providing optical sensing operations and functions to enhance overall functionality, device integration and user experience of an electronic device or system such as a smart phone, a tablet, or a mobile and/or wearable device.

In addition, in various implementations of the disclosed optical sensing technology, one or more designated probe light sources may be provided to produce additional illumination probe light for the optical sensing operations by the under-LCD screen optical sensing module. In such applications, the light from the backlighting of the LCD screen and the probe light from the one or more designated probe light sources collectively form the illumination light for optical sensing operations.

Regarding the additional optical sensing functions beyond fingerprint detection, the optical sensing may be used to measure other parameters. For example, the disclosed optical sensor technology can measure a pattern of a palm of a person given the large touch area available over the entire LCD display screen (in contrast, some designated fingerprint sensors such as the fingerprint sensor in the home button of Apple's iPhone/iPad devices have a rather small and designated off-screen fingerprint sensing area that is highly limited in the sensing area size that may not be suitable for sensing large patterns). For yet another example, the disclosed optical sensor technology can be used not only to use optical sensing to capture and detect a pattern of a finger or palm that is associated with a person, but also to use optical sensing or other sensing mechanisms to detect whether the captured or detected pattern of a fingerprint or palm is from a live person's hand by a "live finger" detection mechanism, which may be based on, for example, the different optical absorption behaviors of the blood at different optical wavelengths, the fact that a live person's finger tends to be moving or stretching due to the person's natural movement or motion (either intended or unintended) or pulsing when the blood flows through the person's body in connection with the heartbeat. In one implementation, the optical fingerprint sensor module can detect a change in the returned light from a finger or palm due to the heartbeat/blood flow change and thus to detect whether there is a live heartbeat in the object presented as a finger or palm. The user authentication can be based on the combination of the both the optical sensing of the fingerprint/palm pattern and the positive determination of the presence of a live person to enhance the access control. For yet another example, the optical fingerprint sensor module may include a sensing function for measuring a glucose level or a degree of oxygen saturation based on optical sensing in the returned light from a finger or palm. As yet another example, as a person touches the LCD display screen, a change in the touching force can be reflected in one or more ways, including fingerprint pattern deforming, a change in the contacting area between the finger and the screen surface, fingerprint ridge widening, or a change in the blood flow dynamics. Those and other changes can be measured by optical sensing based on the disclosed optical sensor technology and can be used to calculate the touch force. This touch force sensing can be used to add more functions to the optical fingerprint sensor module beyond the fingerprint sensing.

With respect to useful operations or control features in connection with the touch sensing aspect of the LCD display screen, the disclosed optical sensor technology can provide triggering functions or additional functions based on one or more sensing results from the optical fingerprint sensor module to perform certain operations in connection with the touch sensing control over the LCD display screen. For example, the optical property of a finger skin (e.g., the index of refraction) tends to be different from other artificial objects. Based on this, the optical fingerprint sensor module may be designed to selectively receive and detect returned light that is caused by a finger in touch with the surface of the LCD display screen while returned light caused by other objects would not be detected by the optical fingerprint sensor module. This object-selective optical detection can be used to provide useful user controls by touch sensing, such as waking up the smartphone or device only by a touch via a person's finger or palm while touches by other objects would not cause the device to wake up for energy efficient operations and to prolong the battery use. This operation can be implemented by a control based on the output of the optical fingerprint sensor module to control the waking up circuitry operation of the LCD display screen which, the LCD pixels are put in a "sleep" mode by being turned off (and the LCD backlighting is also turned off) while one or more illumination light sources (e.g., LEDs) for the under-LCD panel optical fingerprint sensor module are turned on in a flash mode to intermittently emit flash light to the screen surface for sensing any touch by a person's finger or palm. Under this design, the optical fingerprint sensor module operates the one or more illumination light sources to produce the "sleep" mode wake-up sensing light flashes so that the optical fingerprint sensor module can detect returned light of such wake-up sensing light caused by the finger touch on the LCD display screen and, upon a positive detection, the LCD backlighting and the LCD display screen are turned on or "woken up". In some implementations, the wake-up sensing light can be in the infrared invisible spectral range so a user will not experience any visual of a flash light. The LCD display screen operation can be controlled to provide an improved fingerprint sensing by eliminating background light for optical sensing of the fingerprint. In one implementation, for example, each display scan frame generates a frame of fingerprint signals. If, two frames of fingerprint signals with the display are generated in one frame when the LCD display screen is turned on and in the other frame when the LCD display screen is turned off, the subtraction between those two frames of signals can be used to reduce the ambient background light influence. By operating the fingerprint sensing frame rate is at one half of the display frame rate in some implementations, the background light noise in fingerprint sensing can be reduced.

An optical fingerprint sensor module based on the disclosed optical sensor technology can be coupled to the backside of the LCD display screen without requiring creation of a designated area on the surface side of the LCD display screen that would occupy a valuable device surface real estate in some electronic devices such as a smartphone, a tablet or a wearable device. This aspect of the disclosed technology can be used to provide certain advantages or benefits in both device designs and product integration or manufacturing.

In some implementations, an optical fingerprint sensor module based on the disclosed optical sensor technology can be configured as a non-invasive module that can be easily integrated to a display screen without requiring changing the design of the LCD display screen for providing a desired optical sensing function such as fingerprint sensing. In this regard, an optical fingerprint sensor module based on the disclosed optical sensor technology can be independent from the design of a particular LCD display screen design due to the nature of the optical fingerprint sensor module: the optical sensing of such an optical fingerprint sensor module is by detecting the light that is emitted by the one or more illumination light sources of the optical fingerprint sensor module and is returned from the top surface of the display area, and the disclosed optical fingerprint sensor module is coupled to the backside of the LCD display screen as a under-screen optical fingerprint sensor module for receiving the returned light from the top surface of the display area and thus does not require a special sensing port or sensing area that is separate from the display screen area. Accordingly, such an under-screen optical fingerprint sensor module can be used to combine with a LCD display screen to provide optical fingerprint sensing and other sensor functions on an LCD display screen without using a specially designed LCD display screen with hardware especially designed for providing such optical sensing. This aspect of the disclosed optical sensor technology enables a wide range of LCD display screens in smartphones, tablets or other electronic devices with enhanced functions from the optical sensing of the disclosed optical sensor technology.

For example, for an existing phone assembly design that does not provide a separate fingerprint sensor as in certain Apple iPhones or Samsung Galaxy smartphones, such an existing phone assembly design can integrate the under-screen optical fingerprint sensor module as disclosed herein without changing the touch sensing-display screen assembly to provide an added on-screen fingerprint sensing function. Because the disclosed optical sensing does not require a separate designated sensing area or port as in the case of certain Apple iPhones/Samsung Galaxy phones with a front fingerprint sensor outside the display screen area, or some smartphones with a designated rear fingerprint sensor on the backside like in some models by Huawei, Xiaomi, Google or Lenovo, the integration of the on-screen fingerprint sensing disclosed herein does not require a substantial change to the existing phone assembly design or the touch sensing display module that has both the touch sensing layers and the display layers. Based on the disclosed optical sensing technology in this document, no external sensing port and no external hardware button are needed on the exterior of a device are needed for adding the disclosed optical fingerprint sensor module for fingerprint sensing. The added optical fingerprint sensor module and the related circuitry are under the display screen inside the phone housing and the fingerprint sensing can be conveniently performed on the same touch sensing surface for the touch screen.

For another example, due to the above described nature of the optical fingerprint sensor module for fingerprint sensing, a smartphone that integrates such an optical fingerprint sensor module can be updated with improved designs, functions and integration mechanism without affecting or burdening the design or manufacturing of the LCD display screens to provide desired flexibility to device manufacturing and improvements/upgrades in product cycles while maintaining the availability of newer versions of optical sensing functions to smartphones, tablets or other electronic devices using LCD display screens. Specifically, the touch sensing layers or the LCD display layers may be updated in the next product release without adding any significant hardware change for the fingerprint sensing feature using the disclosed under-screen optical fingerprint sensor module. Also, improved on-screen optical sensing for fingerprint sensing or other optical sensing functions by such an optical fingerprint sensor module can be added to a new product release by using a new version of the under-screen optical fingerprint sensor module without requiring significant changes to the phone assembly designs, including adding additional optical sensing functions.

The above and other features of the disclosed optical sensor technology can be implemented to provide a new generation of electronic devices with improved fingerprint sensing and other sensing functions, especially for smartphones, tablets and other electronic devices with LCD display screens to provide various touch sensing operations and functions and to enhance the user experience in such devices. The features for optical fingerprint sensor modules disclosed herein may be applicable to various display panels based on different technologies including both LCD and OLED displays. The specific examples below are directed to LCD display panels and optical fingerprint sensor modules placed under LCD display panels.

In implementations of the disclosed technical features, additional sensing functions or sensing modules, such as a biomedical sensor, e.g., a heartbeat sensor in wearable devices like wrist band devices or watches, may be provided. In general, different sensors can be provided in electronic devices or systems to achieve different sensing operations and functions.

The disclosed technology can be implemented to provide devices, systems, and techniques that perform optical sensing of human fingerprints and authentication for authenticating an access attempt to a locked computer-controlled device such as a mobile device or a computer-controlled system, that is equipped with a fingerprint detection module. The disclosed technology can be used for securing access to various electronic devices and systems, including portable or mobile computing devices such as laptops, tablets, smartphones, and gaming devices, and other electronic devices or systems such as electronic databases, automobiles, bank ATMs, etc.

II. Design Examples of Under-Display Optical Sensing Modules

As described herein, embodiments provide large-sensing-area implementations of under-display optical sensing modules, such as for under-display optical fingerprint modules. For the sake of added clarity and context, examples are described of various designs for an under-screen optical fingerprint sensor module for collecting an optical signal to the optical detectors and providing desired optical imaging such as a sufficient imaging resolution. These and other embodiments of under-display optical fingerprint sensing implementations are further described in the following patent documents, which are hereby incorporated by reference in their entirety: U.S. patent application Ser. No. 15/616,856; U.S. patent application Ser. No. 15/421,249; U.S. patent application Ser. No. 16/190,138; U.S. patent application Ser. No. 16/190,141; U.S. patent application Ser. No. 16/246,549; and U.S. patent application Ser. No. 16/427,269.

FIG. 1 is a block diagram of an example of a system 180 with a fingerprint sensing module 180 including a fingerprint sensor 181 which can be implemented to include an optical fingerprint sensor based on the optical sensing of fingerprints as disclosed in this document. The system 180 includes a fingerprint sensor control circuit 184, and a digital processor 186 which may include one or more processors for processing fingerprint patterns and determining whether an input fingerprint pattern is one for an authorized user. The fingerprint sensing system 180 uses the fingerprint sensor 181 to obtain a fingerprint and compares the obtained fingerprint to a stored fingerprint to enable or disable functionality in a device or system 188 that is secured by the fingerprint sensing system 180. In operation, the access to the device 188 is controlled by the fingerprint processing processor 186 based on whether the captured user fingerprint is from an authorized user. As illustrated, the fingerprint sensor 181 may include multiple fingerprint sensing pixels such as pixels 182A-182E that collectively represent at least a portion of a fingerprint. For example, the fingerprint sensing system 180 may be implemented at an ATM as the system 188 to determine the fingerprint of a customer requesting to access funds or other transactions. Based on a comparison of the customer's fingerprint obtained from the fingerprint sensor 181 to one or more stored fingerprints, the fingerprint sensing system 180 may, upon a positive identification, cause the ATM system 188 to grant the requested access to the user account, or, upon a negative identification, may deny the access. For another example, the device or system 188 may be a smartphone or a portable device and the fingerprint sensing system 180 is a module integrated to the device 188. For another example, the device or system 188 may be a gate or secured entrance to a facility or home that uses the fingerprint sensor 181 to grant or deny entrance. For yet another example, the device or system 188 may be an automobile or other vehicle that uses the fingerprint sensor 181 to link to the start of the engine and to identify whether a person is authorized to operate the automobile or vehicle.

Figure 2A:
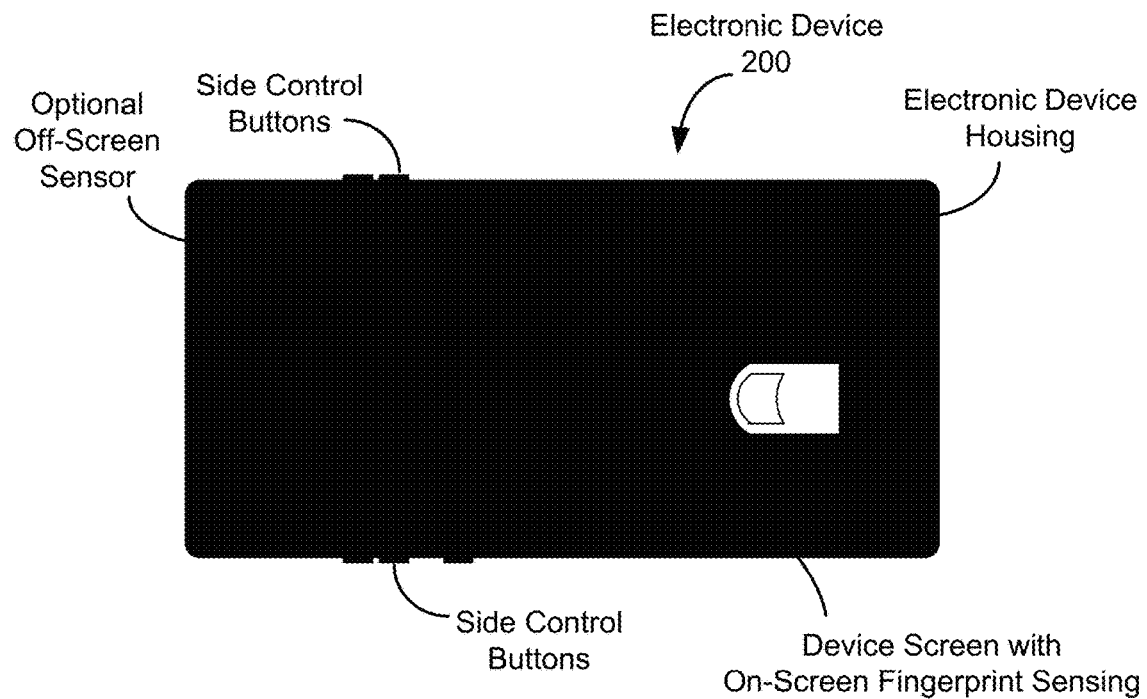
FIGS. 2A and 2B illustrate an exemplary implementation of an electronic device having a touch sensing display screen assembly and an optical fingerprint sensor module positioned underneath the touch sensing display screen assembly according to some embodiments.
Figure 2B:
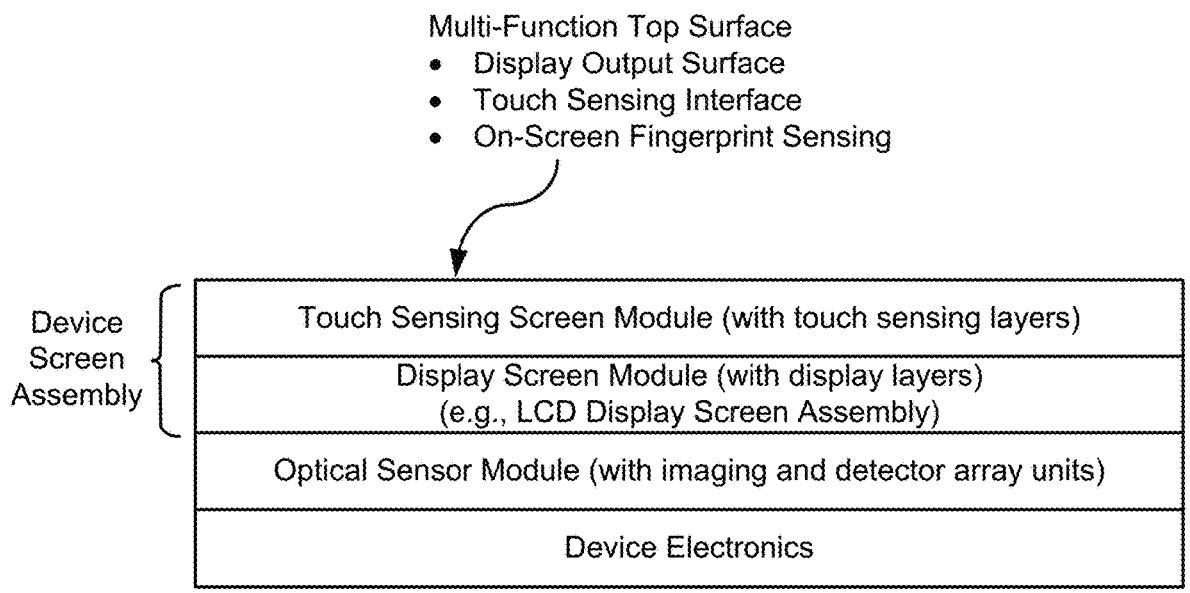

As a specific example, FIGS. 2A and 2B illustrate one exemplary implementation of an electronic device 200 having a touch sensing display screen assembly and an optical fingerprint sensor module positioned underneath the touch sensing display screen assembly. In this particular example, the display technology can be implemented by a LCD display screen with backlight for optically illuminating the LCD pixels or another display screen having light emitting display pixels without using backlight (e.g., an OLED display screen). The electronic device 200 can be a portable device such as a smartphone or a tablet and can be the device 188 as shown in FIG. 1.

FIG. 2A shows the front side of the device 200 which may resemble some features in some existing smartphones or tablets. The device screen is on the front side of the device 200 occupying either entirety, a majority or a significant portion of the front side space and the fingerprint sensing function is provided on the device screen, e.g., one or more sensing areas for receiving a finger on the device screen. As an example, FIG. 2A shows a fingerprint sensing zone in the device screen for a finger to touch which may be illuminated as a visibly identifiable zone or area for a user to place a finger for fingerprint sensing. Such a fingerprint sensing zone can function like the rest of the device screen for displaying images. As illustrated, the device housing of the device 200 may have, in various implementations, side facets that support side control buttons that are common in various smartphones on the market today. Also, one or more optional sensors may be provided on the front side of the device 200 outside the device screen as illustrated by one example on the left upper corner of the device housing in FIG. 2A.

FIG. 2B shows an example of the structural construction of the modules in the device 200 relevant to the optical fingerprint sensing disclosed in this document. The device screen assembly shown in FIG. 2B includes, e.g., the touch sensing screen module with touch sensing layers on the top, and a display screen module with display layers located underneath the touch sensing screen module. An optical fingerprint sensor module is coupled to, and located underneath, the display screen assembly module to receive and capture the returned light from the top surface of the touch sensing screen module and to guide and image the returned light onto an optical sensor array of optical sensing pixels or photodetectors which convert the optical image in the returned light into pixel signals for further processing. Underneath the optical fingerprint sensor module is the device electronics structure containing certain electronic circuits for the optical fingerprint sensor module and other parts in the device 200. The device electronics may be arranged inside the device housing and may include a part that is under the optical fingerprint sensor module as shown in FIG. 2B.

In implementations, the top surface of the device screen assembly can be a surface of an optically transparent layer serving as a user touch sensing surface to provide multiple functions, such as (1) a display output surface through which the light carrying the display images passes through to reach a viewer's eyes, (2) a touch sensing interface to receive a user's touches for the touch sensing operations by the touch sensing screen module, and (3) an optical interface for on-screen fingerprint sensing (and possibly one or more other optical sensing functions). This optically transparent layer can be a rigid layer such as a glass or crystal layer or a flexible layer.

One example of a display screen is an LCD display having LCD layers and a thin film transistor (TFT) structure or substrate. A LCD display panel is a multi-layer liquid crystal display (LCD) module that includes LCD display backlighting light sources (e.g., LED lights) emitting LCD illumination light for LCD pixels, a light waveguide layer to guide the backlighting light, and LCD structure layers which can include, e.g., a layer of liquid crystal (LC) cells, LCD electrodes, transparent conductive ITO layer, an optical polarizer layer, a color filter layer, and a touch sensing layer. The LCD module also includes a backlighting diffuser underneath the LCD structure layers and above the light waveguide layer to spatially spread the backlighting light for illuminating the LCD display pixels, and an optical reflector film layer underneath the light waveguide layer to recycle backlighting light towards the LCD structure layers for improved light use efficiency and the display brightness. For optical sensing, one or more separate illumination light sources are provided and are operated independently from the backlighting light sources of the LCD display module.

Referring to FIG. 2B, the optical fingerprint sensor module in this example is placed under the LCD display panel to capture the returned light from the top touch sensing surface and to acquire high resolution images of fingerprint patterns when user's finger is in touch with a sensing area on the top surface. In other implementations, the disclosed under-screen optical fingerprint sensor module for fingerprint sensing may be implemented on a device without the touch sensing feature.

Figure 3A:
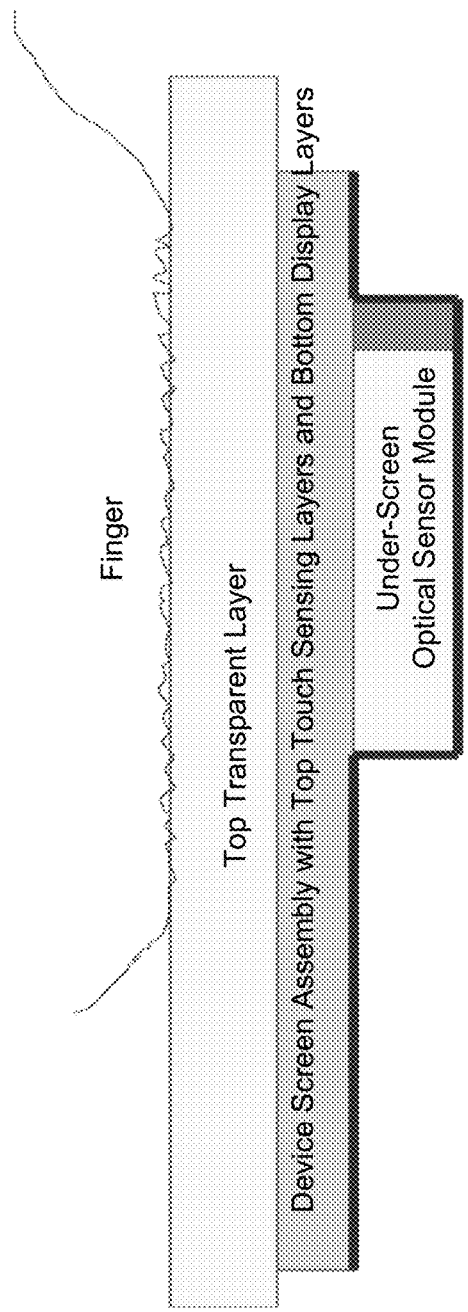
FIGS. 3A and 3B illustrate an example of a device that implements the optical fingerprint sensor module illustrated in FIGS. 2A and 2B according to some embodiments.
Figure 3B:
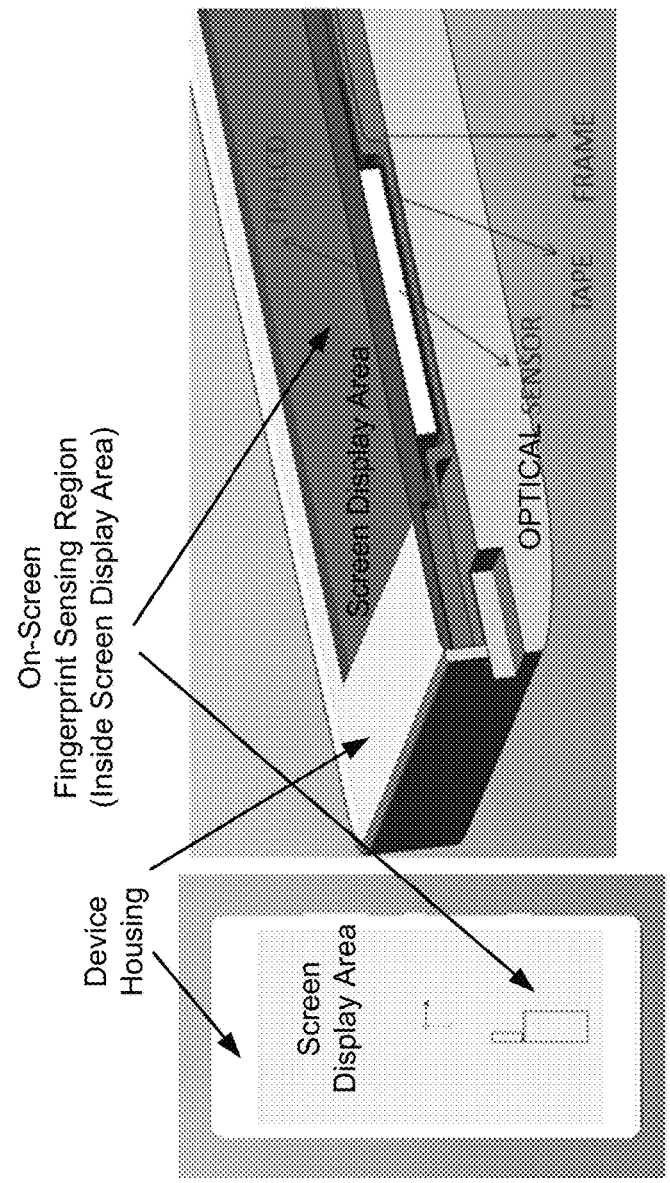

FIGS. 3A and 3B illustrate an example of a device that implements the optical fingerprint sensor module in FIGS. 2A and 2B. FIG. 3A shows a cross sectional view of a portion of the device containing the under-screen optical fingerprint sensor module. FIG. 3B shows, on the left, a view of the front side of the device with the touch sensing display indicating a fingerprint sensing area on the lower part of the display screen, and on the right, a perspective view of a part of the device containing the optical fingerprint sensor module that is under the device display screen assembly. FIG. 3B also shows an example of the layout of the flexible tape with circuit elements.

In the design examples in FIGS. 2A-2B, and 3A-3B, the optical fingerprint sensor design is different from some other fingerprint sensor designs using a separate fingerprint sensor structure from the display screen with a physical demarcation between the display screen and the fingerprint sensor (e.g., a button like structure in an opening of the top glass cover in some mobile phone designs) on the surface of the mobile device. In the illustrated designs here, the optical fingerprint sensor for detecting fingerprint sensing and other optical signals are located under the top cover glass or layer (e.g., FIG. 3A) so that the top surface of the cover glass serves as the top surface of the mobile device as a contiguous and uniform glass surface across both the display screen layers and the optical detector sensor that are vertically stacked and vertically overlap. This design example for integrating optical fingerprint sensing and the touch sensitive display screen under a common and uniform surface provides benefits, including improved device integration, enhanced device packaging, enhanced device resistance to exterior elements, failure and wear and tear, and enhanced user experience over the ownership period of the device.

Referring back to FIGS. 2A and 2B, the illustrated under-screen optical fingerprint sensor module for on-screen fingerprint sensing may be implemented in various configurations. In one implementation, a device based on the above design can be structured to include a device screen a that provides touch sensing operations and includes a LCD display panel structure for forming a display image, a top transparent layer formed over the device screen as an interface for being touched by a user for the touch sensing operations and for transmitting the light from the display structure to display images to a user, and an optical fingerprint sensor module located below the display panel structure to receive light that returns from the top transparent layer to detect a fingerprint.

This device and other devices disclosed herein can be further configured to include various features. For example, a device electronic control module can be included in the device to grant a user's access to the device if a detected fingerprint matches a fingerprint an authorized user. In addition, the optical fingerprint sensor module is configured to, in addition to detecting fingerprints, also detect a biometric parameter different form a fingerprint by optical sensing to indicate whether a touch at the top transparent layer associated with a detected fingerprint is from a live person, and the device electronic control module is configured to grant a user's access to the device if both (1) a detected fingerprint matches a fingerprint an authorized user and (2) the detected biometric parameter indicates the detected fingerprint is from a live person. The biometric parameter can include, e.g., whether the finger contains a blood flow, or a heartbeat of a person.

For example, the device can include a device electronic control module coupled to the display panel structure to supply power to the light emitting display pixels and to control image display by the display panel structure, and, in a fingerprint sensing operation, the device electronic control module operates to turn off the light emitting display pixels in one frame to and turn on the light emitting display pixels in a next frame to allow the optical sensor array to capture two fingerprint images with and without the illumination by the light emitting display pixels to reduce background light in fingerprint sensing.

For another example, a device electronic control module may be coupled to the display panel structure to supply power to the LCD display panel and to turn off power to the backlighting of the LCD display panel in a sleep mode, and the device electronic control module may be configured to wake up the display panel structure from the sleep mode when the optical fingerprint sensor module detects the presence of a person's skin at the designated fingerprint sensing region of the top transparent layer. More specifically, in some implementations, the device electronic control module can be configured to operate one or more illumination light sources in the optical fingerprint sensor module to intermittently emit light, while turning off power to the LCD display panel (in the sleep mode), to direct the intermittently emitted illumination light to the designated fingerprint sensing region of the top transparent layer for monitoring whether there is a person's skin in contact with the designated fingerprint sensing region for waking up the device from the sleep mode.

For another example, the device can include a device electronic control module coupled to the optical fingerprint sensor module to receive information on multiple detected fingerprints obtained from sensing a touch of a finger and the device electronic control module is operated to measure a change in the multiple detected fingerprints and determines a touch force that causes the measured change. For instance, the change may include a change in the fingerprint image due to the touch force, a change in the touch area due to the touch force, or a change in spacing of fingerprint ridges.

For another example, the top transparent layer can include a designated fingerprint sensing region for a user to touch with a finger for fingerprint sensing and the optical fingerprint sensor module below the display panel structure can include a transparent block in contact with the display panel substrate to receive light that is emitted from the display panel structure and returned from the top transparent layer, an optical sensor array that receives the light and an optical imaging module that images the received light in the transparent block onto the optical sensor array. The optical fingerprint sensor module can be positioned relative to the designated fingerprint sensing region and structured to selectively receive returned light via total internal reflection at the top surface of the top transparent layer when in contact with a person's skin while not receiving the returned light from the designated fingerprint sensing region in absence of a contact by a person's skin.

For yet another example, the optical fingerprint sensor module can be structured to include an optical wedge located below the display panel structure to modify a total reflection condition on a bottom surface of the display panel structure that interfaces with the optical wedge to permit extraction of light out of the display panel structure through the bottom surface, an optical sensor array that receives the light from the optical wedge extracted from the display panel structure, and an optical imaging module located between the optical wedge and the optical sensor array to image the light from the optical wedge onto the optical sensor array.

Figure 4A:
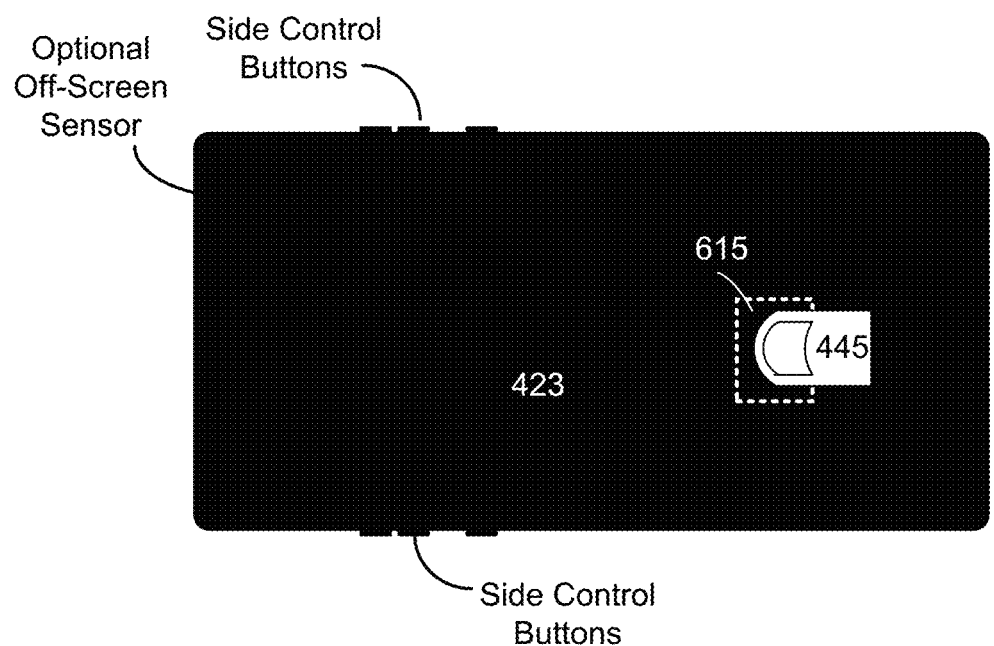
FIGS. 4A and 4B show an exemplary implementation of an optical fingerprint sensor module under the display screen assembly for implementing the design illustrated in FIGS. 2A and 2B according to some embodiments.
Figure 4B:
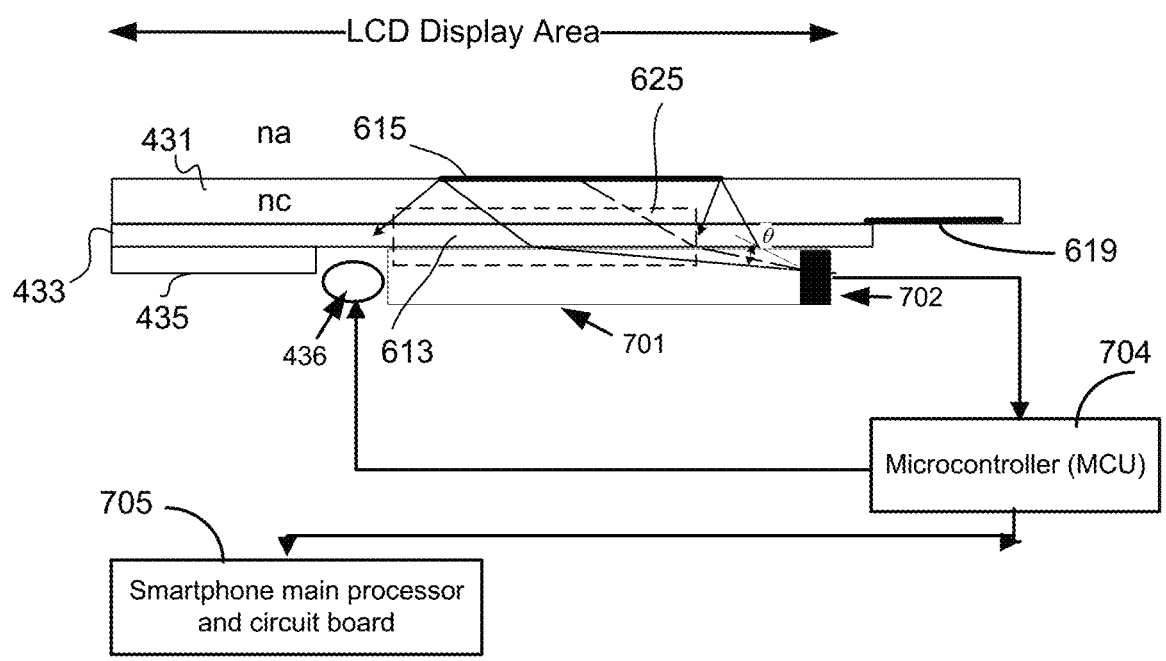

FIGS. 4A and 4B show an example of one implementation of an optical fingerprint sensor module under the display screen assembly for implementing the design in FIGS. 2A and 2B. The device illustrated in FIGS. 4A and 4B includes a display assembly 423 with a top transparent layer 431 formed over the device screen assembly 423 as an interface for being touched by a user for the touch sensing operations and for transmitting the light from the display structure to display images to a user. This top transparent layer 431 can be a cover glass or a crystal material in some implementations. The device screen assembly 423 can include a LCD display module 433 under the top transparent layer 431. The LCD display layers allow partial optical transmission so light from the top surface can partially transmit through the LCD display layers to reach the under-LCD optical fingerprint sensor module. For example, LCD display layers include electrodes and wiring structure optically acting as an array of holes and light scattering objects. A device circuit module 435 may be provided under the LCD display panel to control operations of the device and perform functions for the user to operate the device.

The optical fingerprint sensor module 702 in this particular implementation example is placed under LCD display module 433. One or more illumination light sources, e.g., an illumination light source 436 under the LCD display module 433 or/and another one or more illumination light sources located under the top cover glass 431, are provided for providing the illumination light or probe light for the optical sensing by the optical fingerprint sensor module 702 and can be controlled to emit light to at least partially pass through the LCD display module 433 to illuminate the fingerprint sensing zone 615 on the top transparent layer 431 within the device screen area for a user to place a finger therein for fingerprint identification. The illumination light from the one or more illumination light sources 436 can be directed to the fingerprint sensing area 615 on the top surface as if such illumination light is from a fingerprint illumination light zone 613. Another one or more illumination light sources may be located under the top cover glass 431 and may be placed adjacent to the fingerprint sensing area 615 on the top surface to direct produced illumination light to reach the top cover glass 433 without passing through the LCD display module 433. In some designs, one or more illumination light sources may be located above the bottom surface of the top cover glass 431 to direct produced illumination light to reach the fingerprint sensing region above the top surface of the top cover glass 433 without necessarily passing through the top cover glass 431, e.g., directing illuminating the finger above the top cover glass 431.

As illustrated in FIG. 4A, a finger 445 is placed in the illuminated fingerprint sensing zone 615 as the effective sensing zone for fingerprint sensing. A portion of the reflected or scattered light in the zone 615 is directed into the optical fingerprint sensor module underneath the LCD display module 433 and a photodetector sensing array inside the optical fingerprint sensor module receives such light and captures the fingerprint pattern information carried by the received light. The one or more illumination light sources 436 are separate from the backlighting sources for the LCD display module and are operated independently from the backlighting light sources of the LCD display module.

In this design of using one or more illumination light sources 436 to provide the illumination light for optical fingerprint sensing, each illumination light source 436 maybe controlled in some implementations to turn on intermittently with a relatively low cycle to reduce the power used for the optical sensing operations. The fingerprint sensing operation can be implemented in a two-step process in some implementations: first, the one or more illumination light sources 436 are turned on in a flashing mode without turning on the LCD display panel to use the flashing light to sense whether a finger touches the sensing zone 615 and, once a touch in the zone 615 is detected, the optical sensing module is operated to perform the fingerprint sensing based on optical sensing and the LCD display panel may be turned on.

In the example in FIG. 4B, the under-screen optical fingerprint sensor module includes a transparent block 701 that is coupled to the display panel to receive the returned light from the top surface of the device assembly, and an optical imaging block 702 that performs the optical imaging and imaging capturing. Light from the one or more illumination light sources 436, after reaching the cover top surface, e.g., the cover top surface at the sensing area 615 where a user finger touches or is located without touching the cover top surface, is reflected or scattered back from the cover top surface in a design in which the illumination light source 436 is located to direct the illumination light to first transmit through the top cover glass 431 to reach the finger. When fingerprint ridges in contact of the cover top surface in the sensing area 615, the light reflection under the fingerprint ridges is different, due to the presence of the skin or tissue of the finger in contact at that location, from the light reflection at another location under the fingerprint valley, where the skin or tissue of the finger is absent. This difference in light reflection conditions at the locations of the ridges and valleys in the touched finger area on the cover top surface forms an image representing an image or spatial distribution of the ridges and valleys of the touched section of the finger. The reflection light is directed back towards the LCD display module 433, and, after passing through the small holes of the LCD display module 433, reaches the interface with the low index optically transparent block 701 of the optical fingerprint sensor module. The low index optically transparent block 701 is constructed to have a refractive index less than a refractive index of the LCD display panel so that the returned light can be extracted out of the LCD display panel into the optically transparent block 701. Once the returned light is received inside the optically transparent block 701, such received light enters the optical imaging unit as part of the imaging sensing block 702 and is imaged onto the photodetector sensing array or optical sensing array inside the block 702. The light reflection differences between fingerprint ridges and valleys create the contrast of the fingerprint image. As shown in FIG. 4B, a control circuit 704 (e.g., a microcontroller or MCU) is coupled to the imaging sensing block 702 and to other circuitry such as the device main processor 705 on a main circuit board.

In this particular example, the optical light path design is structured so that the illumination light enters the cover top surface within the total reflection angles on the top surface between the substrate and air interface and, therefore, the reflected light is collected most effectively by the imaging optics and imaging sensor array in the block 702. In this design, the image of the fingerprint ridge/valley area exhibits a maximum contrast due to the total internal reflection condition at each finger valley location where the finger tissue does not touch the top cover surface of the top cover glass 431. Some implementations of such an imaging system may have undesired optical distortions that would adversely affect the fingerprint sensing. Accordingly, the acquired image may be further corrected by a distortion correction during the imaging reconstruction in processing the output signals of the optical sensor array in the block 702 based on the optical distortion profile along the light paths of the returned light at the optical sensor array. The distortion correction coefficients can be generated by images captured at each photodetector pixel by scanning a test image pattern one line pixel at a time, through the whole sensing area in both X direction lines and Y direction lines. This correction process can also use images from tuning each individual pixel on one at a time, and scanning through the whole image area of the photodetector array. This correction coefficients only need to be generated one time after assembly of the sensor.

The background light from environment (e.g., sunlight or room illumination light) may enter the image sensor through the LCD panel top surface, and through holes in the LCD display assembly 433. Such background light can create a background baseline in the interested images from a finger and thus may undesirably degrade the contrast of a captured image. Different methods can be used to reduce this undesired baseline intensity caused by the background light. One example is to tune on and off the illumination light source 436 at a certain illumination modulation frequency f and the image sensor accordingly acquires the received images at the same illumination modulation frequency by phase synchronizing the light source driving pulse and image sensor frame. Under this operation, only one of the image phases contain light from the light source. In implementing this technique, the imaging capturing can be timed to capture images with the illumination light on at even (or odd) frames while turning off the illumination light at odd (or even) frames and, accordingly, subtracting even and odd frames can be used to obtain an image which is mostly formed by light emitted from the modulated illumination light source with significantly reduced background light. Based on this design, each display scan frame generates a frame of fingerprint signals and two sequential frames of signals are obtained by turning on the illumination light in one frame and off in the other frame. The subtraction of adjacent frames can be used to minimize or substantially reduce the ambient background light influence. In implementations, the fingerprint sensing frame rate can be one half of the display frame rate.

In the example shown in FIG. 4B, a portion of the light from the one or more illumination light sources 436 may also go through the cover top surface and enter the finger tissues. This part of the illumination light is scattered around and a part of this scattered light may be eventually collected by the imaging sensor array in the optical fingerprint sensor module 702. The light intensity of this scattered light is a result of interacting with the inner tissues of the finger and thus depends on the finger's skin color, the blood concentration in the finger tissue or the inner finger tissues. Such information of the finger is carried by this scattered light on the finger, is useful for fingerprint sensing, and can be detected as part of the fingerprint sensing operation. For example, the intensity of a region of user's finger image can be integrated in detection for measuring or observing in increase or decrease in the blood concentration that is associated with or depends on the phase of the user's heart-beat. This signature can be used to determine the user's heart beat rate, to determine if the user's finger is a live finger, or to provide a spoof device with a fabricated fingerprint pattern. Additional examples of using information in light carrying information on the inner tissues of a finger are provided in later sections of this patent document.

The one or more illumination light sources 436 in FIG. 4B can be designed to emit illumination light of different colors or wavelengths in some designs and the optical fingerprint sensor module can capture returned light from a person's finger at the different colors or wavelengths. By recording the corresponding measured intensity of the returned light at the different colors or wavelengths, information associated with the user's skin color, the blood flow or inner tissue structures inside the finger can be measured or determined. As an example, when a user registers a finger for fingerprint authentication operation, the optical fingerprint sensor can be operated to measure the intensity of the scatter light from the finger at two different colors or illumination light wavelengths associated with light color A and light color B, as intensities Ia and Ib, respectively. The ratio of Ia/Ib could be recorded to compare with later measurement when the user's finger is placed on the sensing area on the top sensing surface to measure the fingerprint. This method can be used as part of the device's anti spoofing system to reject a spoof device that is fabricated with a fingerprint emulating or being identical to a user's fingerprint but may not match user's skin color or other biological information of the user.

The one or more illumination light sources 436 can be controlled by the same electronics 704 (e.g., MCU) for controlling the image sensor array in the block 702. The one or more illumination light sources 436 can be pulsed for a short time (e.g., at a low duty cycle) to emit light intermittently and to provide pulse light for image sensing. The image sensor array can be operated to monitor the light pattern at the same pulse duty cycle. If there is a human finger touching the sensing area 615 on the screen, the image that is captured at the imaging sensing array in the block 702 can be used to detect the touching event. The control electronics or MCU 704 connected to the image sensor array in the block 702 can be operated to determine if the touch is by a human finger touch. If it is confirmed that it is a human finger touch event, the MCU 704 can be operated to wake up the smartphone system, turn on the one or more illumination light sources 436 for performing the optical fingerprint sensing), and use the normal mode to acquire a full fingerprint image. The image sensor array in the block 702 sends the acquired fingerprint image to the smartphone main processor 705 which can be operated to match the captured fingerprint image to the registered fingerprint database. If there is a match, the smartphone unlocks the phone to allow a user to access the phone and start the normal operation. If the captured image is not matched, the smartphone produces a feedback to user that the authentication is failed and maintains the locking status of the phone. The user may try to go through the fingerprint sensing again, or may input a passcode as an alternative way to unlock the phone.

In the example illustrated in FIGS. 4A and 4B, the under-screen optical fingerprint sensor module uses the optically transparent block 701 and the imaging sensing block 702 with the photodetector sensing array to optically image the fingerprint pattern of a touching finger in contact with the top surface of the display screen onto the photodetector sensing array. The optical imaging axis or detection axis 625 from the sensing zone 615 to the photodetector array in the block 702 is illustrated in FIG. 4B for the illustrated example. The optically transparent block 701 and the front end of the imaging sensing block 702 before the photodetector sensing array forma a bulk imaging module to achieve proper imaging for the optical fingerprint sensing. Due to the optical distortions in this imaging process, a distortion correction can be used to achieve the desired imaging operation.

In the optical sensing by the under-screen optical fingerprint sensor module in FIGS. 4A and 4B and other designs disclosed herein, the optical signal from the sensing zone 615 on the top transparent layer 431 to the under-screen optical fingerprint sensor module include different light components.

Figure 5A:
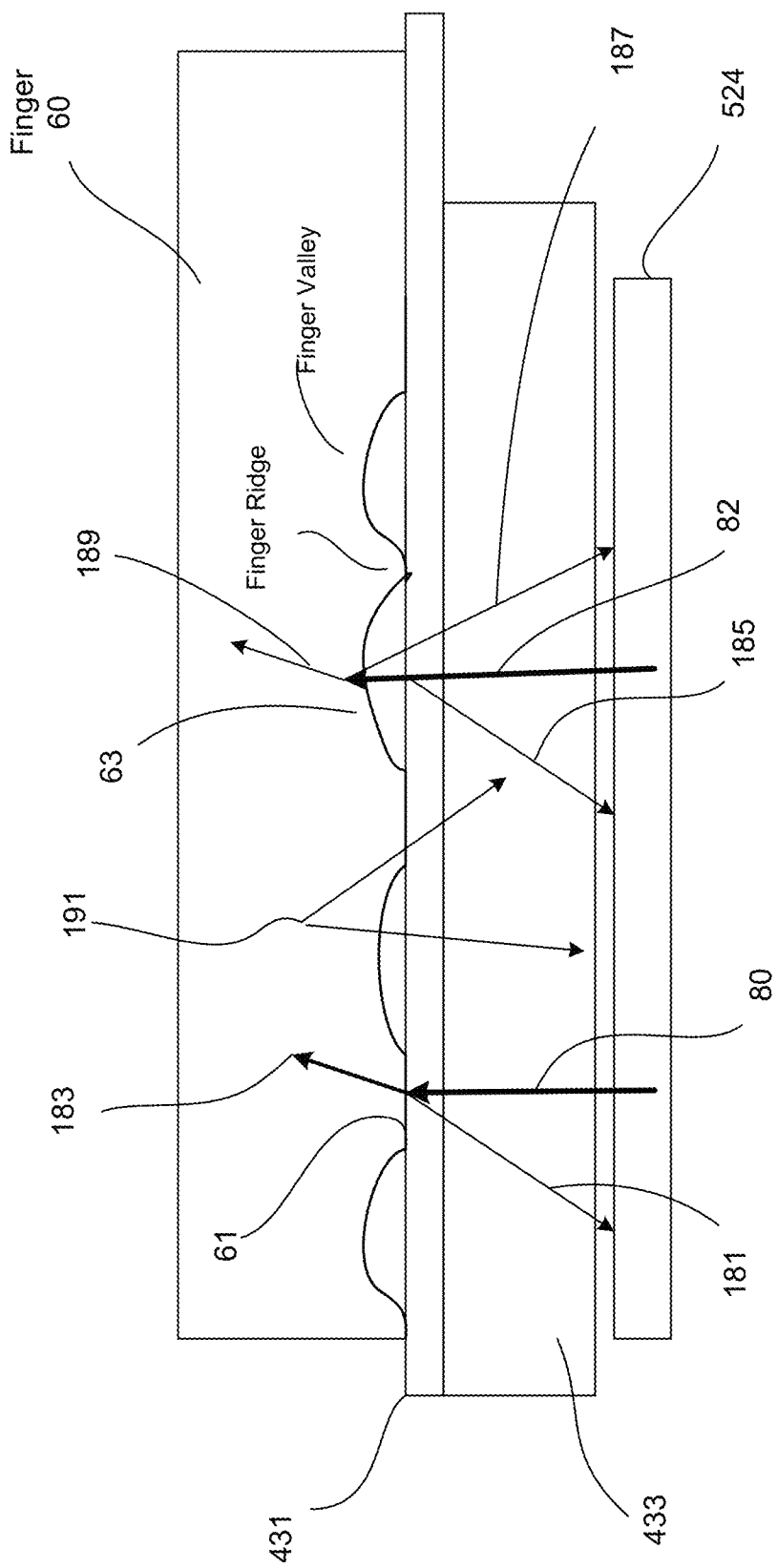
FIGS. 5A-5C illustrate signal generation for the returned light from the sensing zone on the top sensing surface under two different optical conditions to facilitate the understanding of the operation of an under-screen optical fingerprint sensor module according to some embodiments.
Figure 5B:
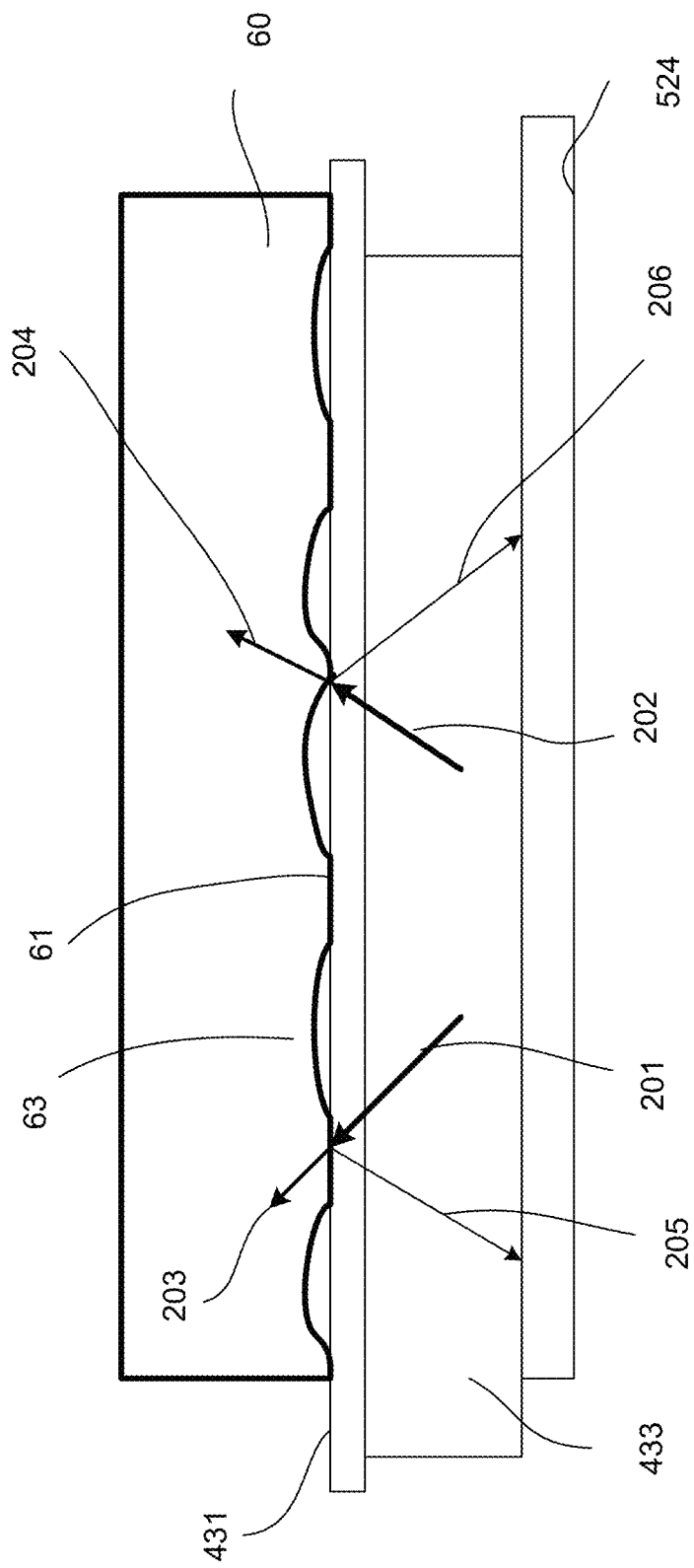
Figure 5C:
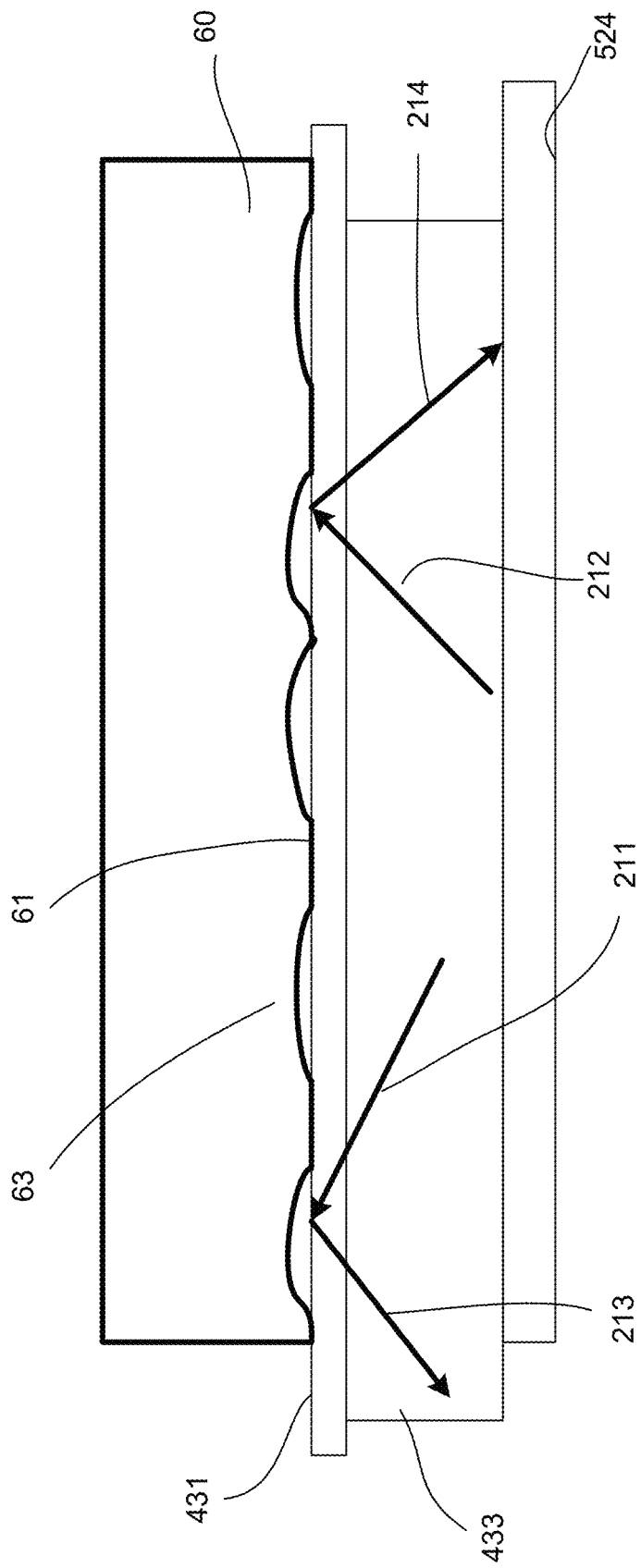

FIGS. 5A-5C illustrate signal generation for the returned light from the sensing zone 615 under different optical conditions to facilitate the understanding of the operation of the under-screen optical fingerprint sensor module. The light that enters into the finger, either from the illumination light source or from other light sources (e.g., background light) can generate internally scattered light in tissues below the finger surface, such as the scattered light 191 in FIGS. 5A-5C. Such internally scattered light in tissues below the finger surface can propagate through the internal tissues of the finger and subsequently transmits through the finger skin to enter the top transparent layer 431 carrying certain information is not carried by light that is scattered, refracted or reflected by the finger surface, e.g., information on finger skin color, the blood concentration or flow characteristics inside the finger, or an optical transmissive pattern of the finger that contains both (1) a two-dimensional spatial pattern of external ridges and valleys of a fingerprint (2) an internal fingerprint pattern associated with internal finger tissue structures that give rise to the external ridges and valleys of a finger.

FIG. 5A shows an example of how illumination light from the one or more illumination light sources 436 propagates through the OLED display module 433, after transmitting through the top transparent layer 431, and generates different returned light signals including light signals that carry fingerprint pattern information to the under-screen optical fingerprint sensor module. For simplicity, two illumination rays 80 and 82 at two different locations are directed to the top transparent layer 431 without experiencing total reflection at the interfaces of the top transparent layer 431. Specifically, the illumination light rays 80 and 82 are perpendicular or nearly perpendicular to the top layer 431. A finger 60 is in contact with the sensing zone 615 on the e top transparent layer 431. As illustrated, the illumination light beam 80 reaches to a finger ridge in contact with the top transparent layer 431 after transmitting through the top transparent layer 431 to generate the light beam 183 in the finger tissue and another light beam 181 back towards the LCD display module 433. The illumination light beam 82 reaches to a finger valley located above the top transparent layer 431 after transmitting through the top transparent layer 431 to generate the reflected light beam 185 from the interface with the top transparent layer 431 back towards the LCD display module 433, a second light beam 189 that enters the finger tissue and a third light beam 187 reflected by the finger valley.

In the example in FIG. 5A, it is assumed that the finger skin's equivalent index of refraction is about 1.44 at 550 nm and the cover glass index of refraction is about 1.51 for the top transparent layer 431. The finger ridge-cover glass interface reflects part of the beam 80 as reflected light 181 to bottom layers 524 below the LCD display module 433. The reflectance can be low, e.g., about 0.1% in some LCD panels. The majority of the light beam 80 becomes the beam 183 that transmits into the finger tissue 60 which causes scattering of the light 183 to produce the returned scattered light 191 towards the LCD display module 433 and the bottom layers 524. The scattering of the transmitted light beam 189 from the LCD pixel 73 in the finger tissue also contributes to the returned scattered light 191.

The beam 82 at the finger skin valley location 63 is reflected by the cover glass surface. In some designs, for example, the reflection may be about 3.5% as the reflected light 185 towards bottom layers 524, and the finger valley surface may reflect about 3.3% of the incident light power (light 187) to bottom layers 524 so that the total reflection may be about 6.8%. The majority light 189 is transmitted into the finger tissues 60. Part of the light power in the transmitted light 189 in the figure tissue is scattered by the tissue to contribute to the scattered light 191 towards and into the bottom layers 524.

Therefore, in the example in FIG. 5A, the light reflections from various interface or surfaces at finger valleys and finger ridges of a touching finger are different and the reflection ratio difference carries the fingerprint map information and can be measured to extract the fingerprint pattern of the portion that is in contact with the top transparent layer 431 and is illuminated the OLED light.

FIGS. 5B and 5C illustrate optical paths of two additional types of illumination light rays at the top surface under different conditions and at different positions relative to valleys or ridges of a finger, including under a total reflection condition at the interface with the top transparent layer 431. The illustrated illumination light rays generate different returned light signals including light signals that carry fingerprint pattern information to the under-screen optical fingerprint sensor module. It is assumed that the cover glass 431 and the LCD display module 433 are glued together without any air gap in between so that illumination light with a large incident angle to the cover glass 431 will be totally reflected at the cover glass-air interface. FIGS. 5A, 5B and 5C illustrate examples of three different groups divergent light beams: (1) central beams 82 with small incident angles to the cover glass 431 without the total reflection (FIG. 5A), (2) high contrast beams 201, 202, 211, 212 that are totally reflected at the cover glass 431 when nothing touches the cover glass surface and can be coupled into finger tissues when a finger touches the cover glass 431 (FIGS. 5B and 5C), and (3) escaping beams having very large incident angles that are totally reflected at the cover glass 431 even at a location where the finger issue is in contact.

For the central light beams 82, the cover glass surface in some designs may reflect about 0.1%~3.5% to light beam 185 that is transmitted into bottom layers 524, the finger skin may reflect about 0.1%~3.3% to light beam 187 that is also transmitted into bottom layers 524. The reflection difference is dependent on whether the light beams 82 meet with finger skin ridge 61 or valley 63. The rest light beam 189 is coupled into the finger tissues 60.

For high contrast light beams 201 and 202 meeting the local totally internal reflection condition, the cover glass surface reflects nearly 100% to light beams 205 and 206 respectively if nothing touches the cover glass surface. When the finger skin ridges touch the cover glass surface and at light beams 201 and 202 positions, most of the light power may be coupled into the finger tissues 60 by light beams 203 and 204.

For high contrast light beams 211 and 212 meeting the local totally internal reflection condition, the cover glass surface reflects nearly 100% to light beams 213 and 214 respectively if nothing touches the cover glass surface. When the finger touches the cover glass surface and the finger skin valleys happen to be at light beams 211 and 212 positions, no light power is coupled into finger tissues 60.

As illustrated in FIG. 5A, a portion of the illumination light that is coupled into finger tissues 60 tends to experience random scattering by the inner finger tissues to form low-contrast light 191 and part of such low-contrast light 191 can pass through the LCD display module 433 to reach to the optical fingerprint sensor module. This portion of light captured by optical fingerprint sensor module contains additional information on the finger skin color, blood characteristics and the finger inner tissue structures associated with the fingerprint. Additional features for using internally scattered light in tissues below the finger surface in optical sensing will be explained in later part of this patent document, such as obtaining an optical transmissive pattern of the finger that contains both (1) a two-dimensional spatial pattern of external ridges and valleys of a fingerprint (2) an internal fingerprint pattern associated with internal finger tissue structures that give rise to the external ridges and valleys of a finger. Therefore, in high contrast light beams illuminated area, finger skin ridges and valleys cause different optical reflections and the reflection difference pattern carries the fingerprint pattern information. The high contrast fingerprint signals can be achieved by comparing the difference.

The disclosed under-screen optical sensing technology can be in various configurations to optically capture fingerprints based on the design illustrated in FIGS. 2A and 2B. For example, the specific implementation in FIG. 4B based on optical imaging by using a bulk imaging module in the optical sensing module can be implemented in various configurations.

Figure 6A:
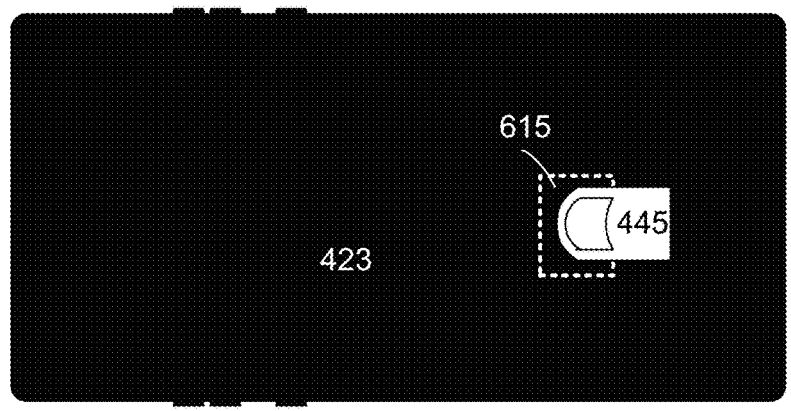
Figure 6B:
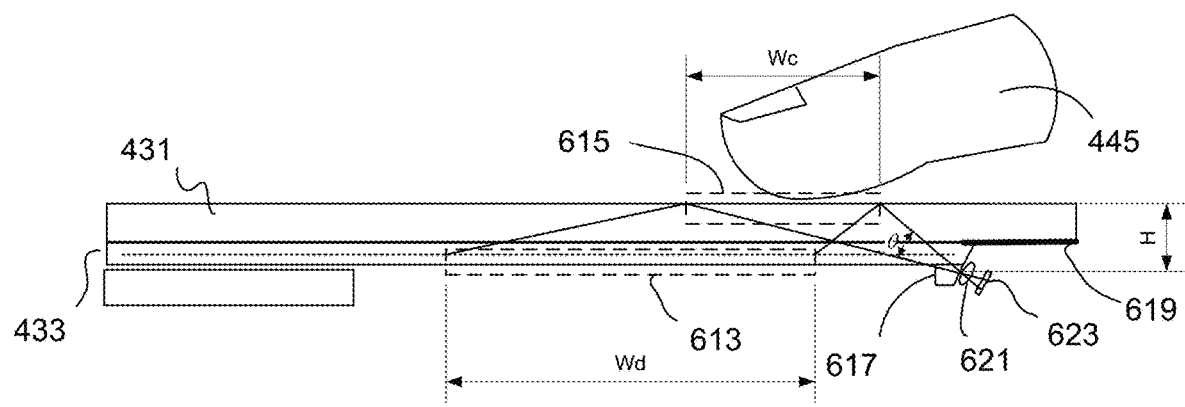
Figure 6C:
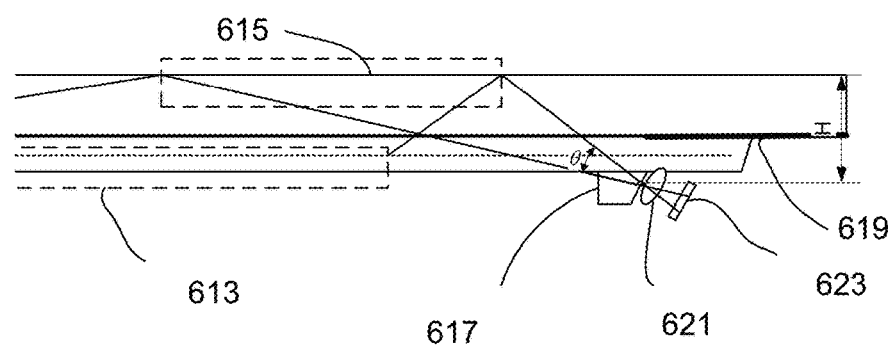

FIGS. 6A-6C show an example of an under-screen optical fingerprint sensor module based on optical imaging via a lens for capturing a fingerprint from a finger 445 pressing on the display cover glass 423. FIG. 6C is an enlarged view of the optical fingerprint sensor module part shown in FIG. 6B. The under-screen optical fingerprint sensor module as shown in FIG. 6B is placed under the LCD display module 433 includes an optically transparent spacer 617 that is engaged to the bottom surface of the LCD display module 433 to receive the returned light from the sensing zone 615 on the top surface of the top transparent layer 431, an imaging lens 621 that is located between and spacer 617 and the photodetector array 623 to image the received returned light from the sensing zone 615 onto the photodetector array 623. Different from FIG. 4B showing an example of an optical projection imaging system without a lens, the example of the imaging design in FIG. 6B used the imaging lens 621 to capture the fingerprint image at the photodetector array 623 and enables an image reduction by the design of the imaging lens 621. Similar to the imaging system in the example in FIG. 4B to some extent, this imaging system in FIG. 6B for the optical fingerprint sensor module can experience image distortions and a suitable optical correction calibration can be used to reduce such distortions, e.g., the distortion correction methods described for the system in FIG. 4B.

Similar to the assumptions in FIGS. 5A-5C, it is assumed that the finger skin's equivalent index of refraction to be about 1.44 at 550 nm and a bare cover glass index of refraction to be about 1.51 for the cover glass 423. When the OLED display module 433 is glued onto the cover glass 431 without any air gap, the total inner reflection happens in large angles at or larger than the critical incident angle for the interface. The total reflection incident angle is about 41.8° if nothing is in contact with the cover glass top surface, and the total reflection angle is about 73.7° if the finger skin touches the cover glass top surface. The corresponding total reflection angle difference is about 31.9°.

In this design, the micro lens 621 and the photodiode array 623 define a viewing angle θ for capturing the image of a contact finger in the sensing zone 615. This viewing angle can be aligned properly by controlling the physical parameters or configurations in order to detect a desired part of the cover glass surface in the sensing zone 615. For example, the viewing angle may be aligned to detect the total inner reflection of the LCD display assembly. Specifically, the viewing angle θ is aligned to sense the effective sensing zone 615 on the cover glass surface. The effective sensing cover glass surface 615 may be viewed as a mirror so that the photodetector array effectively detects an image of the fingerprint illumination light zone 613 in the LCD display that is projected by the sensing cover glass surface 615 onto the photodetector array. The photodiode/photodetector array 623 can receive the image of the zone 613 that is reflected by the sensing cover glass surface 615. When a finger touches the sensing zone 615, some of the light can be coupled into the fingerprint's ridges and this will cause the photodetector array to receive light from the location of the ridges to appear as a darker image of the fingerprint. Because the geometrics of the optical detection path are known, the fingerprint image distortion caused in the optical path in the optical fingerprint sensor module can be corrected.

Consider, as a specific example, that the distance H in FIG. 6B from the detection module central axis to the cover glass top surface is 2 mm. This design can directly cover 5 mm of an effective sensing zone 615 with a width Wc on the cover glass. Adjusting the spacer 617 thickness can adjust the detector position parameter H, and the effective sensing zone width Wc can be optimized. Because H includes the thickness of the cover glass 431 and the display module 433, the application design should take these layers into account. The spacer 617, the micro lens 621, and the photodiode array 623 can be integrated under the color coating 619 on the bottom surface of the top transparent layer 431.

Figure 7:
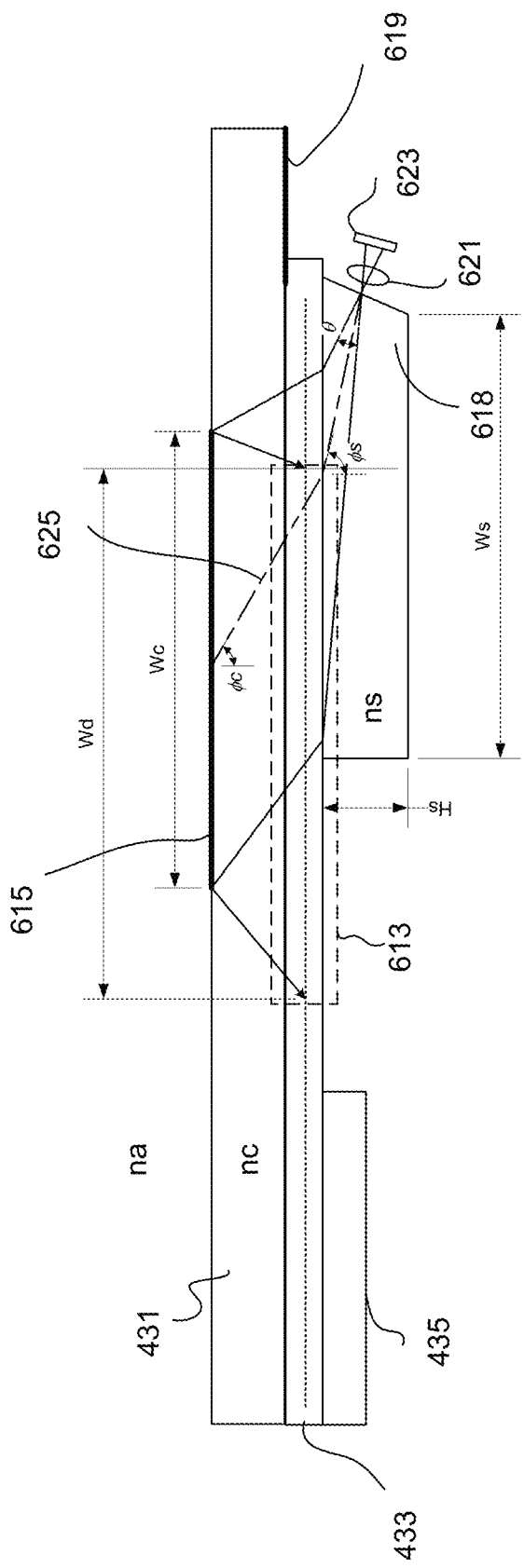

FIG. 7 shows an example of further design considerations of the optical imaging design for the optical fingerprint sensor module shown in FIGS. 6A-6C by using a special spacer 618 to replace the spacer 617 in FIGS. 6B-6C to increase the size of the sensing area 615. The spacer 618 is designed with a width Ws and thickness is Hs to have a low refraction index (RI) ns, and is placed under the LCD display module 433, e.g., being attached (e.g., glued) to the bottom surface the LCD display module 433. The end facet of the spacer 618 is an angled or slanted facet that interfaces with the micro lens 621. This relative position of the spacer and the lens is different from FIGS. 6B-6C, where the lens is placed underneath the spacer 617. The micro lens 621 and a photodiode array 623 are assembled into the optical detection module with a detection angle width θ. The detection axis 625 is bent due to optical refraction at the interface between the spacer 618 and display module 433 and at the interface between the cover glass 431 and the air. The local incident angle $\phi 1$ and $\phi 2$ are decided by the refractive indices RIs, ns, nc, and na of the materials for the components.

If nc is greater than ns, $\phi 1$ is greater than $\phi 2$. Thus, the refraction enlarges the sensing width Wc. For example, assuming the finger skin's equivalent RI is about 1.44 at 550 nm and the cover glass index RI is about 1.51, the total reflection incident angle is estimated to be about 41.8° if nothing touches the cover glass top surface, and the total reflection angle is about 73.7° if the finger skin touches the cover glass top surface. The corresponding total reflection angle difference is about 31.9°. If the spacer 618 is made of same material of the cover glass, and the distance from the detection module center to the cover glass top surface is 2 mm, if detection angle width is θ=31.9°, the effective sensing area width Wc is about 5 mm. The corresponding central axis's local incident angle is $\phi 1 = \phi 2 = 57.75°$. If the material for the special spacer 618 has a refractive index ns about 1.4, and Hs is 1.2 mm and the detection module is tilted at $\phi 1 = 70°$. The effective sensing area width is increased to be greater than 6.5 mm. Under those parameters, the detection angle width in the cover glass is reduced to 19°. Therefore, the imaging system for the optical fingerprint sensor module can be designed to desirably enlarge the size of the sensing area 615 on the top transparent layer 431.

the refractive index RI of the special spacer 618 is designed to be sufficiently low (e.g., to use $MgF_2$, $CaF_2$, or even air to form the spacer), the width Wc of the effective sensing area 615 is no longer limited by the thickness of the cover glass 431 and the display module 433. This property provides desired design flexibility. In principle, if the detection module has a sufficient resolution, the effective sensing area may even be increased to cover the entire display screen.

Since the disclosed optical sensor technology can be used to provide a large sensing area for capturing a pattern, the disclosed under-screen optical fingerprint sensor modules may be used to capture and detect not only a pattern of a finger but a larger size patter such a person's palm that is associated with a person for user authentication.

Figure 8A:
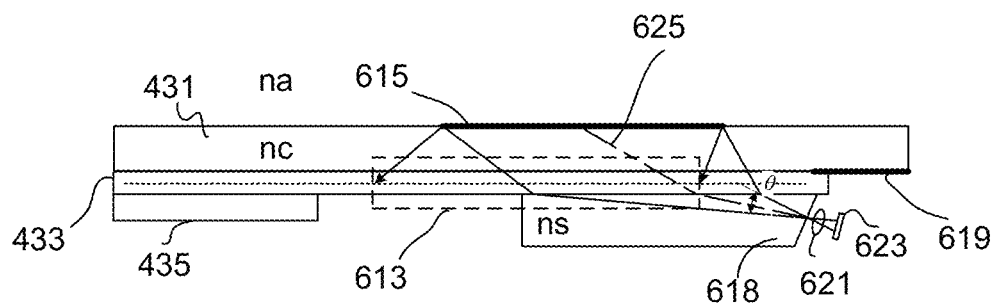
Figure 8B:
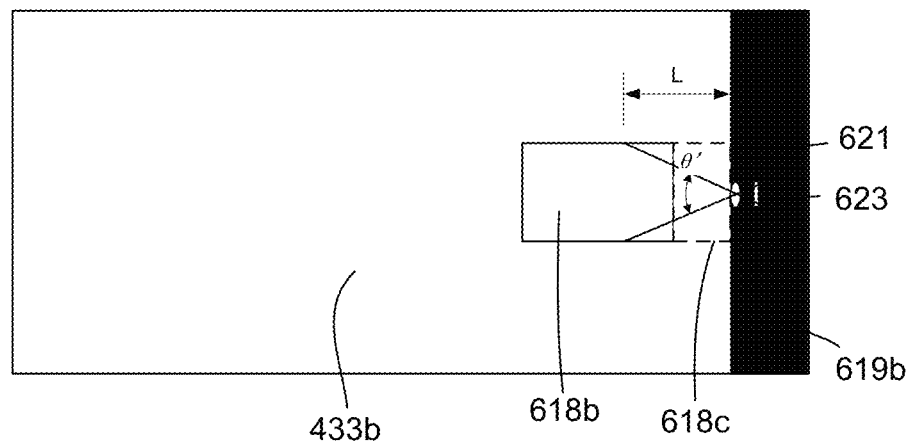

FIGS. 8A-8B show an example of further design considerations of the optical imaging design for the optical fingerprint sensor module shown in FIG. 7 by setting the detection angle θ' of the photodetector array relative in the display screen surface and the distance L between the lens 621 and the spacer 618. FIG. 8A shows a cross-sectional view along the direction perpendicular to the display screen surface, and FIG. 8B shows a view of the device from either the bottom or top of the displace screen. A filling material 618c can be used to fill the space between the lens 621 and the photodetector array 623. For example, the filling material 618c can be same material of the special spacer 618 or another different material. In some designs, the filling material 618c may the air space.

Figure 9:
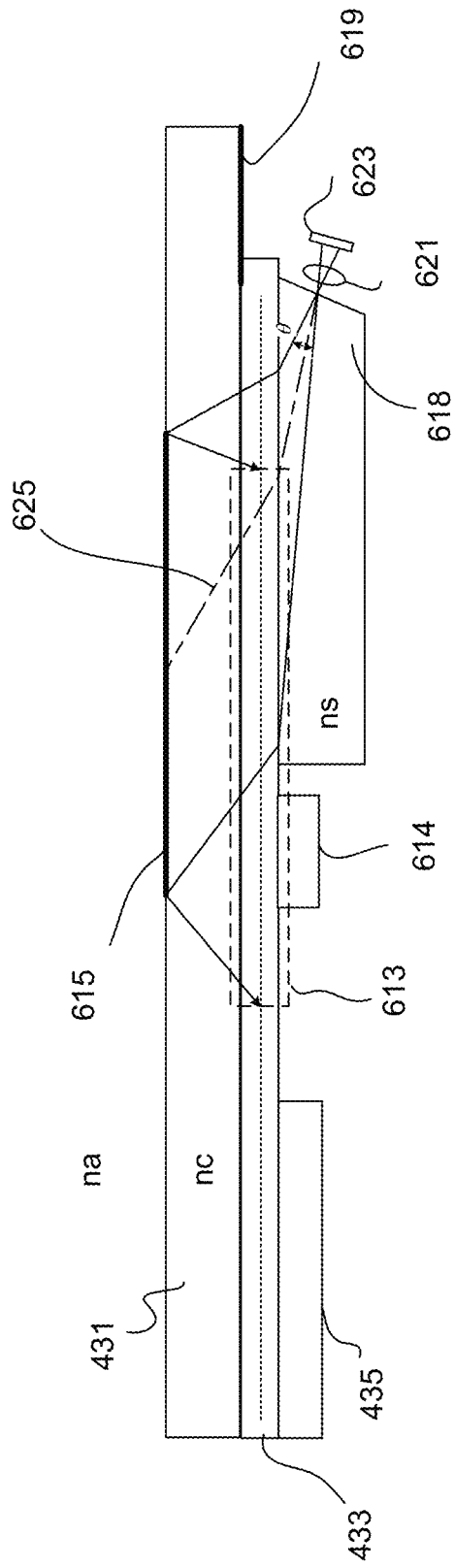

FIG. 9 shows another example of an under-screen optical fingerprint sensor module based on the design in FIG. 7 where one or more illumination light sources 614 are provided to illuminate the top surface sensing zone 615 for optical fingerprint sensing. The illumination light sources 614 may be of an expanded type, or be a collimated type so that all the points within the effective sensing zone 615 is illuminated. The illumination light sources 614 may be a single element light source or an array of light sources.

FIGS. 10A-10B show an example of an under-screen optical fingerprint sensor module that uses an optical coupler 628 shaped as a thin wedge to improve the optical detection at the optical sensor array 623. FIG. 10A shows a cross section of the device structure with an under-screen optical fingerprint sensor module for fingerprint sensing and FIG.

10B shows a top view of the device screen. The optical wedge 628 (with a refractive index ns) is located below the display panel structure to modify a total reflection condition on a bottom surface of the display panel structure that interfaces with the optical wedge 628 to permit extraction of light out of the display panel structure through the bottom surface. The optical sensor array 623 receives the light from the optical wedge 628 extracted from the display panel structure and the optical imaging module 621 is located between the optical wedge 628 and the optical sensor array 623 to image the light from the optical wedge 628 onto the optical sensor array 623. In the illustrated example, the optical wedge 628 includes a slanted optical wedge surface facing the optical imaging module and the optical sensing array 623. Also, as shown, there is a free space between the optical wedge 628 and the optical imaging module 621.

If the light is totally reflected at the sensing surface of the cover glass 431, the reflectance is 100%, of the highest efficiency. However, the light will also be totally reflected at the LCD bottom surface 433*b* if it is parallel to the cover glass surfaces. The wedge coupler 628 is used to modify the local surface angle so that the light can be coupled out for the detection at the optical sensor array 623. The micro holes in the LCD display module 433 provide the desired light propagation path for light to transmit through the LCD display module 433 for the under-screen optical sensing. The actual light transmission efficiency may gradually be reduced if the light transmission angle becomes too large or when the TFT layer becomes too thick. When the angle is close to the total reflection angle, namely about 41.8° when the cover glass refractive index is 1.5, the fingerprint image looks good. Accordingly, the wedge angle of the wedge coupler 628 may be adjusted to be of a couple of degrees so that the detection efficiency can be increased or optimized. If the cover glass' refractive index is selected to be higher, the total reflection angle becomes smaller. For example, if the cover glass is made of Sapphire which refractive index is about 1.76, the total reflection angle is about 34.62°. The detection light transmission efficiency in the display is also improved. Therefore, this design of using a thin wedge to set the detection angle to be higher than the total reflection angle, and/or to use high refractive index cover glass material to improve the detection efficiency.

In some under-screen optical fingerprint sensor module designs (e.g., those illustrated in FIGS. 6A-6C, 7, 8A, 8B, 9, 10A, and 10B), the sensing area 615 on the top transparent surface is not vertical or perpendicular to the detection axis 625 of the optical fingerprint sensor module so that the image plane of the sensing area is also not vertical or perpendicular to the detection axis 625. Accordingly, the plane of the photodetector array 623 can be tilted relative the detection axis 625 to achieve high quality imaging at the photodetector array 623.

Figure 11A:
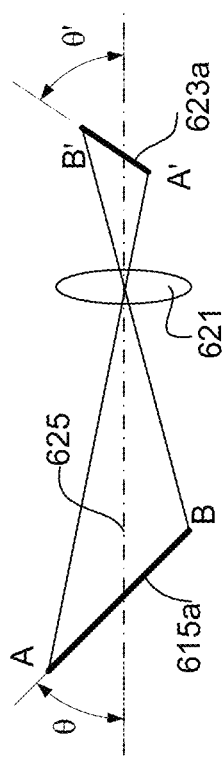
FIGS. 11A-11C illustrate imaging of the fingerprint sensing area on the top transparent layer via an imaging module under different tiling conditions where an imaging device images the fingerprint sensing area onto an optical sensor array and the imaging device may be optically transmissive or optically reflective according to some embodiments.
Figure 11B:
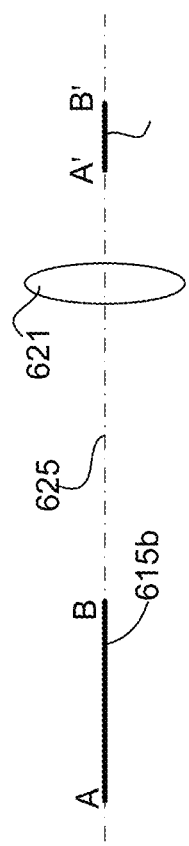
Figure 11C:
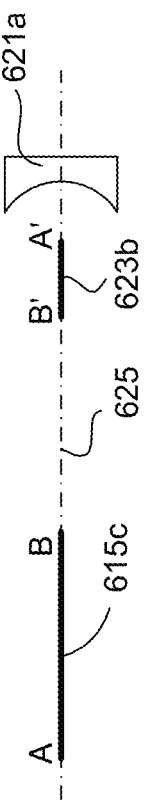

FIGS. 11A-11C show three example configurations for this tilting. FIG. 11A shows the sensing area 615*a* is tilted and is not perpendicular the detection axis 625. In FIG. 11B, the sensing area 615*b* is aligned to be on the detection axis 625, such that its image plane will also be located on the detection axis 625. In practice, the lens 621 can be partially cut off so as to simplify the package. In various implementations, the micro lens 621 can also be of transmission type or reflection type. For example, a specified approach is illustrated in FIG. 11C. The sensing area 615*c* is imaged by an imaging mirror 621*a*. A photodiode array 623*b* is aligned to detect the signals.

In the above designs where the lens 621 is used, the lens 621 can be designed to have an effective aperture that is larger than the aperture of the holes in the LCD display layers that allow transmission of light through the LCD display module for optical fingerprint sensing. This design can reduce the undesired influence of the wiring structures and other scattering objects in the LCD display module.

Figure 12:
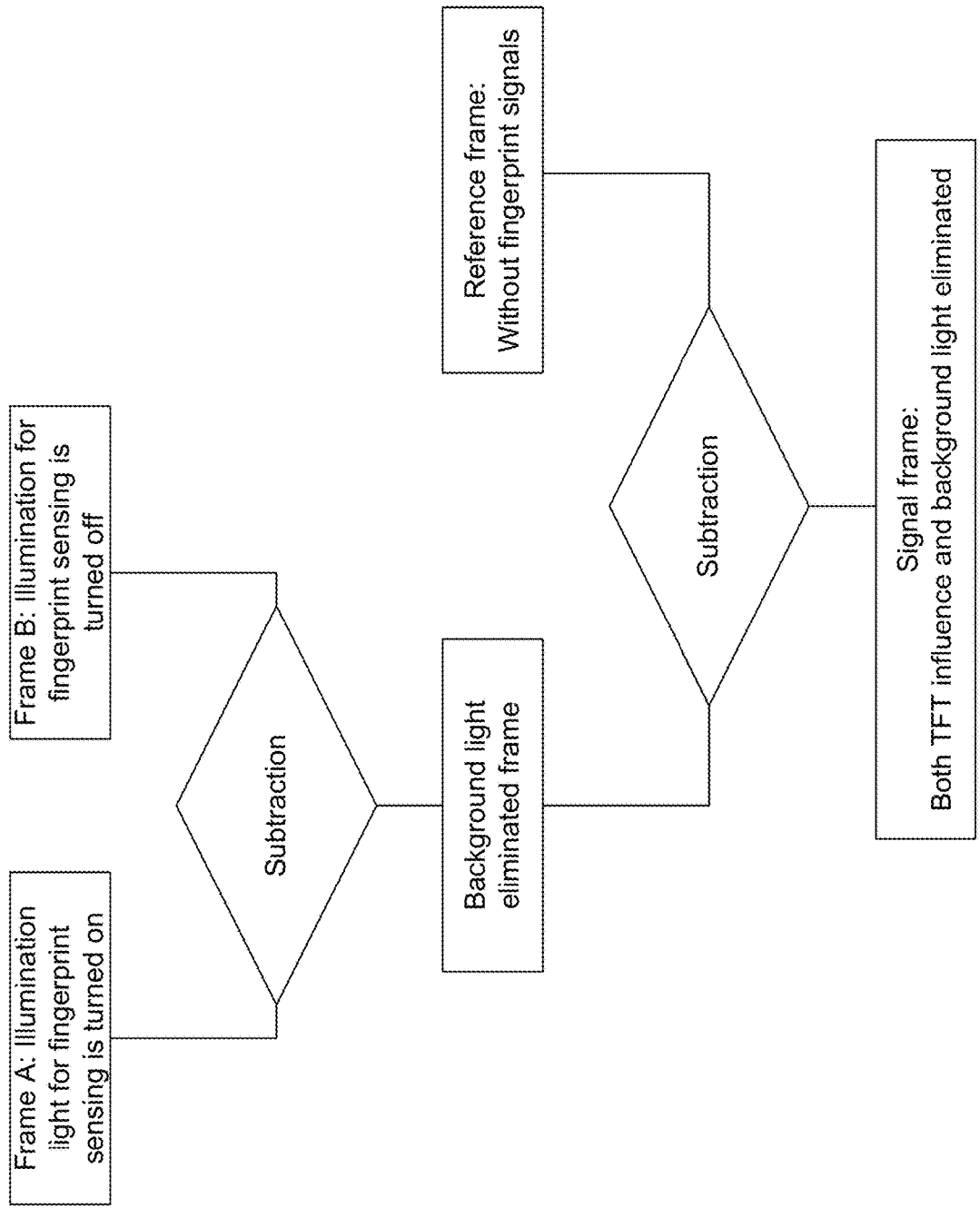
FIG. 12 is a flowchart illustrating an exemplary operation of a fingerprint sensor for reducing or eliminating undesired contributions from the background light in fingerprint sensing according to some embodiments.

FIG. 12 shows an example of an operation of the fingerprint sensor for reducing or eliminating undesired contributions from the background light in fingerprint sensing. The optical sensor array can be used to capture various frames and the captured frames can be used to perform differential and averaging operations among multiple frames to reduce the influence of the background light. For example, in frame A, the illumination light source for optical fingerprint sensing is turned on to illuminate the finger touching area, in frame B the illumination is changed or is turned off. Subtraction of the signals of frame B from the signals of frame A can be used in the image processing to reduce the undesired background light influence.

The undesired background light in the fingerprint sensing may also be reduced by providing proper optical filtering in the light path. One or more optical filters may be used to reject the environment light wavelengths, such as near IR and partial of the red light etc. In some implementation, such optical filter coatings may be made on the surfaces of the optical parts, including the display bottom surface, prism surfaces, sensor surface etc. For example, human fingers absorb most of the energy of the wavelengths under ~580 nm, if one or more optical filters or optical filtering coatings can be designed to reject light in wavelengths from 580 nm to infrared, undesired contributions to the optical detection in fingerprint sensing from the environment light may be greatly reduced.

Figure 13:
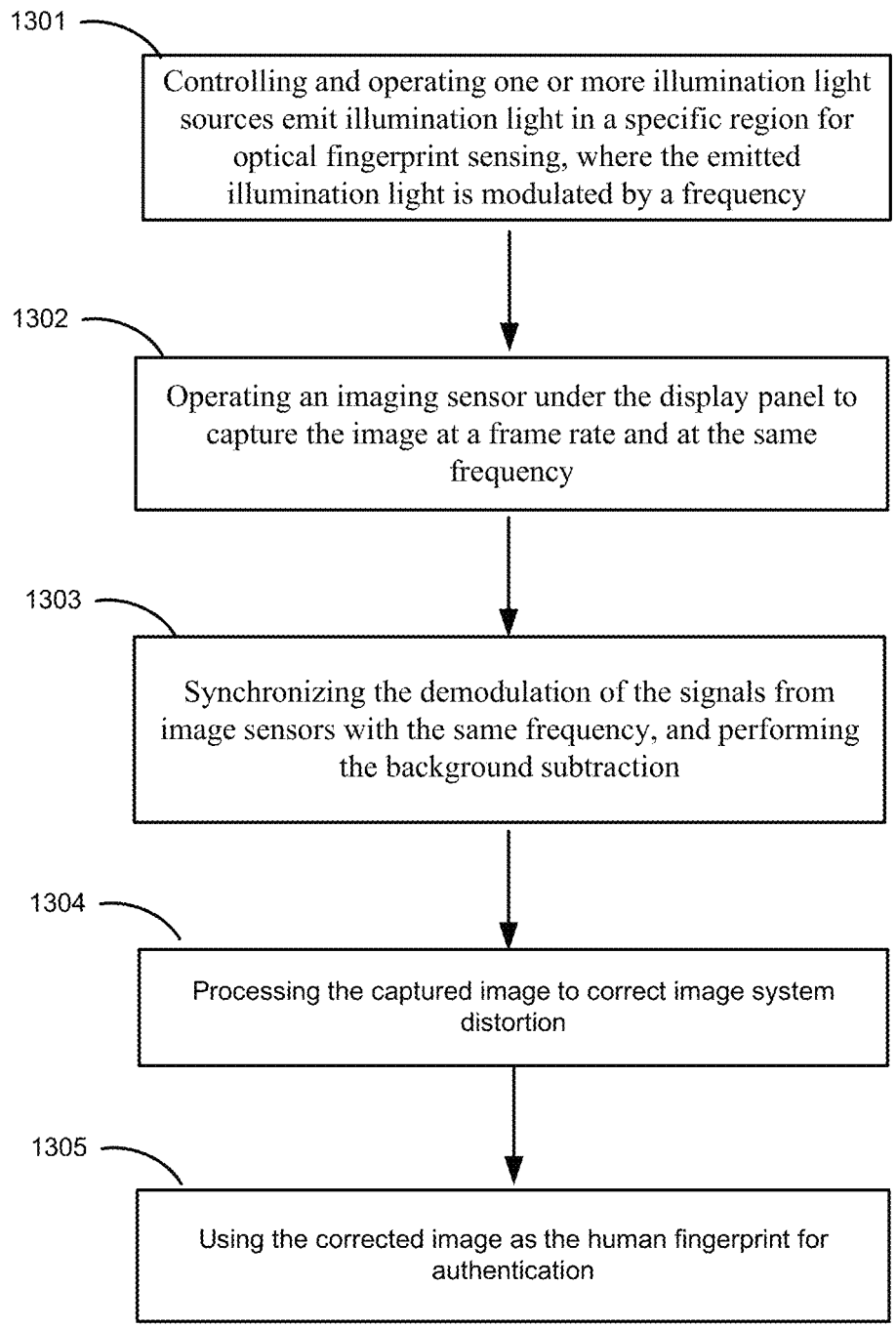
FIG. 13 is a flowchart illustrating an exemplary process for operating an under-screen optical fingerprint sensor module for capturing a fingerprint pattern according to some embodiments.

FIG. 13 shows an example of an operation process for correcting the image distortion in the optical fingerprint sensor module. At step 1301, the one or more illumination light sources are controlled and operated to emit light in a specific region, and the light emission of such pixels is modulated by a frequency F. At step 1302, an imaging sensor under the display panel is operated to capture the image at frame rate at same frequency F. In the optical fingerprint sensing operation, a finger is placed on top of the display panel cover substrate and the presence of the finger modulates the light reflection intensity of the display panel cover substrate top surface. The imaging sensor under the display captures the fingerprint modulated reflection light pattern. At step 1303, the demodulation of the signals from image sensors is synchronized with the frequency F, and the background subtraction is performed. The resultant image has a reduced background light effect and includes images from pixel emitting lights. At step 1304, the capture image is processed and calibrated to correct image system distortions. At step 1305, the corrected image is used as a human fingerprint image for user authentication.

The same optical sensors used for capturing the fingerprint of a user can be used also to capture the scattered light from the illuminated finger as shown by the back scattered light 191 in FIG. 5A. The detector signals from the back scattered light 191 in FIG. 5A in a region of interest can be integrated to produce an intensity signal. The intensity variation of this intensity signal is evaluated to determine other parameters beyond the fingerprint pattern, e.g., the heart rate of the user or inner topological tissues of a finger associated with the external fingerprint pattern.

The above fingerprint sensor may be hacked by malicious individuals who can obtain the authorized user's fingerprint, and copy the stolen fingerprint pattern on a carrier object that resembles a human finger. Such unauthorized fingerprint patterns may be used on the fingerprint sensor to unlock the targeted device. Hence, a fingerprint pattern, although a unique biometric identifier, may not be by itself a completely reliable or secure identification. The under-screen optical fingerprint sensor module can also be used to as an optical anti-spoofing sensor for sensing whether an input object with fingerprint patterns is a finger from a living person and for determining whether a fingerprint input is a fingerprint spoofing attack. This optical anti-spoofing sensing function can be provided without using a separate optical sensor. The optical anti-spoofing can provide high-speed responses without compromising the overall response speed of the fingerprint sensing operation.

Figure 14:
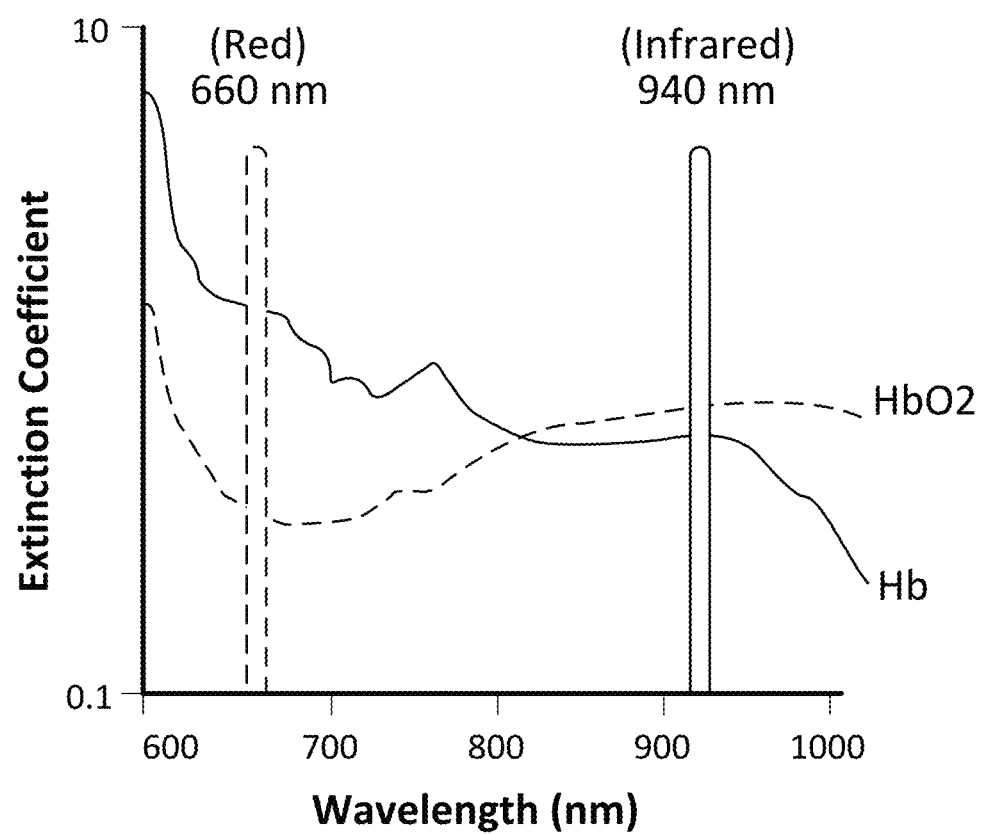
FIGS. 14-16 illustrates exemplary operation processes for determining whether an object in contact with the LCD display screen is part of a finger of a live person by illuminating the finger with light in two different light colors according to some embodiments.

FIG. 14 shows exemplary optical extinction coefficients of materials being monitored in blood where the optical absorptions are different between the visible spectral range e.g., red light at 660 nm and the infrared range, e.g., IR light at 940 nm. By using probe light to illuminate a finger at a first visible wavelength (Color A) and a second different wavelength such as an infrared (IR) wavelength (Color B), the differences in the optical absorption of the input object can be captured determine whether the touched object is a finger from a live person. The one or more illumination light sources for providing the illumination for optical sensing can be used to emit light of different colors to emit probe or illumination light at least two different optical wavelengths to use the different optical absorption behaviors of the blood for live finger detection. When a person' heart beats, the pulse pressure pumps the blood to flow in the arteries, so the extinction ratio of the materials being monitored in the blood changes with the pulse. The received signal carries the pulse signals. These properties of the blood can be used to detect whether the monitored material is a live-fingerprint or a fake fingerprint.

Figure 15:
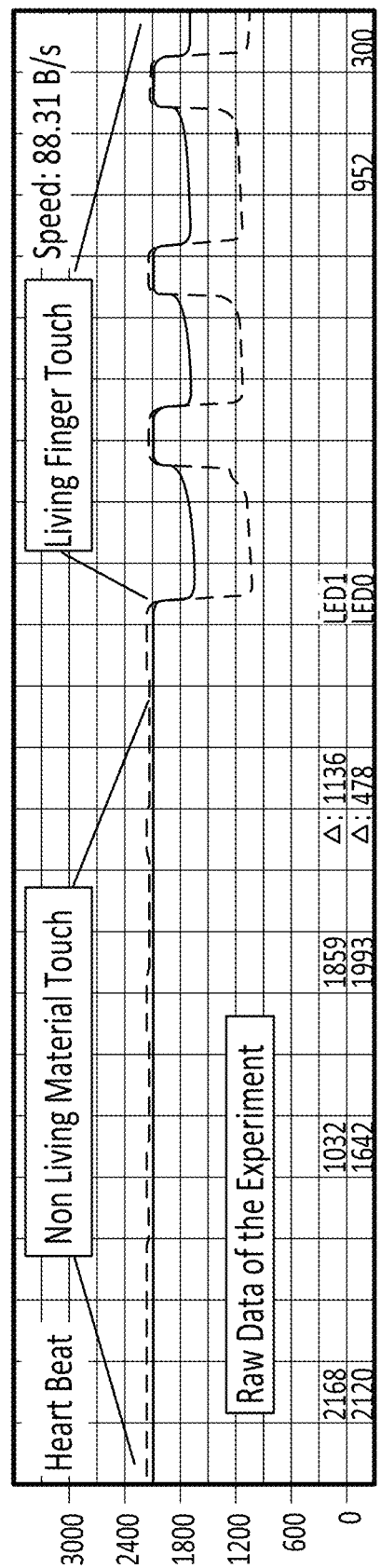

FIG. 15 shows a comparison between optical signal behaviors in the reflected light from a nonliving material (e.g., a fake finger or a spoof device with a fabricated fingerprint pattern) and a live finger. The optical fingerprint sensor can also operate as a heartbeat sensor to monitor a living organism. When two or more wavelengths of the probe light are detected, the extinction ratio difference can be used to quickly determine whether the monitored material is a living organism, such as live fingerprint. In the example shown in FIG. 15, probe light at different wavelengths were used, one at a visible wavelength and another at an IR wavelength as illustrated in FIG. 14.

When a nonliving material touches the top cover glass above the fingerprint sensor module, the received signal reveals strength levels that are correlated to the surface pattern of the nonliving material and the received signal does not contain signal components associated with a finger of a living person. However, when a finger of a living person touches the top cover glass, the received signal reveals signal characteristics associated with a living person, including obviously different strength levels because the extinction ratios are different for different wavelengths. This method does not take long time to determine whether the touching material is a part of a living person. In FIG. 15, the pulse-shaped signal reflects multiple touches instead of blood pulse. Similar multiple touches with a nonliving material does not show the difference caused by a living finger.

This optical sensing of different optical absorption behaviors of the blood at different optical wavelengths can be performed in a short period for live finger detection and can be faster than optical detection of a person's heart beat using the same optical sensor.

In LCD displays, the LCD backlighting illumination light is white light and thus contains light at both the visible and IR spectral ranges for performing the above live finger detection at the optical fingerprint sensor module. The LCD color filters in the LCD display module can be used to allow the optical fingerprint sensor module to obtain measurements in FIGS. 14 and 15. In addition, the designated light sources 436 for producing the illumination light for optical sensing can be operated to emit probe light at the selected visible wavelength and IR wavelength at different times and the reflected probe light at the two different wavelengths is captured by the optical detector array 623 to determine whether touched object is a live finger based on the above operations shown in FIGS. 14 and 15. Notably, although the reflected probe light at the selected visible wavelength and IR wavelength at different times may reflect different optical absorption properties of the blood, the fingerprint image is always captured by both the probe light the selected visible wavelength and the probe light at the IR wavelength at different times. Therefore, the fingerprint sensing can be made at both the visible wavelength and IR wavelength.

Figure 16:
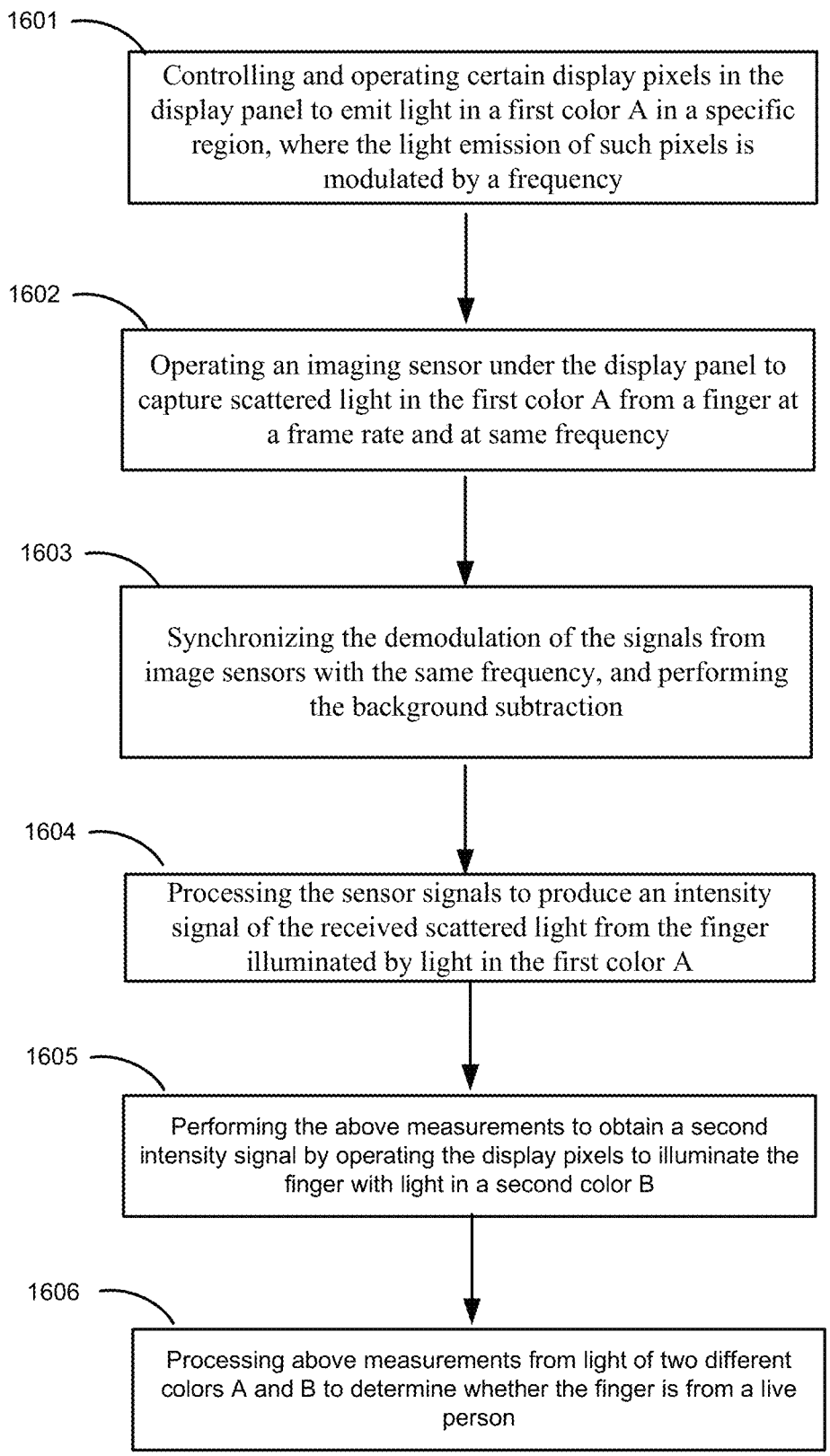

FIG. 16 shows an example of an operation process for determining whether an object in contact with the LCD display screen is part of a finger of a live person by operating the one or more illumination light sources for optical sensing to illuminate the finger with light in two different light colors.

For yet another example, the disclosed optical sensor technology can be used to detect whether the captured or detected pattern of a fingerprint or palm is from a live person's hand by a "live finger" detection mechanism by other mechanisms other than the above described different optical absorptions of blood at different optical wavelengths. For example, a live person's finger tends to be moving or stretching due to the person's natural movement or motion (either intended or unintended) or pulsing when the blood flows through the person's body in connection with the heartbeat. In one implementation, the optical fingerprint sensor module can detect a change in the returned light from a finger or palm due to the heartbeat/blood flow change and thus to detect whether there is a live heartbeat in the object presented as a finger or palm. The user authentication can be based on the combination of the both the optical sensing of the fingerprint/palm pattern and the positive determination of the presence of a live person to enhance the access control. For yet another example, as a person touches the LCD display screen, a change in the touching force can be reflected in one or more ways, including fingerprint pattern deforming, a change in the contacting area between the finger and the screen surface, fingerprint ridge widening, or a change in the blood flow dynamics. Those and other changes can be measured by optical sensing based on the disclosed optical sensor technology and can be used to calculate the touch force. This touch force sensing can be used to add more functions to the optical fingerprint sensor module beyond the fingerprint sensing.

In the above examples where the fingerprint pattern is captured on the optical sensor array via an imaging module, as in FIG. 4B and FIG. 6B, optical distortions tend to degrade the image sensing fidelity. Such optical distortions can be corrected in various ways. For example, a known pattern can be used to generate an optical image at the optical sensor array and the image coordinates in the know pattern can be correlated to the generated optical image with distortions at the optical sensor array for calibrating the imaging sensing signals output by the optical sensor array for fingerprint sensing. The fingerprint sensing module calibrates the output coordinates referencing on the image of the standard pattern.

In light of the disclosure in this patent document, various implementations can be made for the optical fingerprint sensor module as disclosed. For example, a display panel can be constructed in which each pixel emitting lights, and can be controlled individually; the display panel includes an at least partially transparent substrate; and a cover substrate, which is substantially transparent. An optical fingerprint sensor module is placed under the display panel to sense the images form on the top of the display panel surface. The optical fingerprint sensor module can be used to sense the images form from light emitting from display panel pixels. The optical fingerprint sensor module can include a transparent block with refractive index lower than the display panel substrate, and an imaging sensor block with an imaging sensor array and an optical imaging lens. In some implementations, the low refractive index block has refractive index in the range of 1.35 to 1.46 or 1 to 1.35.

For another example, a method can be provided for fingerprint sensing, where light emitting from a display panel is reflected off the cover substrate, a finger placed on top of the cover substrate interacts with the light to modulate the light reflection pattern by the fingerprint. An imaging sensing module under the display panel is used to sense the reflected light pattern image and reconstruct fingerprint image. In one implementation, the emitting light from the display panel is modulated in time domain, and the imaging sensor is synchronized with the modulation of the emitting pixels, where a demodulation process will reject most of the background light (light not from pixels being targeted).

As described above, display screens of portable electronic devices are often implemented as an assembly of multiple layers. For example, display screens implemented as touchscreens can include display layers for outputting video data, capacitive touchscreen layers for detecting touch events, a hard top layer, etc. Additional layers are used to integrate under-display optical sensing capabilities, such as fingerprint sensing. For light to reach the sensing components, the light passes through the various layers between the top surface and the sensors (e.g., the photodetectors). To that end, the layers are designed to permit transmission of light, and some layers can be designed to enhance, bend, focus, collimate, reflect, and/or otherwise influence transmission of light through the layers.

Figure 17A:
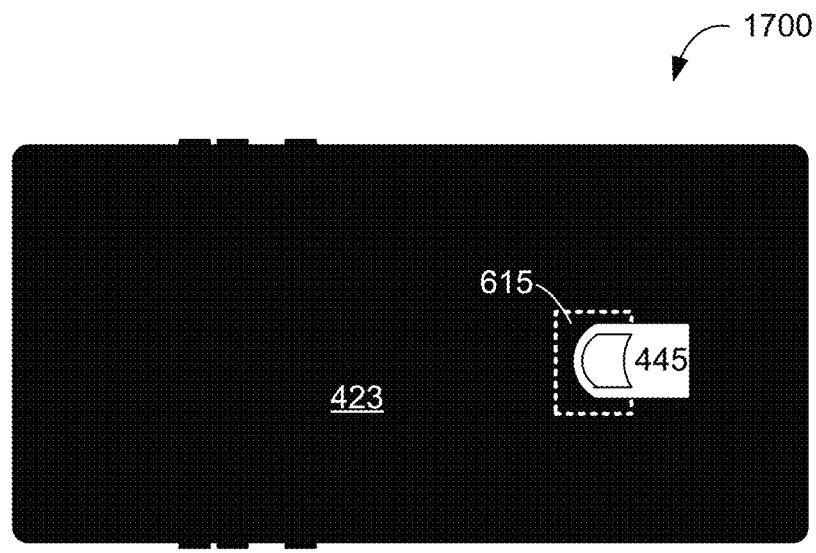
FIGS. 17A and 17B show an illustrative portable electronic device, and a cross-section of an illustrative display module for such a portable electronic device, respectively, according to various embodiments.
Figure 17B:
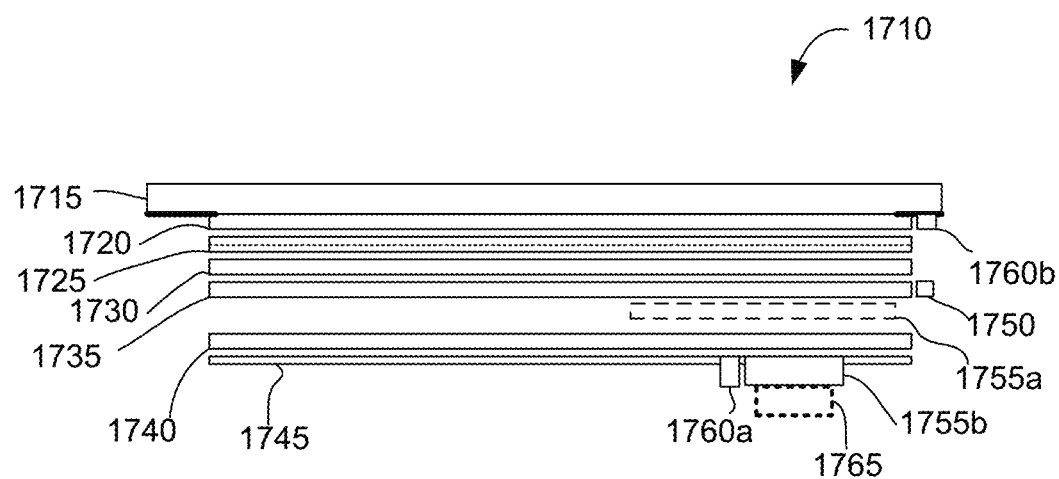

FIGS. 17A and 17B show an illustrative portable electronic device 1700, and a cross-section of an illustrative display module 1710 for such a portable electronic device 1700, respectively, according to various embodiments. The portable electronic device 1700 is illustrated as a smartphone. In other implementations, the portable electronic device 1700 is a laptop computer, a tablet computer, a wearable device, or any other suitable computational platform. The portable electronic device 1700 can include a display system 423. As described above, the display system 423 can be a touch sensing display system 423. The display system 423 has, integrated therein, an under-display optical sensor. As illustrated, the under-display optical sensor can define a sensing region 615, within which optical sensing can be performed. For example, fingerprint scanning can be performed by the under-display optical sensor when a user places a finger 445 on the display within the sensing region 615. Such an under-display optical sensor can be implemented using multiple layers.

The display module 1710 of FIG. 17B can be an implementation of the display system 423 of FIG. 17A. Though not part of the display module 1710, an under-display optical sensor 1765 is also shown for reference. As illustrated, the display module 1710 includes a number of layers. A top cover layer 1715 (e.g., glass) can serve as a user interface surface for various user interfacing operations. For example, the cover layer 1715 can facilitate touch sensing operations by the user, displaying images to the user, an optical sensing interface to receive a finger for optical fingerprint sensing and other optical sensing operations, etc. In some embodiments, the display module 1710 includes the cover layer 1715. In other implementations, the cover layer 1715 is separate from the display module 1710. For example, the display module 1710 is integrated into the portable electronic device 1700 as a module, and the cover layer 1715 is installed on top of the display module 1710.

One or more other layers of the display module 1710 form a liquid crystal module (LCM) 1720. Below the LCM 1720, the display module 1710 includes an enhancement layer 1725. As described herein, the enhancement layer 1725 can include one or more layers of brightness-enhancement film, such as enhancement films including trapezoidal prism structures. The display module 1710 can further include some or all of a light diffuser 1730, a light guide plate 1735, a reflector film 1740, a frame 1745, and light path compensators 1755. Some embodiments include additional components, such as one or more display light sources 1750 and one or more external light sources 1760 (e.g., for fingerprint and/or other optical sensing).

Implementations of the display light sources 1750 can include LCD display backlighting light sources (e.g., LED lights) that provide white backlighting for the display module 1710. Implementations of the light guide plate 1735 include a waveguide optically coupled with the display light sources 1750 to receive and guide the backlighting light. Implementations of the LCM 1720 include some or all of a layer of liquid crystal (LC) cells, LCD electrodes, a transparent conductive ITO layer, an optical polarizer layer, a color filter layer, a touch sensing layer, etc. Implementations of the light diffuser 1730 include a backlighting diffuser placed underneath the LCM 1720 and above the light guide plate 1735 to spatially spread the backlighting light for illuminating the LCD display pixels in the LCM 1720. Implementations of the reflector film 1740 are placed underneath the light guide plate 1735 to recycle backlighting light towards the LCM 1720 for improved light use efficiency and display brightness.

When the LCD cells in (e.g., in the sensing region 615) are turned on, the LCM 1720 (e.g., the LC cells, electrodes, transparent ITO, polarizer, color filter, touch sensing layer, etc.) can become partially transparent, although the micro structure may interfere and/or block some probe light energy. Embodiments of the light diffuser 1730, the light guide plate 1735, the reflector film 1740, the light path compensators 1755, and/or the frame 1745 can be treated to hold the under-display optical sensor 1765 and to provide a transparent or partially transparent sensing light path, so that a portion of the reflected light from the top surface of the cover layer 1715 can reach sensing elements (e.g., a photo detector array) of the under-display optical sensor 1765. The under-display optical sensor 1765 can include any suitable components, such as fingerprint sensor parts, a photodetector array, an optical collimator array for collimating and directing reflected probe light to the photo detector array, and an optical sensor circuit to receive and condition detector output signals from the photo detector array. Embodiments of the photodetector array include a CMOS sensor of CMOS sensing pixels, a CCD sensor array, or any other suitable optical sensor array.

Embodiments of the enhancement layer 1725 include one or more enhancement films. Some enhancement film designs include a prism film with sharp prism ridge and sharp prism valley profile (i.e., a sharp transition at each ridge, and a sharp transition at each valley). As described herein, the micro-prism structures of the enhancement layer 1725 are configured, so as to bend under-display lighting toward the LCM 1720 to help enhance such lighting (e.g., backlighting and probe lighting). However, when then light is reflected (by the top surface of the cover layer 1715) back toward the under-display optical sensor 1765 through the enhancement layer 1725, the same bending effects tend to cause the reflected light to diverge. This divergence can cause blurring and/or other undesirable detriments to optical sensing using the under-display optical sensor 1765.

Embodiments described herein include light path compensators 1755 configured to compensate, at least partially, for the divergent effects of the enhancement layer 1725 on light traveling in the direction of the under-display optical sensor 1765. For example, embodiments include means for projecting incident light onto a cover layer (e.g., cover layer 1715) through a display module (e.g., LCM 1720), the cover layer redirecting at least a portion of the incident light as reflected light. The means for projecting can include some or all of the display light sources 1750, one or more external light sources 1760, and/or any other suitable source of probe lighting, backlighting, or other under-display illumination. Such embodiments also include means for imaging the reflected light. The means for imaging can include some or all of the under-display optical sensor 1765, which can include any suitable optics, circuitry, software, structure, and/or the like. Such embodiments also include means for enhancing brightness of the incident light by bending at least some divergent portions of the incident light toward the cover layer as the incident light passes through the means for enhancing in a first direction, such that each incident ray of the incident light is incident on the cover layer at a respective incident angle and is reflected by the cover layer as a respective reflected ray at a respective initial reflected angle. The means for enhancing can be implemented as the enhancement layer 1725, which can include one or more enhancement film layers that may or may not be adjacent to each other and may or may not be substantially identical. Such embodiments also include means for compensating bending of the reflected rays caused by the reflected rays passing through the means for enhancing brightness in a second direction opposite the first direction, the means for enhancing causing bending of each reflected ray from the respective initial reflected angle to a respective modified reflected angle, the means for compensating causing re-bending of each of at least some of the reflected rays from the respective modified reflected angle toward the respective initial reflected angle. The means for compensating can be implemented as the light path compensators 1755. As described herein, the light path compensators 1755 can include a compensation layer with one or more compensation film layers that may or may not be adjacent to each other and may or may not be substantially identical. Generally, the means for enhancing seek to enhance brightness of incident light projected by under-display illumination, but such means for enhancing also tend to cause blurring and/or other undesirable optical effects with respect to the reflected light being imaged by the means for imaging. The means for compensating seek at least partially to compensate for those undesirable optical effects caused by the reflected light passing back through the means for enhancing, thereby improving imaging of the reflected light by the means for imaging.

Figure 18A:
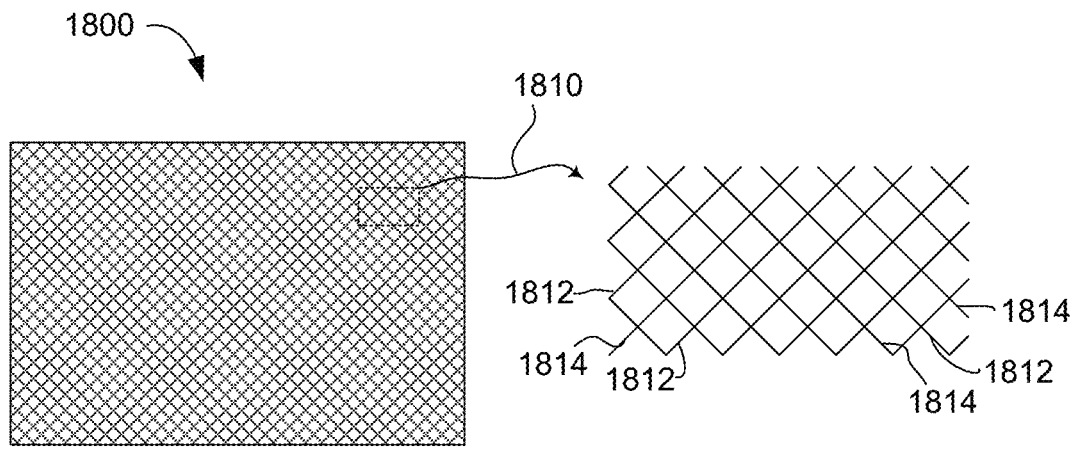
FIGS. 18A-18C show views of an illustrative portion of a symmetric enhancement layer.
Figure 18B:
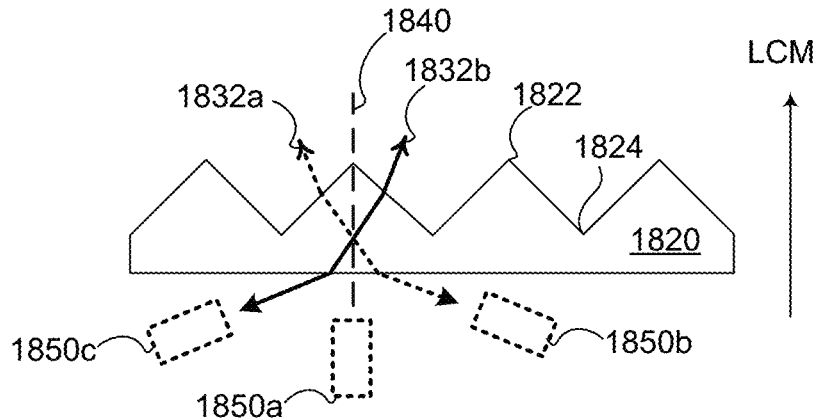
Figure 18C:
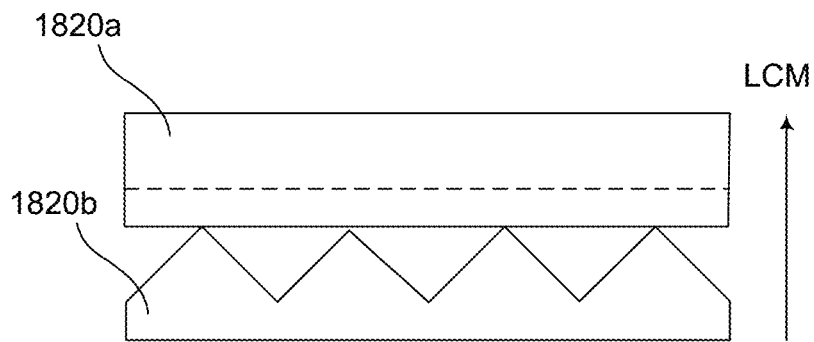

For the sake of added context, FIGS. 18A-18C show views of an illustrative portion of an enhancement layer 1800. FIG. 18A illustrates a zoomed-in view 1810 of a small portion of the enhancement layer 1800. FIGS. 18B and 18C show a cross-section of a small portion of one enhancement film layer 1820 of the enhancement layer 1800. FIG. 18C shows a cross-section of a small portion of two enhancement film layers 1820a, 1820b of the enhancement layer 1800, stacked in orthogonal orientations with respect to each other.

As illustrated, each enhancement film layer 1820 is formed with a series of sharp prism structures. Each sharp prism structure includes a sharp ridge 1822 and a sharp valley 1824. The zoomed-in view 1810 of FIG. 18A shows the two enhancement film layers 1820 of FIG. 18C, stacked in orthogonal orientations with respect to each other, viewed from the top. As illustrated, the intersecting sharp prism structures form a grid of sharp ridge lines 1812 and sharp valley lines 1814, corresponding respectively to the sharp ridges 1822 and sharp valleys 1824 of each sharp prism structure. As illustrated by FIG. 18C, the sharp ridges 1822 point in the direction of the LCM 1720 (also the direction of the cover layer 1715).

Such enhancement layers 1800 typically seek to enhance the brightness of light directed toward a viewer, such as toward and/or through the LCM 1720. For example, enhancement layers 1800 seek to enhance the brightness of backlighting positioned behind the LCM 1720 and/or of probe lighting used for under-display optical sensing. As shown in FIG. 18B, light passing through the prism structures of the enhancement layer 1800 is bent in different directions, as illustrated by light paths 1832a and 1832b. Each light path 1832 illustrates two directions of travel of light energy. A first direction (i.e., generally toward the LCM 1720) can represent a vector of backlighting and/or probe lighting energy that originated from a light source under the enhancement layers 1800. A second direction (i.e., generally away from the LCM 1720) can represent a vector of backlighting and/or probe lighting energy that reflected off of another layer (e.g., the top transparent layer above the LCM 1720) and is traveling back in the direction of under-display optical sensors.

As light passes through the enhancement film layer 1820 in the direction of the LCM 1720, such bending can tend to be beneficial. For example, light passing through the enhancement film layer 1820 in the first direction, including light paths (e.g., paths 1832) having large incident angles, can be bent in a generally convergent manner toward the LCM 1720, thereby causing brightness enhancement. As a corollary, light passing through the enhancement layers 1800 in the second direction can tend to be bent in a generally divergent manner. If optical sensing is attempted in that causes image blurring. In typical display applications, such blurring is of no concern, as the blurred light is passing into the device and not toward the viewer. However, in context of under-display optical fingerprint sensing, as described herein, such blurring impacts light traveling in the direction of the optical sensing components, which can frustrate optical sensing by components situated below the conventional enhancement layer 1800.

For added clarity, FIG. 18B shows three example potential reference positions (e.g., locations and orientations) 1850 for optical sensing. If an optical sensor is placed in accordance with reference position 1850a, the optical sensor can tend to detect light entering the enhancement film layer 1820 through the right and left prism faces, which can tend to cause image blurring. However, if an optical sensor is placed in accordance with reference position 1850b or 1850c, the optical sensor can tend to detect light entering the enhancement film layer 1820 through only the right prism faces or the left prism faces, respectively. In such cases, blurring can be avoided, but at least half of the detection area may not be imaged. A comparable analysis can be applied to an enhancement layer 1800 implementation with multiple enhancement film layers 1820, as in FIG. 18C. For example, placing an optical sensor in reference position 1850b or 1850c can tend to detect light entering the enhancement film layer 1820b through only the right prism faces or the left prism faces of enhancement film layer 1820b, respectively; but having the optical sensor in either of those reference positions (1850b or 1850c) can tend to detect light entering the enhancement film layer 1820a through both the right and left prism faces of enhancement film layer 1820a, which can still tend to cause image blurring. By rotating reference locations 1850b and 1850c by 45 degrees around axis 1840 and positioning an optical sensor in one of those locations, light can tend to be detected entering through only a single prism face of enhancement film layer 1820a and through only a single prism face of enhancement film layer 1820b. In such cases, blurring can be avoided, but at least three quarters of the detection area may not be imaged from any single reference location.

Figure 19:
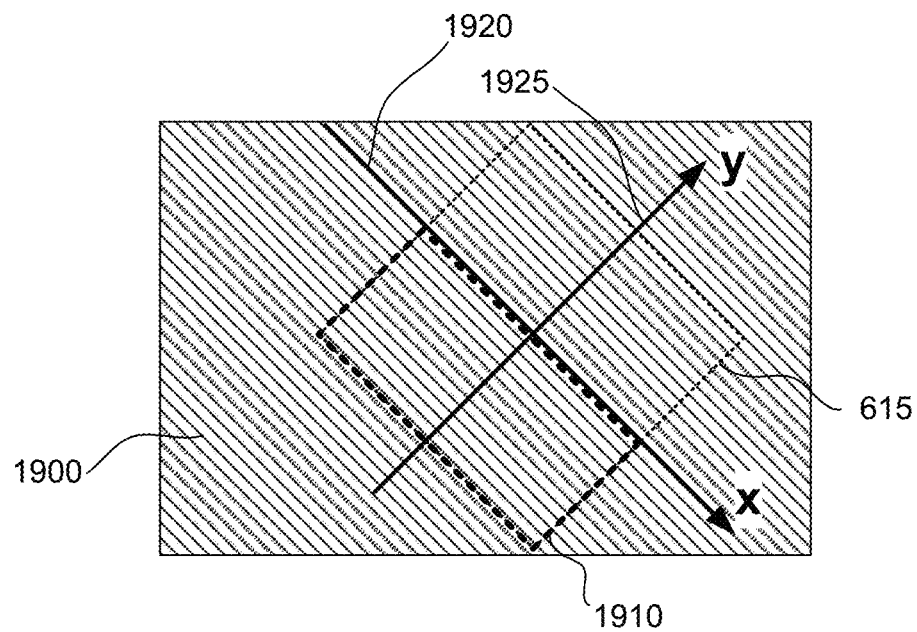
FIG. 19 shows an illustrative fingerprint sensing region overlaid on a single enhancement film layer.

For the sake of illustration, FIG. 19 shows an illustrative fingerprint sensing region 615 overlaid on a single enhancement film layer 1900, such as enhancement film layer 1820. As illustrated, the micro-prism structures of the enhancement film layer 1900 form parallel ridge lines running generally in a first direction (labeled as an "X" axis 1920), and running generally orthogonal to a second direction (labeled as a "Y" axis 1925). Though not shown, it can be assumed that a "Z" axis points outward from the page, orthogonal to both the X and Y axes, in the direction of the LCM 1720. As described above, though the theoretical fingerprint sensing region 615 consumes a relatively large sensing area, an optical sensor oriented to sense the entire region can tend to receive reflected probe light from both prism faces of each micro-prism structure, thereby resulting in image blurring. An optical sensor oriented to receive reflected probe light from only one of the prism faces of each micro-prism structure can tend to avoid image blurring, but tends also to result in reducing the sensing region (as illustrated by sensing sub-region 1910.). For example, the optical sensor can be oriented to point generally in the negative-Y, positive-Z direction (e.g., $\{0, -y, z\}$). In such cases, the practical sensing sub-region 1910 may be approximately half or less the area of the theoretical sensing region 615.

Figure 20:
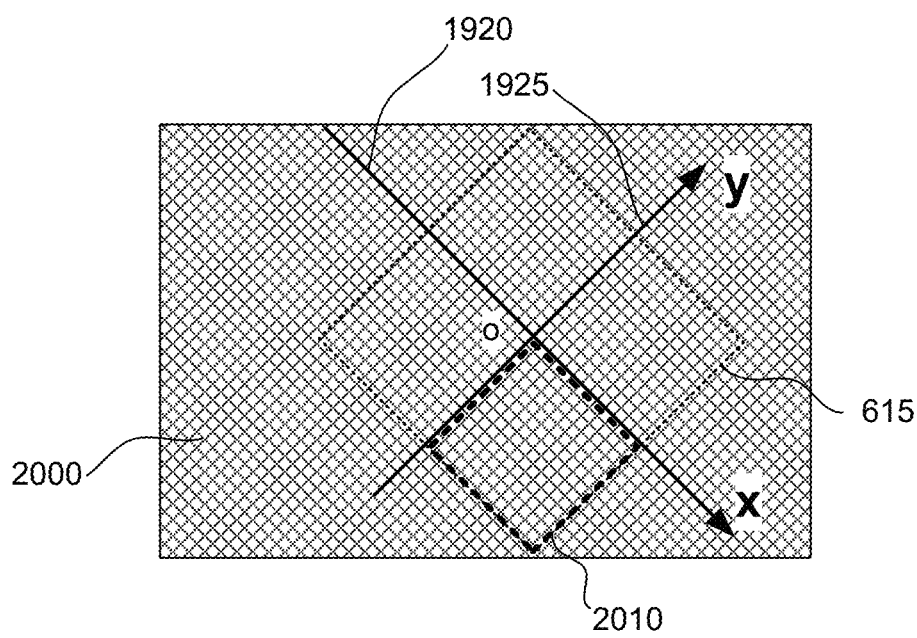
FIG. 20 shows an illustrative fingerprint sensing region overlaid on an enhancement panel having two enhancement film layers, stacked so that their respective micro-prism structures run in generally orthogonal directions.

FIG. 20 shows an illustrative fingerprint sensing region 615 overlaid on an enhancement panel 2000 having two enhancement film layers, stacked so that their respective micro-prism structures run in generally orthogonal directions. The enhancement panel 2000 can be implemented, for example, as enhancement panels shown in FIGS. 18A and 18C. As illustrated, the enhancement panel 2000 has first micro-prism structures (e.g., of a first enhancement film layer) forming parallel ridge lines running generally in the first direction (along "X" axis 1920), and second micro-prism structures (e.g., of a second enhancement film layer) forming parallel ridge lines running generally in the first second direction (along "Y" axis 1925). With two enhancement film layers, each layer can cause blurring. For example, light passing through one prism face of a micro-structure of a lower enhancement film layer is a combination of light passing through both prism faces of a micro-structure of an upper enhancement film layer. As such, to avoid blurring, the optical sensor is oriented to receive reflected probe light from only one of the prism faces of each micro-prism structure through both enhancement film layers. For example, the optical sensor can be oriented to point generally in the positive-X, negative-Y, positive-Z direction (e.g., $\{x, -y, z\}$). In such cases, the practical sensing sub-region 2010 may be around one-fourth the area of the theoretical sensing region 615. For example, the practical sensing sub-region 2010 may be less than one-fourth the area of the theoretical sensing region 615 when using symmetric micro-prism structures (e.g., like those illustrated in FIGS. 18A-18C).

Figure 21:
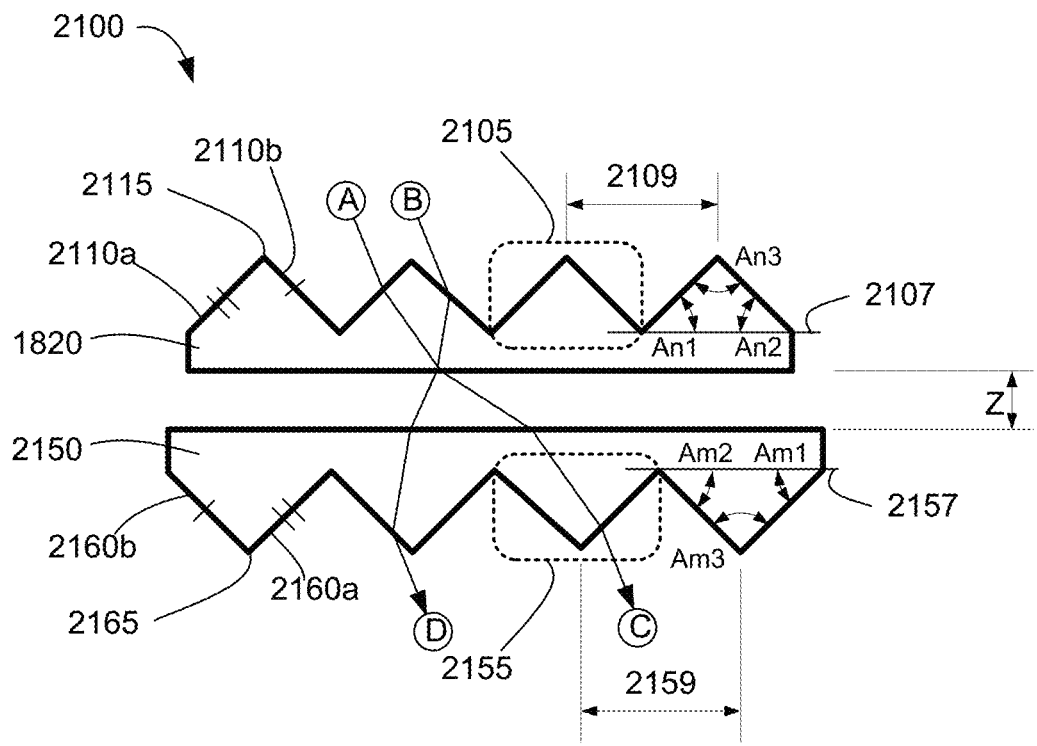
FIG. 21 shows a portion of an optical arrangement configured for light path compensation, according to various embodiments.

FIG. 21 shows a portion of an optical arrangement 2100 configured for light path compensation, according to various embodiments. The optical arrangement includes an illustrative enhancement film layer 1820, and an illustrative compensation film layer 2150. For example, the enhancement film layer 1820 is shown as described with reference to FIGS. 18A-18C. As illustrated, the enhancement film layer 1820 includes enhancement micro-prism structures 2105, each having two opposing angled enhancement prism faces (2110a and 2110b) that meet to form an enhancement prism ridge 2115. A first of the enhancement prism faces 2110a is oriented at a first enhancement angle (An1) with respect to a surface plane 2107 of the enhancement film layer 1820, a second of the enhancement prism faces 2110b is oriented at a second enhancement angle (An2) with respect to the surface plane 2107 of the enhancement film layer 1820, and the enhancement prism faces 2110 meet to form the enhancement prism ridge 2115 at a third enhancement angle (An3). Each enhancement micro-prism structure 2105 has a triangular cross-section, such that An1, An2, and An3 add to 180 degrees. Each enhancement prism ridge 2115 is spaced from the enhancement prism ridges 2115 of its adjacent enhancement micro-prisms 2105 by an enhancement pitch 2109. The enhancement film layer 1820 is shown as having symmetric enhancement micro-prism structures 2105, such that An1 and An2 are substantially equal. In other implementations, the enhancement micro-prism structures 2105 are asymmetric, such that An1 is different from An2.

Figure 25:
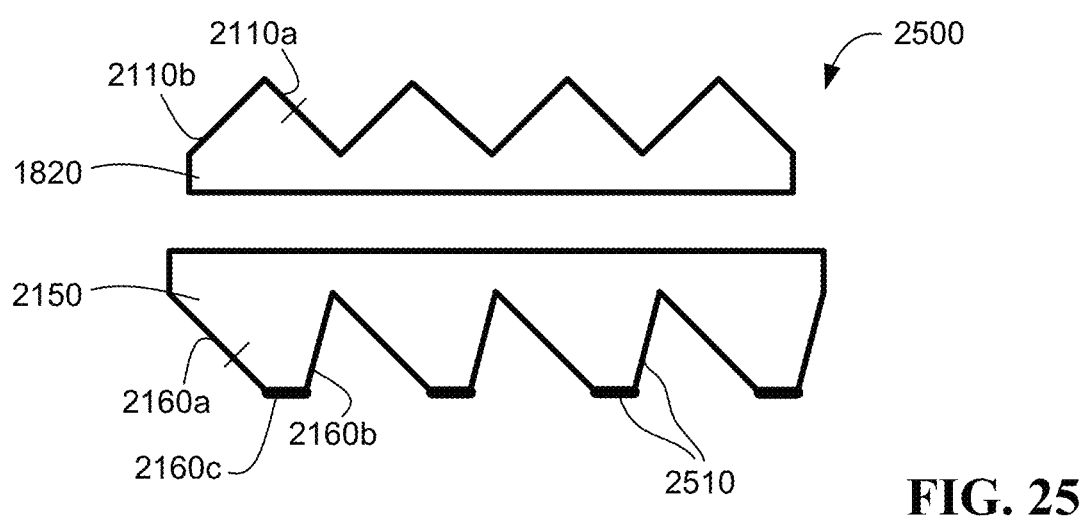

The compensation film layer 2150 includes compensation micro-prism structures 2155, each having two opposing angled compensation prism faces (2160a and 2160b). A first of the compensation prism faces 2160a is oriented at a first compensation angle (Am1) with respect to a surface plane 2157 of the compensation film layer 2150, and a second of the compensation prism faces 2160b is oriented at a second compensation angle (Am2) with respect to the surface plane 2157 of the compensation film layer 2150. Each compensation micro-prism structure 2155 has a substantially triangular cross-section. In embodiments (as illustrated), the compensation prism faces 2160 meet to form a sharp compensation prism ridge 2165 at a third compensation angle (Am3). In other embodiments (e.g., as illustrated in FIG. 25 below), there is no sharp compensation prism ridge 2165; rather the ridge may be cut off or flattened to form an additional compensation prism face. In such embodiments, the flattened or cut-off ridge is still referred to as a compensation prism ridge 2165, and the ridge angle (Am3) in degrees can be determined as 180−(Am1+Am2). Each compensation prism ridge 2165 is spaced from the compensation prism ridges 2165 of its adjacent compensation micro-prisms 2155 by an compensation pitch 2159. Though shown as having symmetric compensation micro-prism structures 2155 (e.g., such that Am1 and Am2 are substantially equal), the compensation micro-prism structures 2155 may be symmetric or asymmetric for different purposes, for example, as described herein.

In some embodiments, the compensation film layer 2150 is designed to effectively bend light in an opposing manner to the bending caused by the enhancement film layer 1820. In some embodiments, as illustrated, An1 is substantially equal to Am1, such that the first of the enhancement prism faces 2110*a* is substantially parallel to the first of the compensation prism faces 2160*a*. In some embodiments, An2 is also substantially equal to Am2, such that the second of the enhancement prism faces 2110*a* is also substantially parallel to the second of the compensation prism faces 2160*a*. In some embodiments, the enhancement pitch 2109 is the same as the compensation pitch 2159. In other embodiments, the enhancement pitch 2109 is different from (e.g., smaller than) the compensation pitch 2159. For example, as illustrated, the enhancement film layer 1820 is spaced from the compensation film layer 2150 by some distance. In some such instances, configuring the compensation film layer 2150 to have larger compensation micro-prism structures 2155 spaced by a larger compensation pitch 2159 can yield better compensation. For example, in the illustrated embodiment, light beams A and B (e.g., reflected rays of reflected light) are shown being refracted by the enhancement film layer 1820, causing the light beams to diverge. The divergent light beams then reach the compensation film layer 2150 and are refracted again by the compensation film layer 2150, causing the light beams to bend back to substantially their original direction (e.g., though possibly spaced further apart), illustrated as light beams C and D.

Figure 22:
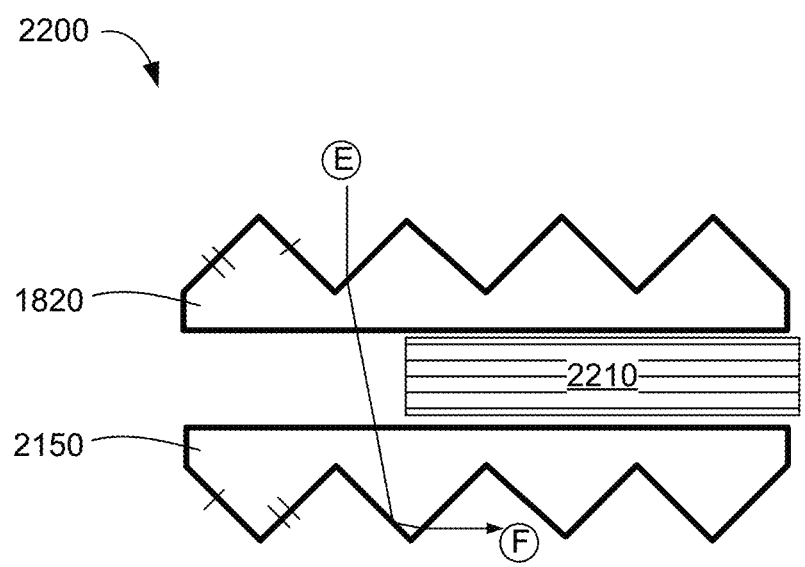
FIG. 22 shows another optical arrangement having an enhancement film layer and a compensation layer, according to various embodiments.

FIG. 22 shows another optical arrangement 2200 having an enhancement film layer 1820 and a compensation film layer 2150, according to various embodiments. The optical arrangement of FIG. 22 can be similar or identical to the optical arrangement of FIG. 21 in some embodiments. For the sake of context, FIG. 22 shows the enhancement film layer 1820 and the compensation film layer 2150 separated by other functional layers 2210. For example, as shown in FIG. 17B, the enhancement film layer 1820 can be enhancement layer 1725 (or a part thereof), and the compensation film layer 2150 can be light path compensator layer 1755*a* or 1755*b*; and those layers can be separated by other functional layers 2210, such as a light diffuser 1730, a light guide plate 1735, a reflector film 1740, etc. Because of the spacing between the enhancement film layer 1820 and the compensation film layer 2150 created by other functional layers 2210, it can be common for light interacting with a particular enhancement prism face 2110 to then interact with a non-corresponding compensation prism face 2160. This can cause cross-talk (e.g., imaging confusion) when used with an under-display optical sensor (e.g., under-display optical sensor 1765).

Embodiments of the compensation film layer 2150 can be designed to eliminate (or at least mitigate) such cross-talk. For example, as illustrated, light beam E is bent by the enhancement film layer 1820, causing it to diverge from its original direction. Subsequently, the light beam enters the compensation film layer 2150, is refracted by the compensation film layer 2150, and interacts with a compensation prism face 2160. The compensation prism face 2160 changes the direction of travel of the light beam to such an extent that the light beam would be substantially undetectable by an under-display optical sensor. Such an approach can, in some implementations, eliminate (or appreciably mitigate) any influence of such light beams on optical sensing.

The potential for cross-talk discussed in FIGS. 21 and 22 is only one optical concern. Another similar concern in some implementations is a potential for dual imaging. For example, referring back to FIG. 21, enhancement film layer 1820 and compensation film layer 2150 are overlapped with the grooves in parallel. The micro-prism structures are built on a substrate with proper thickness, and compensation film layer 2150 is located a distance Z from enhancement film layer 1820. Typically, the object to be sensed is not far away from the films. In such an arrangement, a particular light path can, in some cases, have two routes by which to travel through the film layers (e.g., light paths AC and BD, as illustrated). As such, the material thickness and the distance between the two film layers can result in double sub-images in the optical sensor, which can frustrate reliable optical sensing. Various embodiments address such double imaging by effectively eliminating all but one of the routes for a given light path. Characteristics of the compensation film layer 2150 can be designed differently to provide different features, such as to address some or all of these optical concerns. For example, embodiments of the compensation film layer 2150 can be designed to reduce such cross-talk (as illustrated in FIG. 21), to compensate only for bending caused by one of the enhancement prism faces 2110 of each enhancement micro-prism structure 2105 (e.g., as illustrated in FIG. 22), and/or to address other concerns. Some such designs are described below with reference to FIGS. 23-25.

Figure 23:
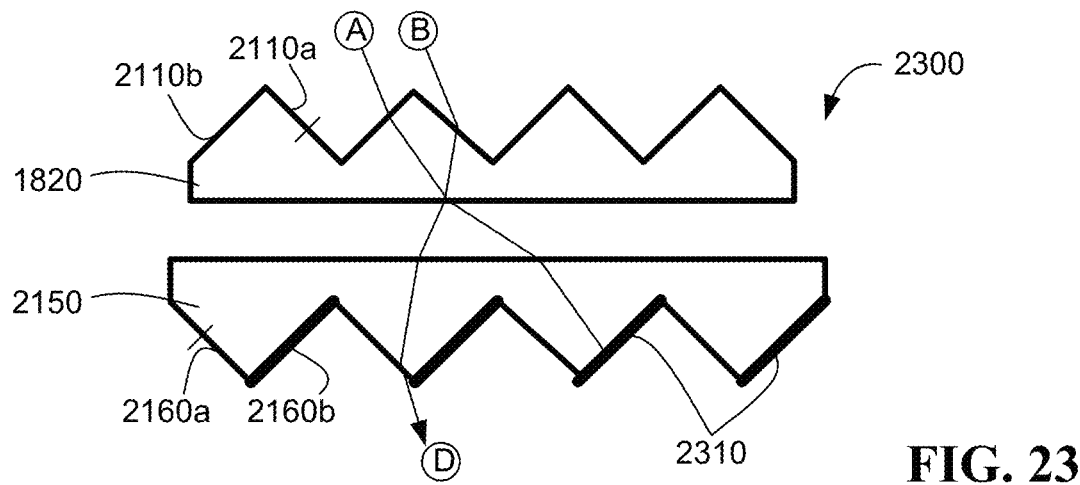
FIGS. 23-25 show illustrative optical arrangements to provide light path compensation without dual imaging, according to various embodiments.

Turning first to FIG. 23, an optical arrangement 2300 is shown in which enhancement film layer 1820 and compensation film layer 2150 are overlapped with their respective grooves in parallel and corresponding micro-prism surfaces (enhancement micro-prism structures 2105 and compensation micro-prism structures 2155) are parallel. Each first enhancement prism face 2110*a* is parallel to each first compensation prism face 2160*a*, and each second enhancement prism face 2110*b* is parallel to each second compensation prism face 2160*b*. However, each second compensation prism face 2160*b* of some or all of the compensation micro-prism structures 2155 of the compensation film layer 2150 are treated to be non-transparent to some or all probe light frequencies. For example, the probe light (e.g., and, generally, any light passing through the compensation film layer 2150 for which compensation is desired) is of a particular one or more frequencies, and select compensation prism faces 2160 are treated to be opaque, partially opaque, reflective, or otherwise inhibiting to those frequencies. In the illustrated implementation, each first compensation prism face 2160*a* is transparent (e.g., at least to frequencies of interest), and each second compensation prism face 2160*b* is treated to be opaque or internally reflective (e.g., to those frequencies of interest).

Such an effect is achieved by applying a surface treatment 2310 to one face of each (of some or all) compensation micro-prism structure 2155. The surface treatment 2310 can include treating the prism face with light-absorbing material, roughening the face, adulterating the material of the face, diffusing material at the face, applying a coating to the face, or otherwise producing the face in a manner that eliminates, or appreciably reduces the brightness of at least one sub-image. For added clarity, adjacent light beams A and B are shown. As described with reference to FIG. 21, though adjacent, those light beams may traverse different paths through the film layers, ultimately reaching different compensation prism faces 2160, potentially resulting in cross-talk. Due to the surface treatment 2310, however, only one of the sub-images passes through the compensation film layer 2150, while the other is inhibited. For example, light beam B enters, is refracted by, and exits the enhancement film layer 1820; then enters, is refracted by, and exits the compensation film layer 2150 as light beam D. However, light beam A enters, is refracted by, and exits the enhancement film layer 1820; then enters, is refracted by, and is inhibited by the surface treatment 2310 of the compensation film layer 2150.

Figure 24:
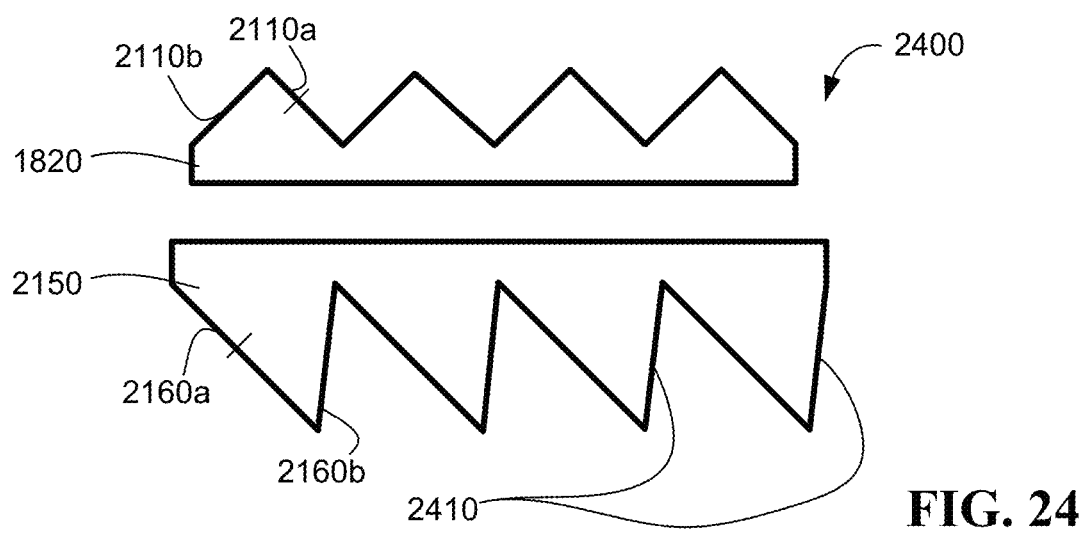

Turning to FIG. 24, another optical arrangement 2400 is shown in which enhancement film layer 1820 and compensation film layer 2150 are overlapped with their respective grooves in parallel. Unlike in FIG. 23, only one face of each compensation micro-prism structures 2155 is parallel to a corresponding face of an enhancement micro-prism structure 2105. As illustrated, each first enhancement prism face 2110a is parallel to each first compensation prism face 2160a, but each second enhancement prism face 2110b is not parallel to each second compensation prism face 2160b. Thus, each second compensation prism face 2160b is effectively a non-compensating surface. With such an arrangement, the sub-image along the non-compensating surface series tends to be strongly distorted and offset out of the detection area of the optical sensor. As such, only one sub-image can be detected, or it can be relatively simple to ignore the effects of the undesired sub-image.

Turning to FIG. 25, another optical arrangement 2500 is shown in which enhancement film layer 1820 and compensation film layer 2150 are overlapped with their respective grooves in parallel. The implementation in FIG. 25 is similar to that of FIG. 24, except that the prism ridges of some or all compensation micro-prism structures 2155 are flattened to create an additional compensation prism face 2160c. As in FIG. 24, each first enhancement prism face 2110a is parallel to each first compensation prism face 2160a, but each second enhancement prism face 2110b is not parallel to each second compensation prism face 2160b (i.e., each second compensation prism surface is a non-compensating surface). The additional compensation prism faces 2160c (the flattened ridge surface) can be oriented, treated, and/or otherwise configured in any suitable manner to reduce some or all influence on the optical sensor from light reflecting off of the non-compensating surfaces 2510. For example, each additional compensation prism face 2160c can be substantially parallel to the substrate plane of the compensation film layer 2150. Such an arrangement can further reduce or eliminate all but one sub-image from optical detection.

FIGS. 26A-26D show simplified display system arrangements 2600, each having an under-display optical sensor 1765 in context of a display system with an enhancement layer and a compensation layer, according to various embodiments. The arrangements 2600 illustrate some different implementations of an optical system. Embodiments of the optical system include multiple optical layers, each configured to impact transmission of light there-through. The optical layers include an enhancement layer including at least one enhancement film layer 1820, and a compensation layer including at least one compensation film layer 2150. Each enhancement film layer 1820 includes enhancement micro-prism structures 2105 pointing in an enhancement direction 2610, each enhancement micro-prism structure 2105 having a triangular cross-section formed by a respective first enhancement prism face 2110a and a respective second enhancement prism face 2110a that meet to form a respective enhancement prism ridge 2115. Each compensation film layer 2150 has compensation micro-prism structures 2155 pointing in a compensation direction 2620 that is substantially opposite the enhancement direction 2610, each compensation micro-prism structure 2155 having a triangular cross-section formed by a respective first compensation prism face 2160a and a respective second compensation prism face 2160b. As described herein, each respective first enhancement prism face 2110a is substantially parallel to each respective first compensation prism face 2160a. In various implementations, each respective second enhancement prism face 2110b may or may not be substantially parallel to each respective second compensation prism face 2160b; and each respective second enhancement prism face 2110b may or may not be configured or otherwise treated to inhibit propagation of light there-through.

In some embodiments, as illustrated, the optical system also includes a cover layer 1715 disposed above the enhancement layer (the one or more enhancement film layers 1820) and the compensation layer (the one or more compensation film layers 2150). As such, the enhancement direction 2610 points generally toward the cover layer 1715, and the compensation direction 2620 points generally away from the cover layer 1715. Embodiments can also include a liquid crystal display module (LCM) 1720, which can be disposed below the cover layer 1715 and above the one or more enhancement film layers 1820 and/or compensation film layers 2150. In some embodiments, the under-display optical sensor 1765 is disposed below the one or more enhancement film layers 1820 and compensation film layers 2150. Some embodiments also include an illumination subsystem (not shown) that is disposed below the one or more enhancement film layers 1820 and/or compensation film layers 2150. The illumination subsystem is configured to project probe light at the cover layer 1715 through the one or more enhancement film layers 1820 and/or compensation film layers 2150, and also through the LCM 1720. As such, the under-display optical sensor 1765 can be configured to image portions of the probe light that reach its optical sensor after reflecting off of the cover layer 1715 and passing back through the one or more enhancement film layers 1820 and compensation film layers 2150.

Figure 26A:
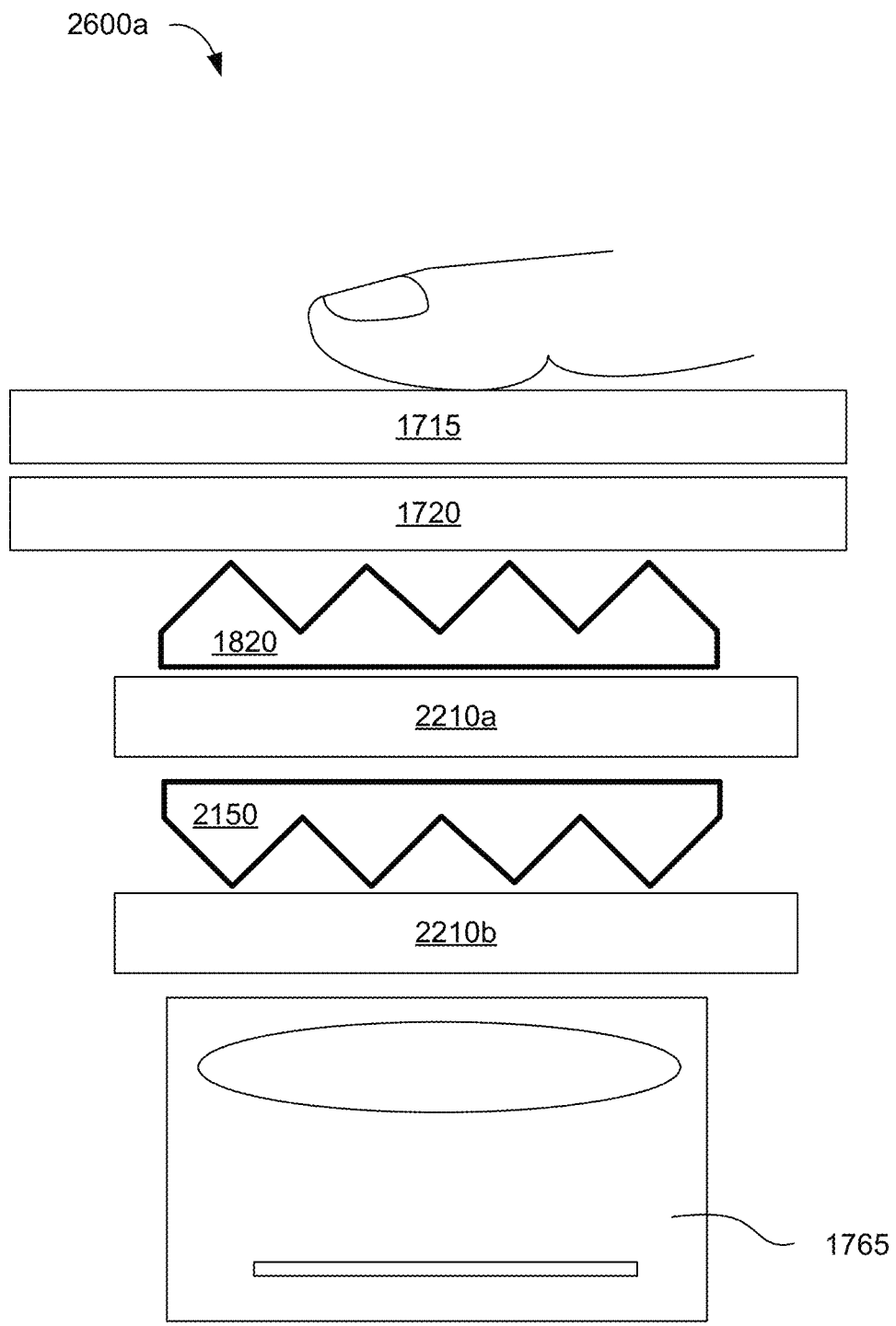
FIGS. 26A-26D show simplified display system arrangements, each having an under-display optical sensor in context of a display system with enhancement layers and compensation layers, according to various embodiments.

FIG. 26A shows an arrangement 2600d having only a single enhancement film layer 1820 and a single compensation film 2150. In such an arrangement, the compensation film layer 2150 is configured to fully or partially compensate for effects of the enhancement film layer 1820. The enhancement film layer 1820 and compensation film layer 2150 are shown disposed among other functional optical layers (illustrated as "sets" of functional optical layers 2210, each having one or more functional optical layer). The various functional optical layers can include one or more light diffuser layers, light guide plate layers, reflector film layers, optical filter layers, additional enhancement and/or compensation layers, and/or any other suitable optical layer.

Figure 26B:
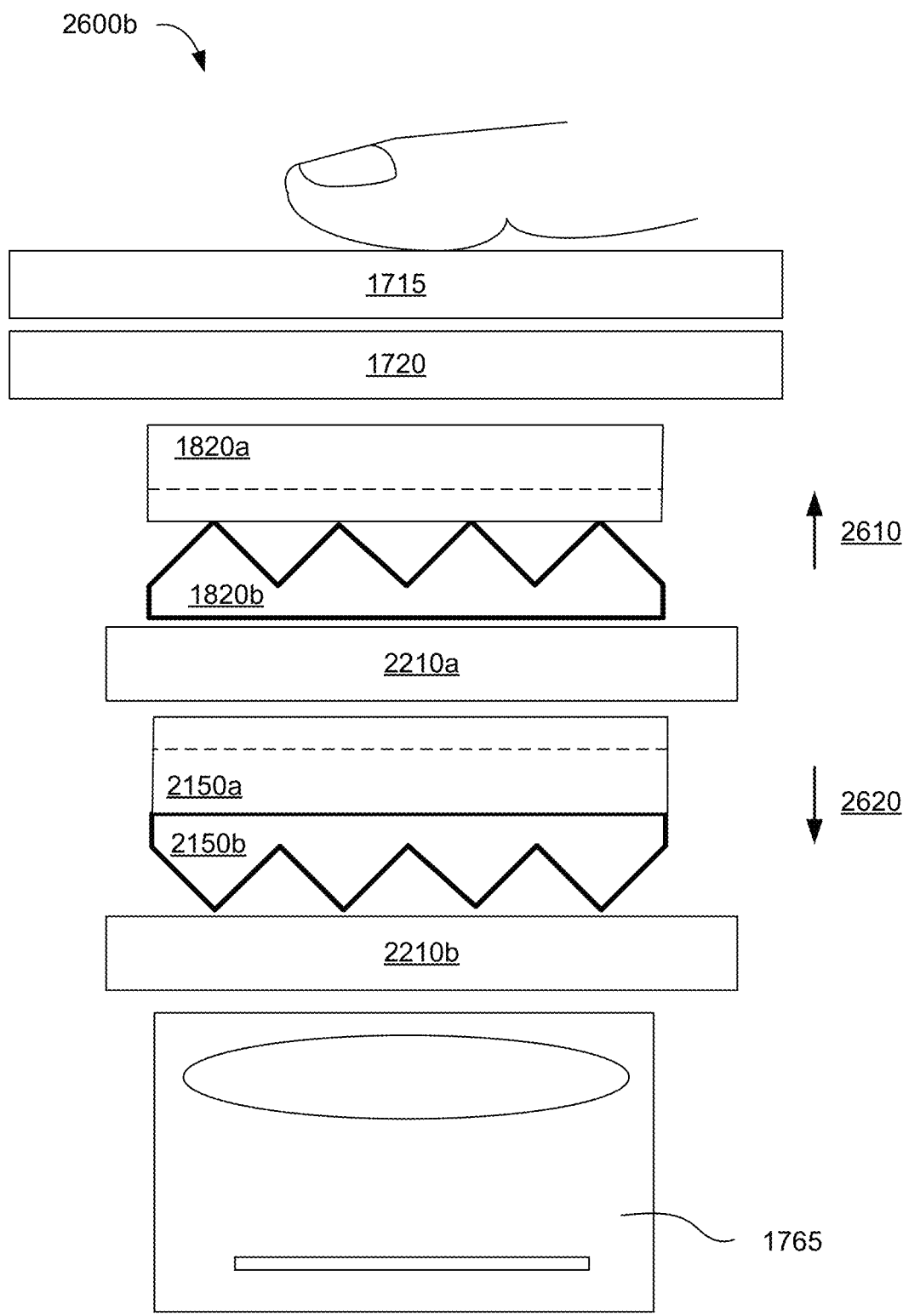
Figure 26C:
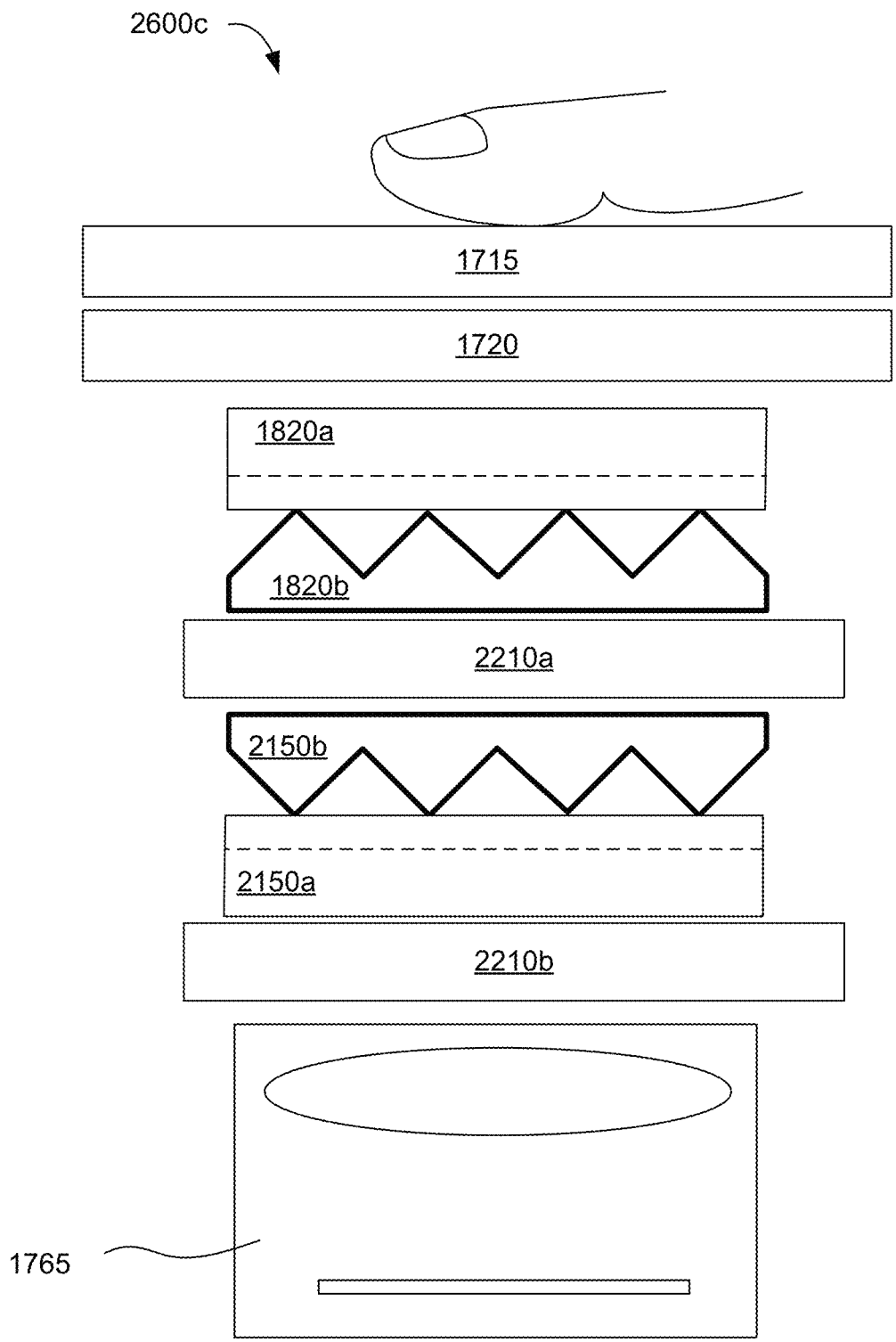
Figure 26D:
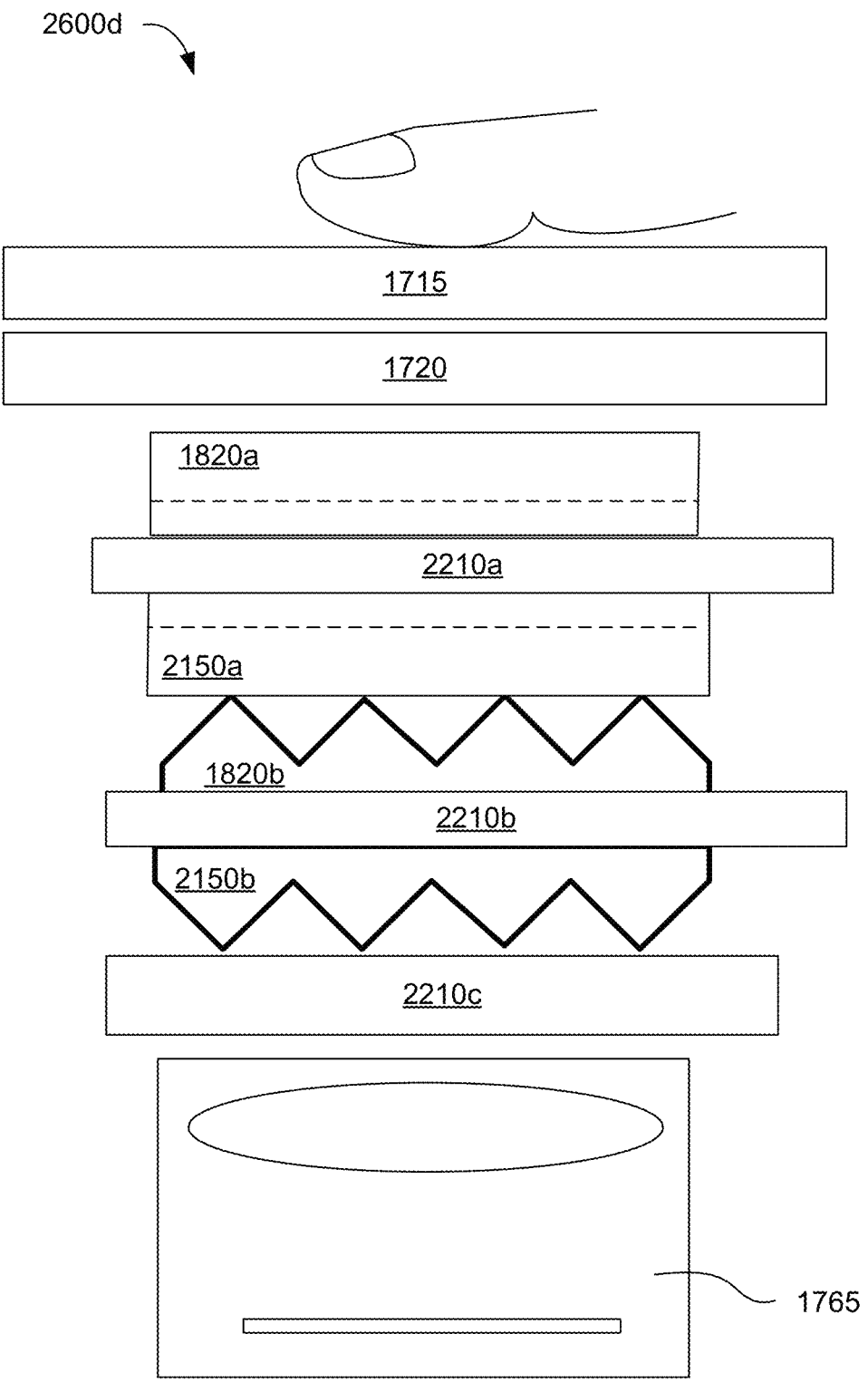

In the various implementations illustrated in FIGS. 26B-26D, the enhancement layer is shown as having two enhancement film layers 1820, such as the enhancement film layers 1820 shown in FIG. 18C; and the compensation layer is similarly shown as having two compensation film layers 2150. For example, a first enhancement film layer 1820a is arranged to overlap substantially orthogonally with a second enhancement film layer 1820b, such that the enhancement prism ridges 2115 of the first enhancement film layer 1820a run in a direction that is substantially orthogonal to those of the second enhancement film layer 1820b. Similarly, a first compensation film layer 2150a is arranged to overlap orthogonally with a second compensation film layer 2150b, such that the compensation prism ridges of the first compensation film layer 2150a run in a direction that is substantially orthogonal to those of the second compensation film layer 2150b. In such arrangements, the first compensation film layer 2150a can be designed to substantially compensate for the first enhancement film layer 1820a, and the second compensation film layer 2150b can be designed to substantially compensate for the second enhancement film layer 1820b.

In FIG. 26B, the two enhancement film layers 1820 are disposed between the cover layer 1715 (and the LCM 1720) and a first set of functional optical layers 2210a, and the two compensation film layers 2150 are disposed between the first set of functional optical layers 2210a and a second set of functional optical layers 2210b. The upper (first) enhancement film layer 1820a is effectively matched with the upper (first) compensation film layer 2150a (e.g., their respective prism ridges run in a same first direction), and the lower (second) enhancement film layer 1820b is effectively matched with the lower (second) compensation film layer 2150b (e.g., their respective prism ridges run in same second direction that is orthogonal to the first direction). The arrangement 2600c of FIG. 26C is similar to that of FIG. 26B, except in the ordering of compensation film layers 2150. In FIG. 26C, the upper (first) enhancement film layer 1820a is effectively matched with the lower (first) compensation film layer 2150a, and the lower (second) enhancement film layer 1820b is effectively matched with the upper (second) compensation film layer 2150b. Thus, the first enhancement film layer 1820a and the first compensation film layer 2150a have a larger relative spacing than that between the second enhancement film layer 1820b and the second compensation film layer 2150b, which are directly above and below the first set of functional optical layers 2210a, respectively.

As illustrated by FIG. 26D, the multiple enhancement film layers 1820 do not necessarily have to be adjacent, and/or the multiple compensation film layers 2150 do not necessarily have to be adjacent. In the illustrated configuration, the enhancement film layers 1820 and compensation film layers 2150 are interleaved. The first enhancement film layer 1820a is disposed between the cover layer 1715 (and the LCM 1720) and a first set of functional optical layers 2210a, the first compensation film layer 2150a and the second enhancement film layer 1820 are disposed between the first set of functional optical layers 2210a and a second set of functional optical layers 2210b, and the second compensation film layer 2150b is disposed between the second set of functional optical layers 2210b and a third set of functional optical layers 2210c. In such a configuration, matching film layers are kept close together. For example, the first enhancement film layer 1820a and the first compensation film layer 2150a are directly above and below the first set of functional optical layers 2210a, and the second enhancement film layer 1820b and the second compensation film layer 2150b are directly above and below the second set of functional optical layers 2210b. In some such arrangements, a light diffuser layer is included in the first and/or second set of functional optical layers 2210, for example, to help avoid fringes and/or other artifacts caused by the arrangement of enhancement and compensation layers.

As described above, light travels from the top cover layer toward the optical sensor, such as probe lighting and backlighting reflected by a top surface of the top cover layer due to interactions between a fingerprint or other object and the top surface. The compensation layer can be designed so that any particular beam of that reflected light originates in a first direction, is bent by the enhancement film layers to a second direction, and is bent back to substantially the first direction by the compensation layer prior to reaching the under-display optical sensor. Geometric and optical properties of the compensation film layers can be adjusted to optimize compensation quality and/or to provide other features. For example, the compensation layer can include more or fewer compensation film layers, the compensation micro-prisms can be designed with different angles and/or pitches than those of the enhancement micro-prisms, the compensation prism faces can be treated (e.g., to be opaque or reflective), etc. Further, in various embodiments, the compensation layer can be spaced closer to, or farther from, the enhancement layer to provide different features.

As described above, various arrangements of micro-prism structures of enhancement film layers and/or compensation film layers can tend to limit the sensing region (e.g., sensing region 615 described above) to only a reduced-area practical sensing sub-region (e.g., sub-region 1910 or 2010 described above). Increasing the area of the theoretical sensing region 615 can counteract limitations of a reduced-area practical sensing sub-region 2010. For example, doubling the area of the theoretical sensing region 615 can double the area of the practical sensing sub-region 2010. One approach to increasing the area of the theoretical sensing region 615 is to increase the distance between the object being detected (e.g., a fingerprint feature) and a lens at the input of the optical sensor. However, directly increasing such a distance can involve increasing the thickness of the optical sensor, which is impractical in many applications. For example, in smartphone applications, it is desirable to maintain a thin package, while still realizing a large sensing area. Some embodiments seek to effectively increase the theoretical sensing region 615 without a comparable increase in sensor thickness by using refraction and reflection to produce a folded light path.

Figure 27:
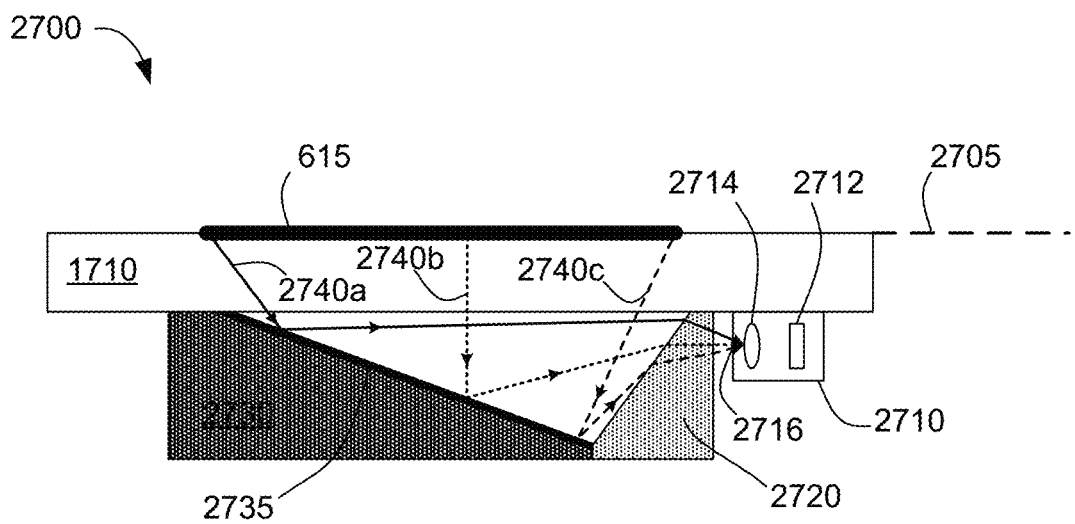
FIG. 27 shows an illustrative under-display optical sensing environment, according to various embodiments.

FIG. 27 shows an illustrative under-display optical sensing environment 2700, according to various embodiments. As illustrated, the environment 2700 includes an under-display optical sensing system disposed below a display module 1710. The optical sensing system includes an optical sensing module 2710, a refractive structure 2720, and a reflective structure 2730. The optical sensing module 2710 can include any suitable components for optical sensing. For the sake of simplicity, the optical sensing module 2710 is shown as an optical detector 2712 and a lens 2714. For reference, the display module 1710 is illustrated as defining a display plane 2705. For example, a display surface of the display module 1710 is generally flat (e.g., though it may include bezeled edges, rounded edges, etc.), such that the display surface lies generally in the display plane 2705. The display module 1710 can be any suitable type of display and can include one or more layers. In some embodiments, as described above, the display module 1710 is a liquid crystal display (LCD) module having layers including a LCD layer (e.g., including an array of LCD pixels, electrode interconnects, etc.).

The optical sensing module 2710 is configured to derive optical information from received illumination energy. For example, as light enters the optical sensing module 2710 through an input aperture 2716, the light is focused by the lens 2714 onto the optical detector 2712, which may include an array of photodetectors, and/or any other suitable components. The received illumination energy can then be converted into optical information. For example, the conversion can include any suitable optical processing (e.g., using lenses, filters, modulators, masks, etc.) and/or any suitable logical processing (e.g., using computational processors, state machines, software, etc.). The input aperture 2716 can be oriented substantially parallel to the display plane 2705, as illustrated. In such a configuration, a light path traveling parallel to the display plane 2705 can enter a center of the input aperture 2716 on-axis with the lens 2714.

The reflective structure 2730 can receive reflected probe light passing through the display module 1710 (e.g., within an optical sensing region 615) and can. In some embodiments, the reflective structure 2730 includes a mirror integrated with (e.g., affixed to) a top reflective surface 2735. For example, the reflective structure 2730 comprises structure to support and orient the mirror in an angle suitable for redirecting light paths 2740 of the reflected probe light toward the refractive structure 2720. In other embodiments, the reflective structure 2730 is a unitary prismatic body having an angled top surface 2735. In such embodiments, the unitary prismatic body can be made of a material (e.g., plastic, glass, etc.) having an index of refraction selected to reflect the reflected probe light that is incident on the angled top surface 2735 after passing through the display module 1710 toward the refractive structure 2720. As illustrated, the reflective structure 2730 is sized and oriented to redirect light paths 2740 of the reflected probe light from across the entire optical sensing region 615 toward the refractive structure 2720. In certain implementations, the reflective structure 2730 is sized and oriented to redirect light paths 2740 of the reflected probe light only from a portion of the optical sensing region 615, and/or additionally from areas outside the optical sensing region 615.

Embodiments of the refractive structure 2720 receive the reflected probe light from the reflective structure 2730 and bend the light paths 2740 of the reflected probe light to converge on the input aperture 2716 of the optical sensing module 2710. For example, as illustrated, light paths 2740a, 2740b, and 2740c originate from a leftmost edge, a center, and a rightmost edge of the optical sensing region 615, respectively, thereby representing light paths 2740 from across the entire optical sensing region 615. Though covering a large optical sensing region 615, the light paths 2740 are all redirected to the refractive structure 2720 by the reflective structure 2730, and are all bent by the refractive structure 2720 to converge on the input aperture 2716 of the optical sensing module 2710. In some embodiments, the refractive structure 2720 is a unitary prismatic body having a first refractive surface (e.g., further from the optical sensing module 2710) to receive the reflected probe light from the reflective structure, and a second refractive surface (e.g., closer to the optical sensing module 2710) to transmit the reflected probe light to the input aperture of the optical sensing module, the first refractive surface being angled with respect to the second refractive surface. For example, as illustrated, the second refractive surface can be oriented substantially orthogonally to the display plane.

As described above (though not shown in FIG. 27), embodiments can include an illumination source and a top transparent layer. The illumination source can be disposed under the display module 1710 to generate probe light and to direct the probe light through at least a portion of the display module 1710. For example, the probe light source can include a light emitting diode (LED), a vertical cavity surface emitting laser (VCSEL), or any other suitable light source. The top transparent layer can be disposed above the display module 1710 and configured as an output interface for images produced by the display module 1710. In some implementations, the display module 1710 also includes touch-sensitive features, and the top transparent layer can be further configured as an input interface for touch-sensitive interactions. Though the optical sensing region 615 is illustrated as laying substantially in the display plane 2705, the optical sensing region 615 can also be defined with reference to a top surface of the top transparent layer. For example, when the optical sensing module 2710 is configured for under-display optical fingerprint sensing, the fingerprint is typically placed on the top surface of the top transparent layer; such that the optical sensing region 615 corresponds more directly to the region of the top surface of the top transparent layer within which optical fingerprint sensing can be performed. The optical sensing region 615, then, can be a region configured to receive the probe light from the illumination source and to reflect a portion of the probe light responsive to interactions between an object (e.g., fingerprint features) and the top surface. For example, as described above, the top transparent layer can be made of a material (e.g., treated glass) having a particular index of refraction relative to the air above the top transparent layer and/or to a fingerprint feature or other object. As such, the probe light will tend to be reflected or not at the top surface of the top transparent layer based on whether or not an object is present (e.g., a fingerprint ridge will cause the probe light to be reflected, and a fingerprint valley will cause the probe light to be absorbed, scattered, etc.). In such embodiments, the reflected probe light being redirected by the reflective structure 2730, bent by the refractive structure 2720, and received by the optical sensing module 2710 is the probe light being reflected by the top surface of the top transparent layer.

In some embodiments, the reflective structure 2730 and the refractive structure 2720 are configured (e.g., sized, shaped, positioned, and oriented) so that one of the light paths 2740b passing through a center of the optical sensing region 615 is redirected by the reflective structure 2730 and bent by the refractive structure 2720 so as to enter a center of the input aperture 2716 of the optical sensing module. For example, the lens 2714 is a convex lens having a primary optical axis, and the input aperture 2716 is aligned with the lens 2714, so that a center of the input aperture 2716 is aligned with the primary optical axis of the lens 2714. In some embodiments, as illustrated, the reflective structure 2730 and the refractive structure 2720 are configured so that one of the light paths 2740b passing through the display module in a first direction substantially normal to the display plane (e.g., vertical with respect to the illustration) is redirected by the reflective structure 2730 and bent by the refractive structure 2720 so as to enter the input aperture 2716 of the optical sensing module 2710 in a second direction substantially parallel to the display plane (e.g., horizontal with respect to the illustration).

Figure 28:
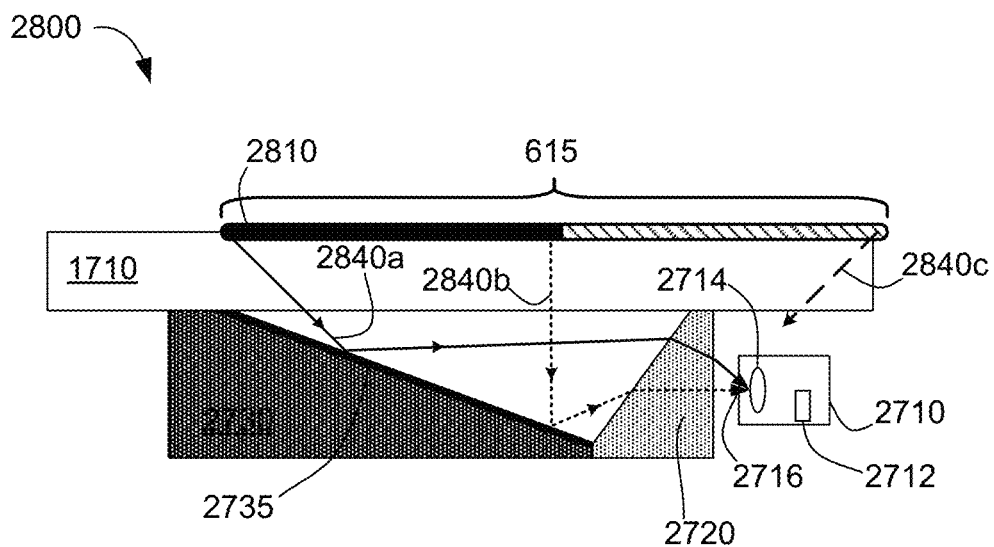
FIG. 28 shows an illustrative under-display optical sensing environment with off-axis sensing, according to various embodiments.

FIG. 28 shows an illustrative under-display optical sensing environment 2800 with off-axis sensing, according to various embodiments. Similar to the environment 2700 of FIG. 27, the environment 2800 includes an under-display optical sensing system disposed below a display module 1710. The optical sensing system includes an optical sensing module 2710, a refractive structure 2720, and a reflective structure 2730 (with a reflective top surface 2735. The optical sensing module 2710 can include any suitable components for optical sensing, such as an optical detector 2712 and a lens 2714. Unlike in FIG. 27, the environment 2800 of FIG. 28 shows a practical optical sensing sub-region 2810 smaller than the theoretical optical sensing region 615, such as described with reference to FIGS. 20 and 21.

As described above, embodiments of the display module 1710 can include an enhancement layer having micro-prism structures. For example, each micro-prism structures can have at least a first and second prism face, and the first and second prism faces can be symmetric or asymmetric with respect to each other. As reflected probe light passed through the micro-prism structures, some of the reflected probe light passes through the first prism faces of the micro-prism structures, and other of the reflected probe light passes through the second prism faces of the micro-prism structures. For example, a first portion of light paths 2840 of the reflected probe light pass through first prism faces of the micro-prism structures, and a second portion of the light paths 2840 of the reflected probe light pass through second prism faces of the micro-prism structures, such that the first and second portions of the light paths 2840 are divergent. As described above, such divergence can cause blurring if the optical sensing module 2710 receives both the first and second portions of the light paths 2840. Instead, embodiments can configure the optical sensing module 2710 to derive the optical information from the received illumination energy corresponding only to the first portion of the light paths 2840 of the reflected probe light. As such, the practical optical sensing sub-region 2810 smaller than the theoretical optical sensing region 615 (e.g., approximately one half or one quarter the area).

In some such embodiments, the enhancement layer includes a first enhancement film layer and a second enhancement film layer. The first enhancement film layer has a first portion of the micro-prism structures arranged to form first parallel prism ridge lines running in a first direction, and the second enhancement film layer has a second portion of the micro-prism structures arranged to form second parallel prism ridge lines running in a second direction different from the first direction. For example, as illustrated in FIG. 21, the first enhancement film layer can be substantially identical to the second enhancement film layer, and the first enhancement film layer can be stacked on top of the second enhancement film layer and oriented so that the first direction is orthogonal to the second direction. In some such embodiments, the first portion of the light paths 2840 of the reflected probe light pass through the first prism faces of the micro-prism structures by passing through first prism faces of the first portion of micro-prism structures and first prism faces of the second portion of micro-prism structures; and the second portion of the light paths 2840 of the reflected probe light pass through the second prism faces of the micro-prism structures by passing through second prism faces of the first portion of micro-prism structures and second prism faces of the second portion of micro-prism structures. There can also be a third portion of the light paths 2840 of the reflected probe light that pass through the first prism faces of the first portion of micro-prism structures and the second prism faces of the second portion of micro-prism structures, and a fourth portion of the light paths 2840 of the reflected probe light that pass through the second prism faces of the first portion of micro-prism structures and the first prism faces of the second portion of micro-prism structures. Again, in such embodiments, the practical optical sensing sub-region 2810 can be smaller than the theoretical optical sensing region 615 (e.g., approximately only one quadrant of the theoretical optical sensing region 615 may be usable without blurring).

Embodiments of the optical sensing module 2710 include the lens 2714 and the optical detector 2712 (e.g., including any suitable type of sensing components), oriented so that the reflected probe light caused to converge on the input aperture 2716 of the optical sensing module 2710 is focused onto the optical detector 2712 by the lens 2714. Some such embodiments can be configured to prefer the first portion of the light paths 2840 that correspond to the illumination energy passing only (or primarily) through a particular face of the micro-prism structures (e.g., only first prism faces). For example, as illustrated in FIG. 28, the under-display optical sensing system is configured so that light path 2840*a* and light path 2840*b* are directed into the optical sensing module 2710 $y$ the reflective structure 2730 and the refractive structure 2720, but light path 284*c* is not. In some such embodiments, the optical detector 2712 can be positioned off-axis from the lens in accordance with a generally off-center light path resulting from a configured preference only for the first portion of the light paths 2840. As such, the optical detector 2712 can be configured (e.g., positioned and/or sized) to receive illumination energy reflecting from the practical optical sensing sub-region 2810, and not from the rest of the theoretical optical sensing region 615.

Figure 29:
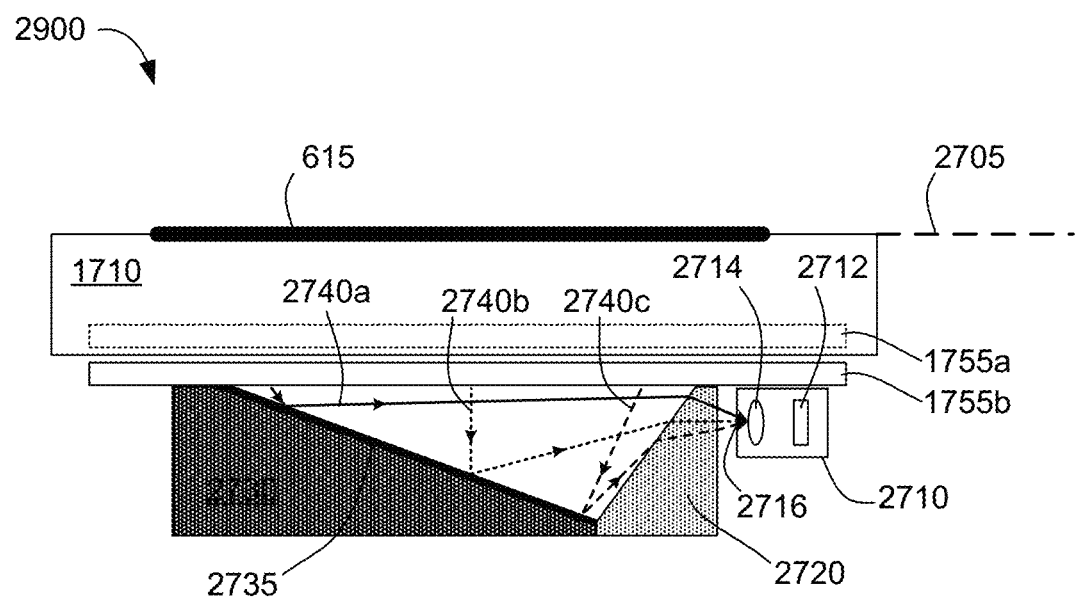
FIG. 29 shows an illustrative under-display optical sensing environment, according to various embodiments.

FIG. 29 shows an illustrative under-display optical sensing environment 2900, according to various embodiments. As illustrated, the environment 2900 includes an under-display optical sensing system disposed below a display module 1710. The environment 2900 can be implemented as described above with reference to FIG. 27 or 28, or in any other suitable manner. For example, the optical sensing system includes an optical sensing module 2710, a refractive structure 2720, and a reflective structure 2730. As illustrated, the environment 2900 can include one or more light path compensators 1755, such as compensation layers. In some embodiments, a compensation layer is implemented as a layer of the display module 1710. In other embodiments, a compensation layer is implemented as a separate layer between the display module 1710 and the optical sensing system, and/or otherwise directly in front of the optical sensing system. In other embodiments, compensation layers are implemented both as a layer of the display module 1710 and directly in front of the optical sensing system. As described herein, the compensation layer(s) can help direct more optical information from the sensing area 615 to the optical sensor 2710, while mitigating blurring, cross-talk, and other undesirable optical effects.

While this disclosure contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

A recitation of "a", "an" or "the" is intended to mean "one or more" unless specifically indicated to the contrary.

Ranges may be expressed herein as from "about" one specified value, and/or to "about" another specified value. The term "about" is used herein to mean approximately, in the region of, roughly, or around. When the term "about" is used in conjunction with a numerical range, it modifies that range by extending the boundaries above and below the numerical values set forth. In general, the term "about" is used herein to modify a numerical value above and below the stated value by a variance of 10%. When such a range is expressed, another embodiment includes from the one specific value and/or to the other specified value. Similarly, when values are expressed as approximations, by use of the antecedent "about," it will be understood that the specified value forms another embodiment. It will be further understood that the endpoints of each of the ranges are included with the range.

All patents, patent applications, publications, and descriptions mentioned here are incorporated by reference in their entirety for all purposes. None is admitted to be prior art.

What is claimed is:

1. An optical fingerprint identification apparatus applied to an electronic device having a display screen, the optical fingerprint identification apparatus comprising:
   an optical system with optical enhancement and compensation, the optical system comprising:
      a plurality of optical layers, each configured to impact transmission of light there-through, the plurality of optical layers comprising:
         an enhancement layer including at least one enhancement film having a plurality of enhancement micro-prism structures pointing in an enhancement direction; and
         a compensation layer including at least one compensation film having a plurality of compensation micro-prism structures pointing in a compensation direction that is substantially opposite the enhancement direction;
      an illumination subsystem configured to project probe light at a cover layer through the enhancement layer and the compensation layer; and
      an optical sensing subsystem configured to image portions of the probe light that reach the optical sensing subsystem after reflecting off of the cover layer and passing back through the enhancement layer and the compensation layer.

2. The optical fingerprint identification apparatus of claim 1, wherein:
   each enhancement micro-prism structure has a triangular cross-section formed by a respective first enhancement prism face and a respective second enhancement prism face that meet to form a respective enhancement prism ridge;
   each compensation micro-prism structure has a triangular cross-section formed by a respective first compensation prism face and a respective second compensation prism face; and
   each respective first enhancement prism face is substantially parallel to each respective first compensation prism face.

3. The optical fingerprint identification apparatus of claim 2, wherein:
   the plurality of enhancement micro-prism structures are formed so that the respective enhancement prism ridges are spaced in accordance with an enhancement pitch;
   the plurality of compensation micro-prism structures are formed so that each respective first compensation prism face and each respective second compensation prism face meet to form a respective compensation prism ridge, and the respective compensation prism ridges are spaced in accordance with a compensation pitch; and
   the enhancement pitch is different from the compensation pitch.

4. The optical fingerprint identification apparatus of claim 2, wherein:
   each respective second enhancement prism face is substantially non-parallel to each respective second compensation prism face.

5. The optical fingerprint identification apparatus of claim 2, wherein:
   each respective first enhancement prism face, each respective second enhancement prism face, and each respective first compensation prism face is substantially transparent to one or more probe light frequencies; and
   each respective second compensation prism face is treated to be non-transparent to the one or more probe light frequencies.

6. The optical fingerprint identification apparatus of claim 5, wherein:
   each respective second compensation prism face is treated to be non-transparent to the one or more probe light frequencies by applying a diffusing material to each respective second compensation prism face and/or by surface-texturing each respective second compensation prism face so as to frustrate transmission of light there-through.

7. The optical fingerprint identification apparatus of claim 2, wherein:
   each compensation micro-prism structure is formed on a compensation substrate defining a compensation plane;
   each respective first compensation prism face is oriented at a first compensation angle with respect to the compensation plane;
   each respective second compensation prism face is oriented at a second compensation angle with respect to the compensation plane; and
   each compensation micro-prism structure further comprises a respective third compensation plane that is substantially parallel to the compensation plane and is treated to be non-transparent to one or more probe light frequencies.

8. The optical fingerprint identification apparatus of claim 2, wherein:
   each enhancement micro-prism structure is formed on an enhancement substrate defining an enhancement plane;
   each respective first enhancement prism face is oriented at a first enhancement angle with respect to the enhancement plane;
   each respective second enhancement prism face is oriented at a second enhancement angle with respect to the enhancement plane; and
   the first and second enhancement prism faces meet at a third enhancement angle to form the enhancement prism ridge, such that the first, second, and third enhancement angles add to 180 degrees.

9. The optical fingerprint identification apparatus of claim 8, wherein the first enhancement angle is different than the second enhancement angle.

10. The optical fingerprint identification apparatus of claim 1, wherein the optical sensing subsystem comprises an under-display optical biometric imaging system.

11. The optical fingerprint identification apparatus of claim 1, wherein the illumination subsystem includes an infrared light source.

12. An electronic device, comprising:
a display module comprising a liquid crystal panel and a backlight module that is disposed behind the liquid crystal panel; and
an optical system with optical enhancement and compensation disposing below the liquid crystal panel, the optical system comprising:
a plurality of optical layers, each configured to impact transmission of light there-through, the plurality of optical layers comprising:
an enhancement layer including at least one enhancement film having a plurality of enhancement micro-prism structures pointing in an enhancement direction; and
a compensation layer including at least one compensation film having a plurality of compensation micro-prism structures pointing in a compensation direction that is substantially opposite the enhancement direction;
an illumination subsystem configured to project probe light at a cover layer through the enhancement layer and the compensation layer; and
an optical sensing subsystem configured to image portions of the probe light that reach the optical sensing subsystem after reflecting off of the cover layer and passing back through the enhancement layer and the compensation layer.

13. The electronic device of claim 12, wherein:
each enhancement micro-prism structure has a triangular cross-section formed by a respective first enhancement prism face and a respective second enhancement prism face that meet to form a respective enhancement prism ridge;
each compensation micro-prism structure has a triangular cross-section formed by a respective first compensation prism face and a respective second compensation prism face that meet to form a respective compensation prism ridge; and
each respective first enhancement prism face is substantially parallel to each respective first compensation prism face.

14. The electronic device of claim 13, wherein:
the plurality of enhancement micro-prism structures are formed so that the respective enhancement prism ridges are spaced in accordance with an enhancement pitch;
the plurality of compensation micro-prism structures are formed so that each respective first compensation prism face and each respective second compensation prism face meet to form a respective compensation prism ridge, and the respective compensation prism ridges are spaced in accordance with a compensation pitch; and
the enhancement pitch is different from the compensation pitch.

15. The electronic device of claim 13, wherein:
each respective second enhancement prism face is substantially non-parallel to each respective second compensation prism face.

16. The electronic device of claim 13, wherein the plurality of optical layers further comprises:
a first set of functional optical layers disposed between the enhancement layer and the compensation layer; and
a second set of functional optical layers disposed between the compensation layer and the optical sensing subsystem.

17. The electronic device of claim 16, wherein:
the enhancement layer comprises only the enhancement film, the respective enhancement prism ridges running parallel to one another in a first direction; and
the compensation layer comprises only the compensation film, the respective compensation prism ridges running parallel to one another in the first direction.

18. The electronic device of claim 16, wherein:
the enhancement film is a first enhancement film, the plurality of enhancement micro-prism structures being a first plurality of enhancement micro-prism structures that form first respective enhancement prism ridges parallel to one another running in a first direction;
the enhancement layer comprises a second enhancement film having a second plurality of enhancement micro-prism structures that form second respective enhancement prism ridges running parallel to one another in a second direction that is substantially orthogonal to the first direction;
the compensation film is a first compensation film, the plurality of compensation micro-prism structures being a first plurality of compensation micro-prism structures that form first respective compensation prism ridges running parallel to one another in the first direction;
the compensation layer comprises a second compensation film having a second plurality of compensation micro-prism structures that form second respective compensation prism ridges running parallel to one another in the second direction; and
the first enhancement film is placed above the second enhancement film, and the first compensation film is placed above the second compensation film, such that the second enhancement film is directly above the first set of functional optical layers, and the first compensation film is directly below the first set of functional optical layers.

19. The electronic device of claim 12, wherein the optical sensing subsystem comprises an under-display optical biometric imaging system.

20. The electronic device of claim 12, wherein the illumination subsystem includes an infrared light source.

* * * * *